United States Patent
Amano et al.

(10) Patent No.: US 8,559,736 B2
(45) Date of Patent: Oct. 15, 2013

(54) IMAGE DECODING APPARATUS, IMAGE CODING APPARATUS, IMAGE DECODING CIRCUIT, AND IMAGE DECODING METHOD

(75) Inventors: Hiroshi Amano, Osaka (JP); Takeshi Tanaka, Osaka (JP); Takashi Hashimoto, Hyogo (JP); Yoshiteru Hayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 92 days.

(21) Appl. No.: 13/321,857

(22) PCT Filed: Mar. 16, 2011

(86) PCT No.: PCT/JP2011/001531
§ 371 (c)(1),
(2), (4) Date: Nov. 22, 2011

(87) PCT Pub. No.: WO2011/118156
PCT Pub. Date: Sep. 29, 2011

(65) Prior Publication Data
US 2012/0063693 A1    Mar. 15, 2012

(30) Foreign Application Priority Data

Mar. 24, 2010  (JP) ................................. 2010-068891

(51) Int. Cl.
H04N 7/50    (2006.01)

(52) U.S. Cl.
USPC .......................................... 382/233; 382/248

(58) Field of Classification Search
USPC ................ 382/233, 248; 375/240.21, 240.16, 375/240.12, 240.03, 240.18, E7.104
See application file for complete search history.

(56) References Cited

U.S. PATENT DOCUMENTS 6,104,434 A * 8/2000 Nakagawa et al. ...... 375/240.16
6,333,949 B1 * 12/2001 Nakagawa et al. ...... 375/240.16

(Continued)

FOREIGN PATENT DOCUMENTS

| JP | 2002-314428 | 10/2002 |
|----|-------------|---------|
| JP | 2002-315004 | 10/2002 |
| JP | 2005-167655 | 6/2005 |
| JP | 3887178 | 2/2007 |

OTHER PUBLICATIONS

International Search Report issued Jun. 21, 2011 in International (PCT) Application No. PCT/JP2011/001531.

(Continued)

*Primary Examiner* — Anh Do
(74) *Attorney, Agent, or Firm* — Wenderoth, Lind & Ponack, L.L.P.

(57) ABSTRACT

A decoding apparatus (100) according to the present invention includes: a decoding unit (101) which decodes identification information identifying an orthogonal transform basis for inverse orthogonal transform; an orthogonal transform basis accumulation unit (110) accumulating orthogonal transform bases for inverse orthogonal transform; an orthogonal transform basis storage unit (103) storing an orthogonal transform basis for inverse transform, from among the stored orthogonal transform bases; an inverse orthogonal transform unit (112) which performs inverse orthogonal transform using the identified orthogonal transform basis; and an orthogonal transform basis transfer control unit (102) which transfers the identified orthogonal transfer basis from the orthogonal transform basis accumulation unit (110) to the orthogonal transfer basis storage unit (103) only when the identified orthogonal transform basis is not yet stored therein. With this structure, it is possible to reduce the memory bandwidth for the memory storing the orthogonal transform basis and the memory access latency.

22 Claims, 35 Drawing Sheets

(56) References Cited

U.S. PATENT DOCUMENTS

| | | | |
|---|---|---|---|
| 7,242,814 B2 | 7/2007 | Etoh et al. | 382/248 |
| 2003/0103679 A1 | 6/2003 | Etoh et al. | 382/248 |
| 2003/0179825 A1 | 9/2003 | Sekiguchi et al. | 375/240.12 |
| 2007/0025628 A1 | 2/2007 | Sekiguchi et al. | 375/240.12 |
| 2007/0189624 A1 | 8/2007 | Etoh et al. | 382/232 |

OTHER PUBLICATIONS

"Improved Intra Coding," ITU—Telecommunications Standardization Sector, Study Group 16 Questions, 6 Video Coding Experts Group (VCEG) document VCEG-AG11, Oct. 2007.

* cited by examiner

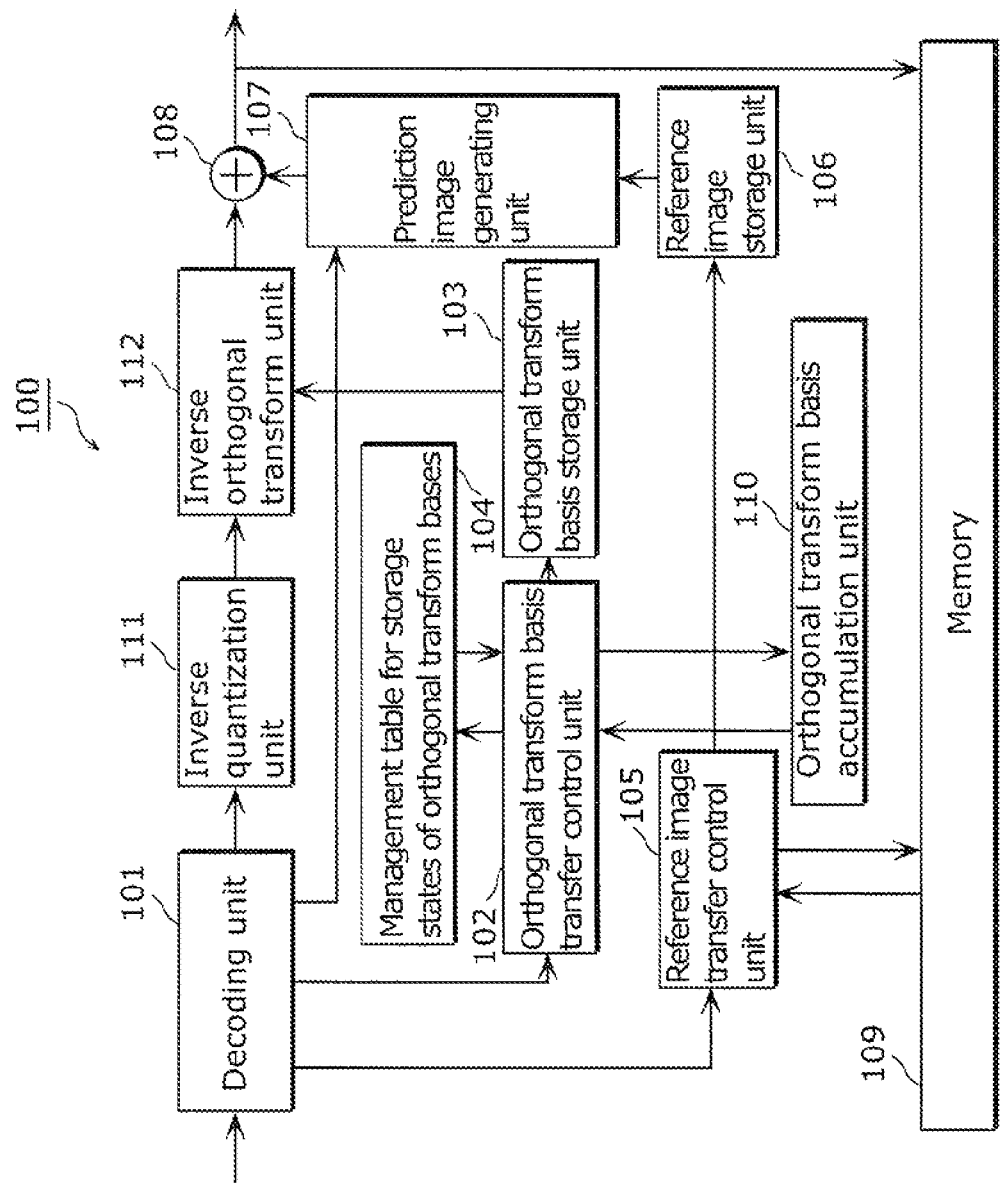

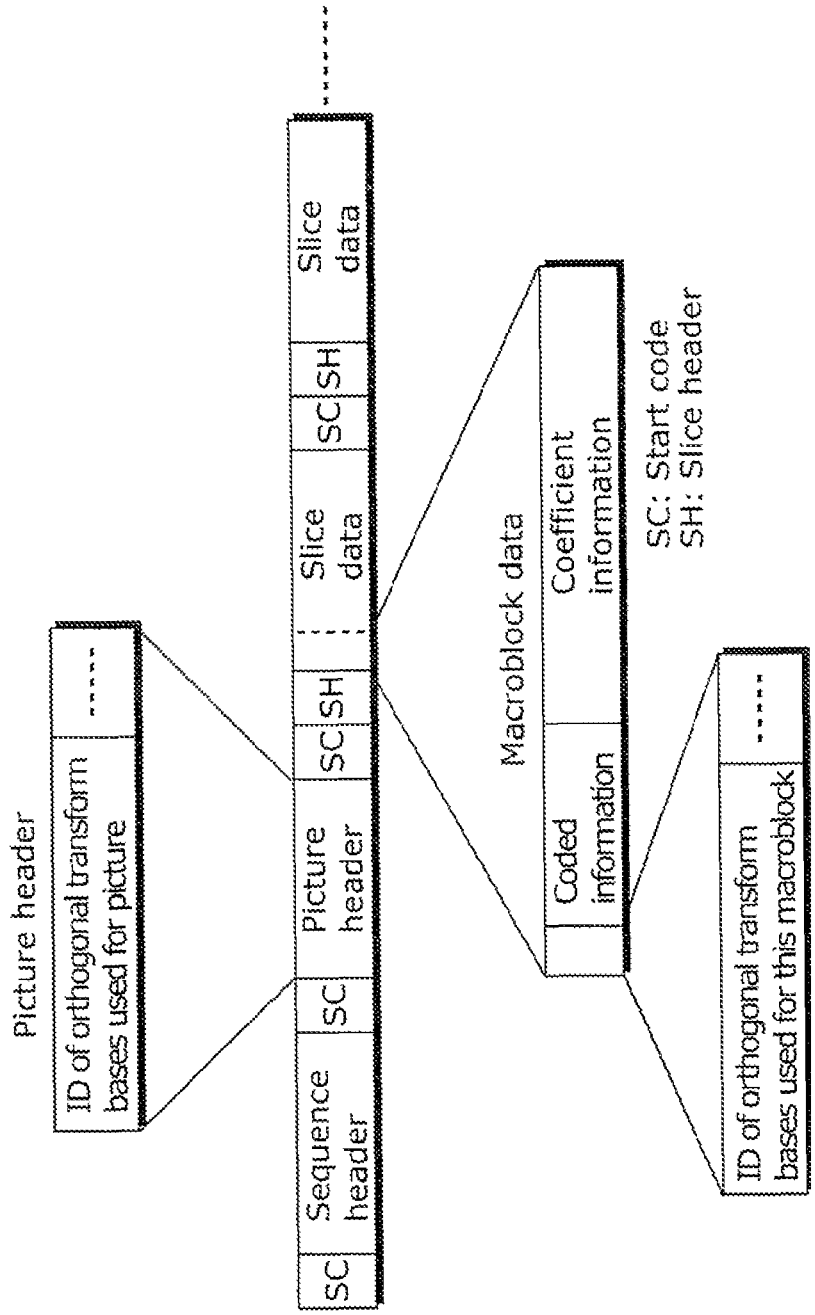

FIG. 3

| Orthogonal transform basis ID | Storage state |
|---|---|
| 0 | Held |
| 1 | Not held |
| 2 | Not held |
| 3 | Held |
| ... | ... |
| N - 1 | Not held |
| N | Not held |

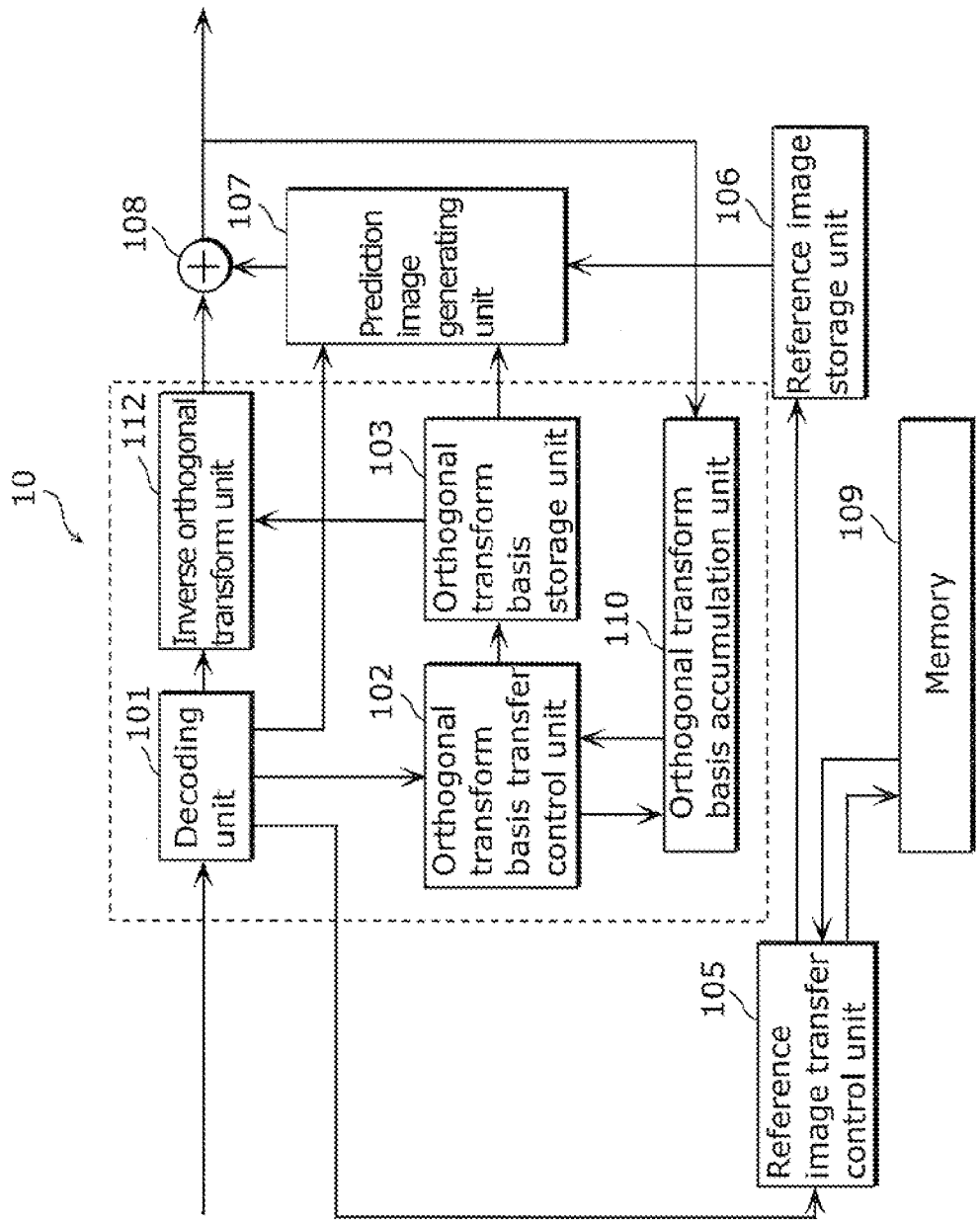

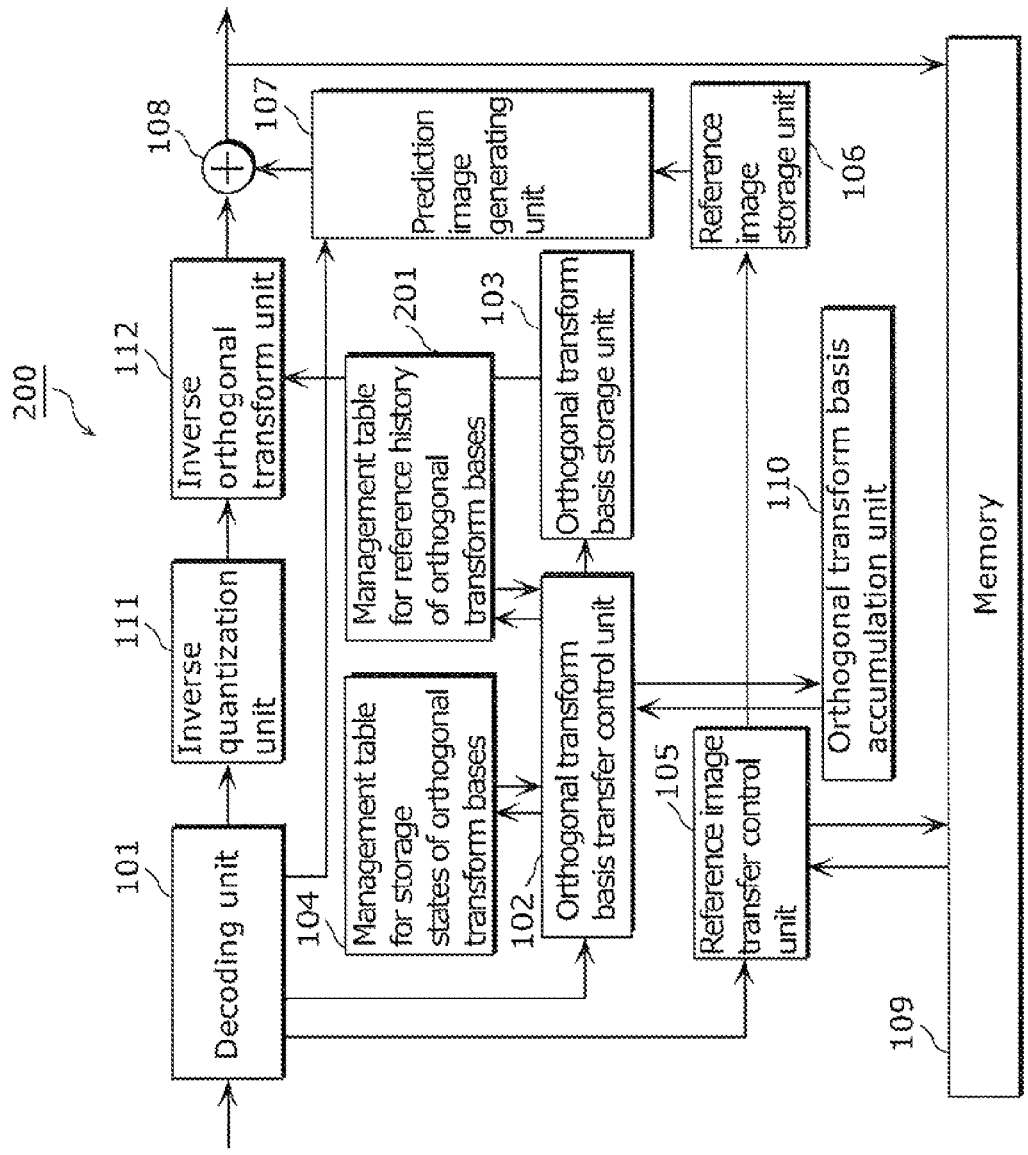

FIG. 7A

| Orthogonal transform basis ID | The number of times of reference already made in stream |
|---|---|
| 0 | 987 |
| 1 | 23 |
| 2 | 12 |
| 3 | 567 |
| ... | ... |
| N - 1 | 134 |
| N | 12 |

FIG. 7B

| Orthogonal transform basis ID | Last reference order (how many times before) |
|---|---|
| 0 | 22 |
| 1 | 135 |
| 2 | 77 |
| 3 | 57 |
| ... | ... |
| N - 1 | 1 |
| N | 866 |

FIG. 10

| Orthogonal transform basis ID | The number of times of reference to be made in stream |
|---|---|
| 0 | 55 |
| 1 | 12 |
| 2 | 0 |
| 3 | 2 |
| ... | ... |
| N - 1 | 11 |
| N | 5 |

FIG. 11

| Orthogonal transform basis ID | Next reference order for block in stream (how many times ahead) |
|---|---|
| 0 | 30 |
| 1 | 10 |
| 2 | 2 |
| 3 | 1 |
| ... | ... |
| N - 1 | 5 |
| N | 7 |

FIG. 19

| Orthogonal transform basis ID | Storage state |
|---|---|
| 0 ⋮ | Not stored |
| 70 - 79 | Stored |
| 80 - 100 | Not stored |

IMAGE DECODING APPARATUS, IMAGE CODING APPARATUS, IMAGE DECODING CIRCUIT, AND IMAGE DECODING METHOD

TECHNICAL FIELD

The present invention relates to an image decoding apparatus, an image coding apparatus, an image decoding circuit, and an image decoding method.

BACKGROUND ART

Recently, there have been widely-used standards for video compression techniques. Examples of such standards include H.261 and H.263 by the ITU-T (International Telecommunication Union Telecommunication Standardization Sector), MPEG (Moving Picture Experts Group)-1, MPEG-2, MPEG-4, etc. by the ISO/IEC (International Organization for Standardization/International Electrotechnical Commission), and H.264/MPEG-4 AVC (Advanced Video Coding) by the JVT (Joint Video Team) as a joint team of the ITU-T and the MPEG. Furthermore, the next generation video compression technique is now being studied by the ITU-T, the ISO/IEC, etc.

One of the important elements of an image compression technique is orthogonal transform that is performed to reduce redundancy in spatial direction. Here, orthogonal transform is an approach for reducing the amount of bits to be transmitted by performing bit allocation utilizing the nature that a cross correlation between adjacent pixels is high in an image signal and thus orthogonal transform using appropriate orthogonal transform bases produces variation in energy of transformed coefficients. For example, in image compression standards such as H.261, H.263, MPEG-1, MPEG-2, MPEG-4, and H.264 (MPEG-4 AVC), discrete cosine transform (hereinafter also referred to as "DCT") is used as such orthogonal transform. It is known that DCT provides, especially for a natural image signal, performance close to performance of the Karhunen-Loeve transform (hereinafter also referred to as "KLT") that is the optimum transform. A natural image in DCT has characteristics that energy is concentrated in the low frequency area and is little in the high frequency area.

On the other hand, the orthogonal transform proposed by ITU-T and ISO/IEC as being one of the next generation image compression techniques utilizes the Karhunen-Loeve transform that is the optimum transform in order to achieve a higher coding efficiency (Non Patent Literature (NPL) 1).

In general, when using the Karhunen-Loeve transform as orthogonal transform, information about orthogonal transform bases of a current image must be transmitted because such orthogonal transform bases depend on the content of the current image. For this reason, the amount of information required to be transmitted in the Karhunen-Loeve transform is larger, by the amount of the orthogonal transform bases, than in orthogonal transform such as DCT that does not require transmission of information about such bases. Here, orthogonal transform bases means an orthogonal transform matrix, and thus may be referred to as an orthogonal transform basis matrix.

On the other hand, Patent Literature 1 discloses an approach for increasing coding efficiency by deriving information about bases from a reference image in motion compensation, instead of including such information about the orthogonal transform bases in a coded stream. In addition, Patent Literature 1 discloses an approach for reducing the amount of information about such orthogonal transform bases required to be transmitted, by previously defining orthogonal transform bases to be used for decoding in orthogonal transform for each of prediction modes in intra prediction included in a coded stream, and performing switching between the orthogonal transform bases for decoding according to the prediction modes in the intra prediction.

FIG. 34 is a block diagram showing a structure of a conventional image decoding apparatus according to Patent Literature 1. An image decoding apparatus 1010 shown in FIG. 34 includes a motion compensation unit 1207, an inverse quantization unit 1215, an inverse orthogonal transform unit 1216, a variable length decoding unit 1220, a frame memory 1222, and a transform basis accumulation unit 1251. When a coded image stream 1214 is received by this image decoding apparatus 1010, the variable length decoding unit 1220 detects synchronization words indicating the starting portions of the frames included in the coded image stream 1214. Next, the variable length decoding unit 1220 recovers, for each of the macroblocks, orthogonal transform basis ID information 1250, a motion vector 1205, and a quantized orthogonal transform coefficient 1221 used for each unit of orthogonal transform.

The motion vector 1205 is transmitted to the motion compensation unit 1207. Here, the motion compensation unit 1207 extracts, from a frame memory 1222, a prediction image 1206 that is an image portion including a motion corresponding to the motion vector 1205. The quantized orthogonal transform coefficient 1221 is decoded after being subjected to processing by the inverse quantization unit 1215 and the inverse orthogonal transform unit 1216, and added to the prediction image 1206 to be a final decoded image 1217.

The transform basis accumulation unit 1251 stores the same orthogonal transform basis set Ai as the one stored at the image coding apparatus side. Based on the orthogonal transform basis ID information 1250, an orthogonal transform basis 1219 is selected, and the selected orthogonal transform basis 1219 is output to the inverse orthogonal transform unit 1216. The inverse orthogonal transform unit 1216 inversely transforms the orthogonal transform coefficient using the selected orthogonal transform basis 1219 to recover a signal on an image space. The decoded image 1217 is output to a display device with predetermined display timing, which results in reproduction of a video.

As described above, in order to decode an image stream coded using KLT requires storing orthogonal transform bases into the transform basis accumulation unit 1251 and reading the orthogonal transform bases from the transform basis accumulation unit 1251. For this reason, access for the reading and storage of the orthogonal transform basis information significantly increases the memory bandwidth and memory access latency required for the transform basis accumulation unit.

CITATION LIST

Patent Literature

[PTL 1]
Japanese Unexamined Patent Application Publication No. 3887178

Non Patent Literature

[NPL 1]
Improved Intra Coding, written by Kai Zhang et. al, ITU-Telecommunications Standardization Sector STUDY GROUP 16 Question 6 VIDEO Coding Experts Group (VCEG) document VCEG-AG11, October 2007

SUMMARY OF INVENTION

Technical Problem

However, the aforementioned conventional technique does not disclose a memory for storing orthogonal transform bases for use in orthogonal transform as proposed as the one of the next generation image compression techniques and memory access to the memory. Thus, the aforementioned conventional technique entails a problem of difficulty in reducing the memory bandwidth and the memory access latency required for a memory for storing orthogonal transform bases in the case of using such orthogonal transform.

The present invention has been conceived to solve the aforementioned problem with an aim to provide an image decoding apparatus, an image coding apparatus, an image decoding circuit, and an image decoding method which enable reduction in the memory bandwidth memory access latency required for the memory that stores orthogonal transform bases for use in orthogonal transform.

Solution to Problem

In order to solve the aforementioned problem, an image decoding apparatus according to the present invention is an image decoding apparatus which decodes a coded stream, including: a decoding unit configured to decode, from the coded stream, identification information identifying each of a plurality of orthogonal transform bases for use in inverse orthogonal transform of the coded stream; an accumulation unit configured to store the plurality of orthogonal transform bases for use in the inverse orthogonal transform of the coded stream; a storage unit configured to store at least one orthogonal transform basis which is required for current inverse orthogonal transform of a current block, out of the orthogonal transform bases stored in the accumulation unit; an inverse orthogonal transform unit configured to perform the current inverse orthogonal transform using the at least one orthogonal transform basis stored in the storage unit and identified based on the identification information; and a transfer control unit configured to transfer, from the accumulation unit to the storage unit, the at least one orthogonal transform basis identified based on the identification information.

The image decoding apparatus configured to have the above structure makes it possible to reduce the memory bandwidth and the memory access latency required for the memory storing the orthogonal transform bases for use in orthogonal transform.

In order to solve the aforementioned problem, an image decoding apparatus according to the present invention is an image coding apparatus which generates a coded stream, including: a generating unit configured to generate a plurality of orthogonal transform bases for use in orthogonal transform of the coded stream and identification information identifying each of the plurality of orthogonal transform bases; an accumulation unit configured to store the plurality of orthogonal transform bases generated by the generating unit; a storage unit configured to store at least one of the orthogonal transform bases stored in the accumulation unit, the at least one orthogonal transform basis being required for current orthogonal transform of a current block; an orthogonal transform unit configured to perform the current orthogonal transform using the at least one orthogonal transform basis stored in the storage unit and identified based on the identification information; and a transfer unit configured to transfer the at least one orthogonal transform basis identified based on the identification information from the accumulation unit to the storage unit, only when the at least one orthogonal transform basis identified based on the identification information is not yet stored in the storage unit.

It is to be noted that the present invention can be implemented not only as an apparatus but also as an integrated circuit including the processing units of the apparatus and can be realized as a method including the steps corresponding to the processing units of the apparatus.

Advantageous Effects of Invention

According to the present invention, it is possible to achieve an image decoding apparatus, an image coding apparatus, an image decoding circuit, and an image decoding method which enable reduction in the memory bandwidth and the memory access latency required for the memory storing the orthogonal transform bases for use in orthogonal transform.

BRIEF DESCRIPTION OF DRAWINGS

FIG. 1 is a block diagram showing a structure of a decoding apparatus according to Embodiment 1 of the present invention.

FIG. 2C is an illustration showing an example of the coded stream according to the present invention.

FIG. 3 is an example of information held in a management table for storage states of orthogonal transform bases according to the present invention.

FIG. 5 is a block diagram showing essential structural elements of a decoding apparatus according to Embodiment 1 of the present invention.

FIG. 6 is a block diagram showing a structure of a decoding apparatus according to Embodiment 2 of the present invention.

FIG. 7A is an example of information held in a management table for reference history of orthogonal transform bases according to the present invention.

FIG. 7B is an example of information held in a management table for reference history of orthogonal transform bases according to the present invention.

FIG. 10 is an example of information held in a management table for statistical information of orthogonal transform bases according to the present invention.

FIG. 11 is an example of information held in a management table for statistical information of orthogonal transform bases according to the present invention.

FIG. 19 is an example of information held in a management table for storage states of orthogonal transform bases.

DESCRIPTION OF EMBODIMENTS

Hereinafter, embodiments of the present invention will be described with reference to the drawings.

Embodiment 1

Figure 2A:
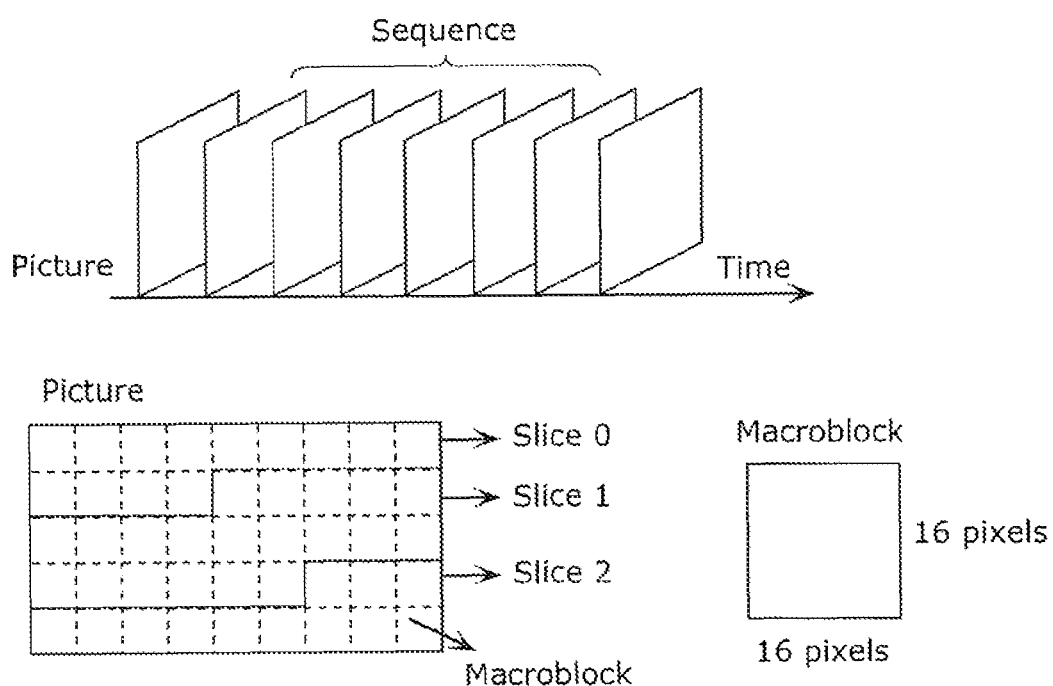
FIG. 2A is an illustration showing schematic structures of a coded stream generated according to a standard of an image compression technique.
Figure 2B:
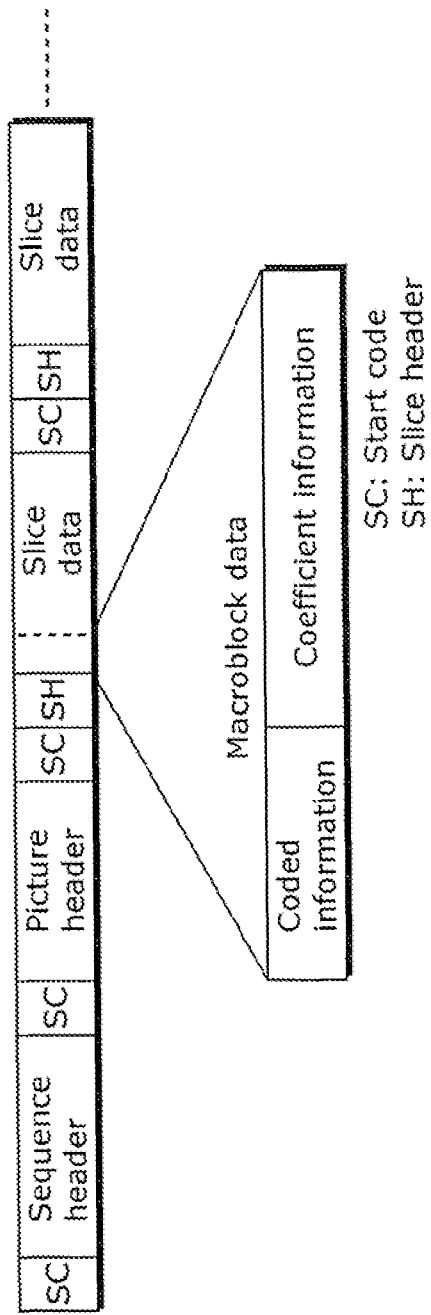
FIG. 2B is an illustration showing schematic structures of the coded stream generated according to the standard of the image compression technique.

FIG. 1 is a block diagram showing a structure of a decoding apparatus according to Embodiment 1 of the present invention. Each of FIG. 2A and FIG. 2B is an illustration showing schematic structures of a coded stream generated according to a standard of a video compression technique. FIG. 2C is an illustration showing an example of a coded stream according to the present invention. FIG. 3 is an example of information held in a management table for storage states of orthogonal transform bases according to the present invention.

The decoding apparatus 100 shown in FIG. 1 is an image decoding apparatus which decodes a coded stream including identification information identifying orthogonal transform bases (an orthogonal transform basis matrix) for use in inverse orthogonal transform. This decoding apparatus 100 includes a decoding unit 101, an orthogonal transform basis transfer control unit 102, an orthogonal transform basis storage unit 103, a management table for storage states of orthogonal transform bases 104, a reference image transfer control unit 105, a reference image storage unit 106, a prediction image generating unit 107, an adder 108, a memory 109, an orthogonal transform basis accumulation unit 110, an inverse quantization unit 111, and an inverse orthogonal transform unit 112.

The decoding unit 101 decodes, from a coded stream, identification information identifying orthogonal transform bases for use in inverse orthogonal transform. More specifically, the decoding unit 101 has a function of decoding a coded stream generated according to a standard of a video compression technique, and outputting at least header information and quantized coefficients.

Here, the coded stream according to the standard of the video compression technique is explained with reference to FIGS. 2A and 2B. As shown in FIG. 2A, a sequence of images (video) in the coded stream has a hierarchical structure. For example, a sequence of plural pictures (or a GOP that is a Group Of Pictures) is given here as an example. Each of the pictures that make up the sequence is divided into slices, and is further divided into macroblocks each composed of 16×16 pixels. It is to be noted that a picture may not be divided into slices. The decoding apparatus 100 performs decoding in units of a slice or a macroblock.

As shown in FIG. 2B, these units are coded hierarchically in the coded stream. The coded stream is configured to include a sequence header for controlling a sequence, a picture header for controlling a picture, a slice header for controlling a slice, macroblock data, and the like. The macroblock data is classified into (i) coded information of a marcroblock type, an intra-picture prediction (intra prediction) mode, motion vector information, quantized parameters, and (ii) coefficient information corresponding to each pixel data. In the H.264 Standard, the sequence header is referred to as a Sequence Parameter Set (SPS), and the picture header is referred to as a Picture Parameter Set (PPS).

Hereinafter, it is assumed that the header of a GOP or a sequence includes all of (i) orthogonal transform bases (an orthogonal transform matrix) for use in inverse transform of each of pictures in the GOP or the sequence and (ii) identification information (hereinafter also referred to as "orthogonal transform basis ID") items each of which identifies a corresponding one of the orthogonal transform bases for use in the inverse orthogonal transform. Furthermore, it is assumed that a macroblock which is an example of a unit of coding a picture includes only the orthogonal transform basis ID for use in inverse transform of the macroblock.

Here, such orthogonal transform basis and the orthogonal transform basis ID may be included in units of a picture, instead of in units of a GOP or a sequence. Furthermore, the header of a GOP or a sequence may include only the orthogonal transform basis ID used for a plurality of pictures in the GOP or the sequence, and the header of each macroblock (a unit of coding) in the pictures may include only the orthogonal transform basis ID used for the macroblock (the unit of coding). Alternatively, as shown in FIG. 2C, only the orthogonal transform ID used for a plurality of pictures in the GOP or the sequence may be included in units of a picture, instead of in units of a GOP or a sequence, and the header of each macroblock (a unit of coding) may include only the orthogonal transform ID used for the macroblock (the unit of coding). Alternatively, the aforementioned units may be arbitrarily combined, or another combination of other units may be used as such a unit instead.

The orthogonal transform basis transfer control unit 102 corresponds to a transfer control unit in the CLAIMS of the present application, and transfers the orthogonal transform basis identified based on the identification information (orthogonal transfer basis ID) from the orthogonal transform basis accumulation unit 110 to the orthogonal transform basis storage unit 103.

The orthogonal transform basis transfer control unit 102 transfers the orthogonal transform basis identified based on the identification information (orthogonal transform basis ID) from the orthogonal transform basis accumulation unit 110 to the orthogonal transform basis storage unit 103 only when the orthogonal transform basis identified as the orthogonal transform basis for use in the inverse orthogonal transform based on the identification information is not yet stored in the orthogonal transform basis storage unit 103. More specifically, the orthogonal transform basis transfer control unit 102 has a function of writing, into the orthogonal transform basis accumulation unit 110, orthogonal transform bases defined in the coded stream as being for use in inverse orthogonal transform. In addition, the orthogonal transform basis transfer control unit 102 has a function of referring to information held in the management table for storage states of orthogonal transform bases 104, based on the orthogonal transform basis ID that is information indicating the orthogonal transform basis for use in a current inverse orthogonal transform process and included in the header information decoded by the decoding unit 101. Furthermore, the orthogonal transform basis transfer control unit 102 checks whether or not the orthogonal transform basis indicated by the orthogonal transform basis ID is stored in the orthogonal transform basis storage unit 103, based on information in the management table for storage states of orthogonal transform bases 104.

For example in the case where the orthogonal transform basis transfer control unit 102 finds out that the orthogonal transform basis indicated by the orthogonal transform basis transform ID is not yet stored in the orthogonal transform basis storage unit 103, the orthogonal transform basis transfer control unit 102 reads out the orthogonal transform basis indicated by the orthogonal transform basis ID from the orthogonal transform basis accumulation unit 110, and writes the orthogonal transform basis into the orthogonal transform basis storage unit 103 (transfers it thereto). In the opposite case where the orthogonal transform basis transfer control unit 102 finds out that the orthogonal transform basis indicated by the orthogonal transform basis transform ID is already stored in the orthogonal transform basis storage unit 103, the orthogonal transform basis transfer control unit 102 does not read out the orthogonal transform basis from the orthogonal transform basis accumulation unit 110 (does not transfer it therefrom).

Here, the orthogonal transform basis transfer control unit 102 may issue, to the decoding unit 101, only a write instruction for writing the orthogonal transform basis into the orthogonal transform basis accumulation unit 110, and the decoding unit 101 may write the orthogonal transform basis into the orthogonal transform basis accumulation unit 110. Likewise, the orthogonal transform basis transfer control unit 102 may issue, to the orthogonal transform basis storage unit 103, only a read instruction for reading the orthogonal transform basis indicated by the orthogonal transform basis ID from the orthogonal transform basis accumulation unit 110, and the orthogonal transform basis storage unit 103 may read out the orthogonal transform basis indicated by the orthogonal transform basis ID from the orthogonal transform basis accumulation unit 110 and store the read-out orthogonal transform basis.

The orthogonal transform basis storage unit 103 corresponds to a storage unit in the CLAIMS of the present application, and is intended to store the orthogonal transform basis required to perform inverse orthogonal transform, from among the plurality of orthogonal transform bases stored in the orthogonal transform basis accumulation unit 110. More specifically, the orthogonal transform basis storage unit 103 has a function of storing at least one kind of orthogonal transform basis transferred from the orthogonal transform basis accumulation unit 110, and a function of setting the orthogonal transform basis indicated by the orthogonal transform basis ID to the inverse orthogonal transform unit 112.

The management table for storage states of orthogonal transform bases 104 corresponds to a storage state management unit in the CLAIMS of the present application. The management table for storage states of orthogonal transform bases 104 manages information indicating whether or not the orthogonal transform basis storage unit 103 stores the orthogonal transform bases identified based on the identification information (the orthogonal transform basis ID). More specifically, the management table for storage states of orthogonal transform bases 104 has a function of receiving an input of orthogonal transform basis ID and outputting information indicating whether or not the orthogonal transform basis indicated by the orthogonal transform basis ID is already stored in the orthogonal transform basis storage unit 103.

The management table for storage states of orthogonal transform bases 104 holds, for example, information as shown in FIG. 3. More specifically, the management table for storage states of orthogonal transform bases 104 holds all the pieces of the orthogonal transform basis ID included in the header information such as sequence headers and picture headers in the coded stream to be decoded by the decoding unit 101. Furthermore, the management table for storage states of orthogonal transform bases 104 holds, as the storage states, information indicating whether or not the orthogonal transform basis storage unit 103 stores the orthogonal transform bases identified based on the respective pieces of orthogonal transform basis ID.

The reference image transfer control unit 105 has a function of reading out, from the memory 109, reference pixels required to generate prediction images, based on the header information including prediction modes, motion vectors, and reference picture information output by the decoding unit 101, and writing the reference images to the reference image storage unit 106.

It is to be noted that the reference image transfer control unit 105 may issue only a read instruction to the reference image storage unit 106 based on the header information including the motion vectors and the reference picture information output by the decoding unit 101, so that the reference image storage unit 106 reads out, from the memory 109, the reference pixels required to generate the prediction images and stores the read-out reference pixels required to generate the prediction images.

The reference image storage unit 106 has a function of storing the reference pixels transferred from the memory 109.

The prediction image generating unit 107 has a function of obtaining the header information such as the prediction modes and the orthogonal transform basis ID output by the decoding unit 101 and the reference pixels required to generate the prediction images and stored in the reference image storage unit 106. The prediction image generating unit 107 has a function of generating prediction images using these pieces of information and outputting these pieces of information to the adder 108.

The adder 108 has a function of adding a prediction error signal output by the inverse orthogonal transform unit 112 and a prediction image output by the prediction image generating unit 107, and outputs the resulting image as a decoded image, and a function of transferring (outputting) the decode image to the memory 109.

The memory 109 has a function of storing a reference picture referred to by the prediction image generating unit 107.

The orthogonal transform basis accumulation unit 110 corresponds to the storage unit in the CLAIMS of the present invention, and is intended to store a plurality of orthogonal transform bases for use in inverse orthogonal transform of a coded stream. More specifically, the orthogonal transform basis accumulation unit 110 has a function of storing orthogonal transform bases used for the inverse orthogonal transform by the inverse orthogonal transform unit 112. Here, the orthogonal transform basis accumulation unit 110 may be a storage unit other than the memory 109. However, the same storage unit may function as the orthogonal transform basis accumulation unit 110 and the memory 109.

The inverse quantization unit 111 has a function of inversely quantizing quantized coefficients output by the decoding unit 101 and outputting the orthogonal transform coefficients.

The inverse orthogonal transform unit 112 performs such inverse orthogonal transform using an orthogonal transform basis stored in the orthogonal transform basis storage unit 103 and identified based on the identification information (orthogonal transform basis ID). More specifically, the inverse orthogonal transform unit 112 has a function of performing inverse orthogonal transform on an orthogonal transform coefficient output by the inverse quantization unit 111 using the orthogonal transform basis output by the orthogonal transform basis storage unit 103 and outputting a prediction error signal.

Figure 4:
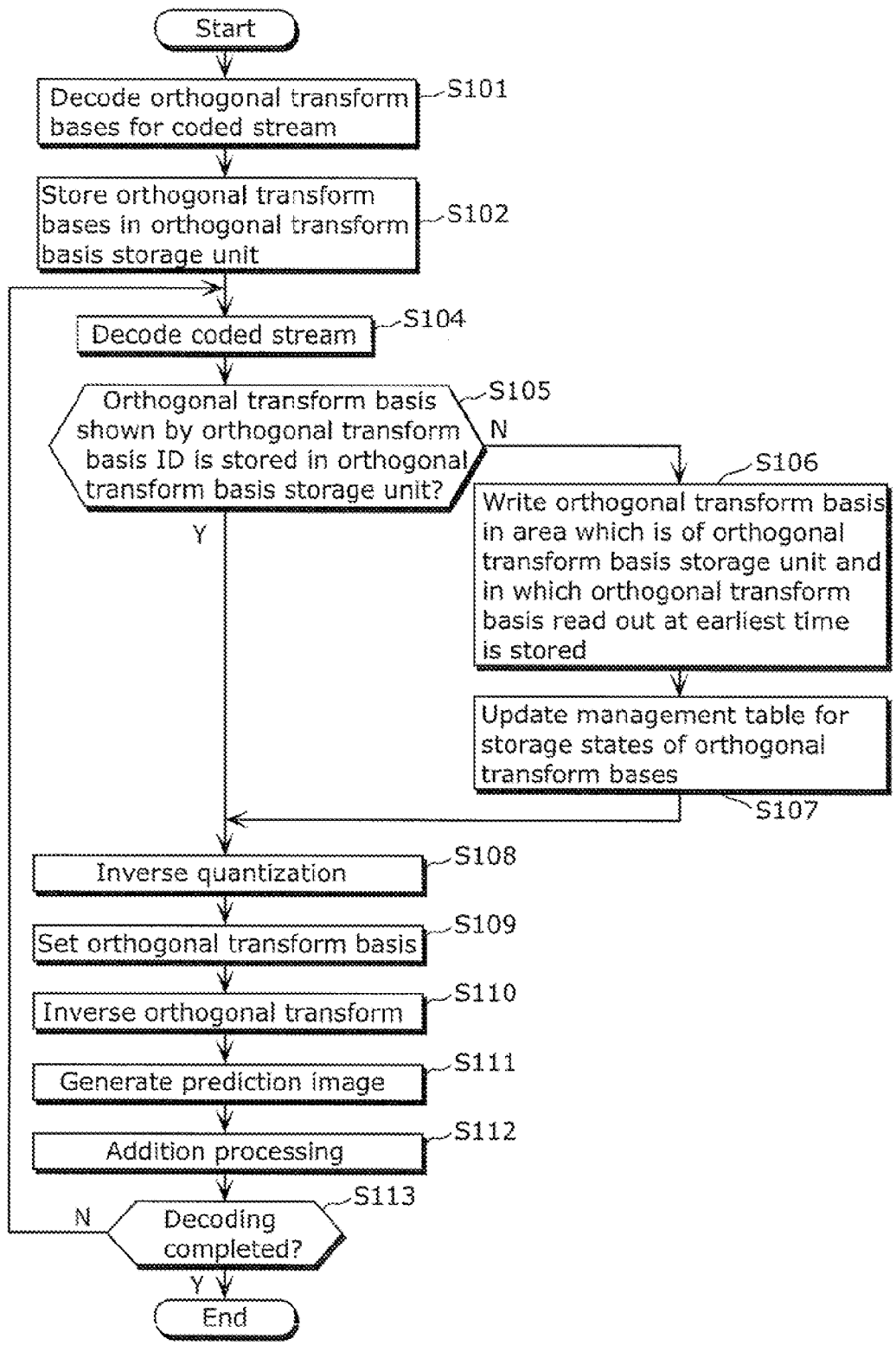
FIG. 4 is a flowchart of the decoding operations performed by the decoding apparatus according to Embodiment 1 of the present invention.

Next, a description is given of decoding operations performed by the decoding apparatus 100 configured as mentioned above. FIG. 4 is a flowchart of the decoding operations performed by the decoding apparatus according to Embodiment 1 of the present invention.

As shown in FIG. 4, in the decoding apparatus 100, the decoding unit 101 decodes the header information in an input coded stream (S101), and outputs, as header information, at least one orthogonal transform basis. Next, the orthogonal transform basis transfer control unit 102 writes, to the orthogonal transform basis accumulation unit 110, all the orthogonal transform bases decoded, in Step S101, by the decoding unit 101 (S102).

Next, the decoding unit 101 decodes the header information and the quantized coefficients of the plurality of pictures (or macroblocks making up the plurality of pictures) composing the coded stream (S104), and outputs at least the orthogonal transform basis ID as header information.

Next, the orthogonal transform basis transfer control unit 102 checks whether or not the orthogonal transform basis storage unit 103 stores the orthogonal transform bases indicated by the pieces of orthogonal transform basis ID decoded in S104, with reference to the management table for storage states of orthogonal transform bases (S105).

In the case where the orthogonal transform basis indicated by the orthogonal transform basis ID is not yet stored in the orthogonal transform basis storage unit 103, the orthogonal transform basis transfer control unit 102 reads out the orthogonal transform basis indicated by the orthogonal transform basis ID from the orthogonal transform basis accumulation unit 110. Next, the orthogonal transform basis transfer control unit 102 writes the read-out orthogonal transform basis in an area which is of the orthogonal transform basis storage unit 103 and stores the orthogonal transform basis read out from the orthogonal transform basis accumulation unit 110 at earliest time (S106). Next, the orthogonal transform basis transfer control unit 102 updates the management table for storage states of orthogonal transform bases 104 (S107). More specifically, the orthogonal transform basis transfer control unit 102 updates, to "held", the storage state which is of the read-out orthogonal transform basis and is indicated in the management table for storage states of orthogonal transform bases 104, and updates the orthogonal transform basis storage state of the erased orthogonal transform basis to "not held".

In the opposite case where the orthogonal transform basis indicated by the orthogonal transform basis ID is already stored in the orthogonal transform basis storage unit 103 (Yes in S105), the orthogonal transform basis transfer control unit 102 does not read out the orthogonal transform basis from the orthogonal transform basis accumulation unit 110, and proceeds to S108.

Next, the inverse quantization unit 111 inversely quantizes the quantized coefficients of the picture (or the macroblocks making up the picture) output by the decoding unit, and outputs the quantized orthogonal transform coefficients (S108).

Next, the inverse orthogonal transform unit 112 reads out the orthogonal transform basis stored in the orthogonal transform basis storage unit 103, and sets the read-out orthogonal transform basis as the orthogonal transform basis for use in current inverse orthogonal transform (S109). The inverse orthogonal transform unit 112 performs inverse orthogonal transform on the orthogonal transform coefficients of the picture (or the macroblocks making up the picture) output by the inverse quantization unit 111, using the set orthogonal transform basis (S110), and outputs a prediction error signal to the adder 108.

Next, the prediction image generating unit 107 generates a prediction image (S111). More specifically, the reference image transfer control unit 105 reads out a reference image used to generate a prediction image from the memory 109 as necessary, based on the prediction mode, the motion vector, and the reference picture information decoded and output by the decoding unit 101 in S104, and writes the reference image into the reference image storage unit 106. The prediction image generating unit 107 sets the prediction mode and motion vector decoded and output by the decoding unit 101 in S104, reads out the reference image stored in the reference image storage unit 106 as necessary, and performs intra prediction or inter prediction to generate the prediction image. The prediction image generating unit 107 outputs the generated prediction image to the adder 108.

Next, the adder 108 adds the prediction image output by the prediction image generating unit 107 in S111 and the prediction residual signal output by the inverse orthogonal transform unit 112 in S110 (S112).

Next, the decoding unit 101 determines whether or not the decoding of the whole coded stream is already completed (S113). When the answer is YES (Y in S113), the decoding unit 101 completes the decoding. On the other hand, when there remains any block that is not yet decoded (N in S113), the decoding unit 101 returns to S104 and repeats S104 and the following processing.

In this way, the decoding apparatus 100 performs the decoding operations.

It is to be noted that, when the decoding apparatus 100 decodes the images (pictures) included in a sequence or a GOP, the decoding apparatus 100 writes, in S102, all of the orthogonal transform bases decoded by the decoding unit 101 in Step S101 to the orthogonal transform basis accumulation unit 110 without writing all of the orthogonal transform bases in the management table for storage states of orthogonal transform bases 104. By repeating the processes from S104 to S113, some of the orthogonal transform bases are stored in the orthogonal transform basis storage unit 103.

As described above, according to this embodiment, when it is found that the orthogonal transform basis indicated by orthogonal transform basis ID is already present in the orthogonal transform basis storage unit 103 with reference to the management table for storage states of orthogonal transform bases 104, the orthogonal transform basis is not read out from the orthogonal transform basis accumulation unit 110. For this reason, it is possible to reduce the number of times of access to the orthogonal transform basis accumulation unit 110. In this way, it is possible to reduce the memory bandwidth and the memory access latency related to the orthogonal transform basis accumulation unit 110.

In this embodiment, in the case where the orthogonal transform basis indicated by the orthogonal transform basis ID is not yet stored in the orthogonal transform basis storage unit 103, the orthogonal transform basis transfer control unit 102 reads out the orthogonal transform basis indicated by the orthogonal transform basis ID from the orthogonal transform basis accumulation unit 110. Next, the orthogonal transform basis transfer control unit 102 writes the read-out orthogonal transform basis in an area which is of the orthogonal transform basis storage unit 103 and stores the orthogonal transform basis read out from the orthogonal transform basis accumulation unit 110 at earliest time. However, this area selection method is exemplary. For example, the orthogonal transform basis may be written to an area which stores the orthogonal transform basis read out from the orthogonal transform basis accumulation unit 110 most recently. Alternatively, the orthogonal transform basis may be written to an area which stores another orthogonal transform basis and is selected at random. Any other area selection method is possible as long as the method enables reduction in the access to the orthogonal transform basis accumulation unit 110 and reduction in the required capacity of the orthogonal transform basis storage unit 103.

In this embodiment, the orthogonal transform basis accumulation unit 110 is a storage unit other than the memory 109, but the same storage unit may function as the orthogonal transform basis accumulation unit 110 and the memory 109.

In this embodiment, the orthogonal transform bases are included in the coded stream. However, this is exemplary. It is also good that only the orthogonal transform basis ID is included in a coded stream, and that orthogonal transform bases predefined between a coding apparatus and a decoding apparatus may be stored in the orthogonal transform basis accumulation unit 110.

In this embodiment, the decoding apparatus 100 includes a decoding unit 101, an orthogonal transform basis transfer control unit 102, an orthogonal transform basis storage unit 103, a management table for storage states of orthogonal transform bases 104, a reference image transfer control unit 105, a reference image storage unit 106, a prediction image generating unit 107, an adder 108, a memory 109, an orthogonal transform basis accumulation unit 110, an inverse quantization unit 111, and an inverse orthogonal transform unit 112. However, this structure is exemplary. As shown in FIG. 5, it is only necessary that the decoding apparatus 100 includes a decoding apparatus unit 10 as its essential element. Specifically, it is only necessary for the decoding apparatus 100 to include the decoding apparatus unit 10 including the decoding unit 101, the orthogonal transform basis transfer control unit 102, the orthogonal transform basis storage unit 103, the orthogonal transform basis accumulation unit 110, and the inverse orthogonal transform unit 112.

More specifically, the decoding apparatus unit 10 may be an image decoding apparatus which decodes a coded stream including identification information (orthogonal transform basis ID) identifying an orthogonal transform basis for use in inverse orthogonal transform and include: a decoding unit 101 configured to decode, from the coded stream, identification information (orthogonal transform basis ID); an orthogonal transform basis accumulation unit 110 configured to store a plurality of orthogonal transform bases for use in the inverse orthogonal transform of the coded stream; an orthogonal transform basis storage unit 103 configured to store an orthogonal transform basis required for current inverse orthogonal transform, from among the plurality of orthogonal transform bases stored in the orthogonal transform basis accumulation unit 110; an inverse orthogonal transform unit 112 configured to perform the inverse orthogonal transform using the orthogonal transform basis stored in the orthogonal transform basis storage unit 103 and identified based on the identification information (the orthogonal transform basis ID); and an orthogonal transform basis transfer control unit 102 configured to transfer the orthogonal transform basis identified based on the identification information (orthogonal transfer basis ID) from the orthogonal transform basis accumulation unit 110 to the orthogonal transform basis storage unit 103 only when the orthogonal transform basis identified based on the identification information (the orthogonal transform basis ID) is not yet stored in the orthogonal transform basis storage unit 103.

In the decoding apparatus 100 including the decoding apparatus unit 10 as its essential element, the orthogonal transform basis transfer control unit 102 transfers, to the orthogonal transform basis storage unit 103, at least one of the orthogonal transform bases stored in the orthogonal transform basis accumulation unit 110 and for use in current inverse orthogonal transform, and the orthogonal transform basis storage unit 103 stores the transferred at least one orthogonal transform basis. In this way, it is possible to reduce the number of times of direct access to the orthogonal transform basis accumulation unit 110.

Embodiment 2

FIG. 6 is a block diagram showing a structure of a decoding apparatus according to Embodiment 2 of the present invention. Each of FIG. 7A and FIG. 7B is an example of information held in the management table for reference history of orthogonal transform bases. In FIG. 6, the same structural elements as those in FIG. 1 are assigned with the same reference signs, and the same descriptions thereof are not repeated.

The decoding apparatus 200 shown in FIG. 6 includes a decoding unit 101, an orthogonal transform basis transfer control unit 102, an orthogonal transform basis storage unit 103, a management table for storage states of orthogonal transform bases 104, a reference image transfer control unit 105, a reference image storage unit 106, a prediction image generating unit 107, an adder 108, a memory 109, an orthogonal transform basis accumulation unit 110, an inverse quantization unit 111, an inverse orthogonal transform unit 112, and a management table for reference history of orthogonal transform bases 201. Unlike the decoding apparatus 100 according to Embodiment 1, the decoding apparatus 200 shown in FIG. 6 includes the management table for reference history of orthogonal transform bases 201.

The management table for reference history of orthogonal transform bases 201 corresponds to a reference history management unit in the CLAIMS of the present application. The management table for reference history of orthogonal transform bases 201 manages, for each of the orthogonal transform bases included in a coded stream, use history information indicating the number of times of reference from the start of the decoding. More specifically, the management table for reference history of orthogonal transform bases 201 has a function of receiving an input of the orthogonal transform basis ID and outputting the number of times of reference to the orthogonal transform basis from the start of the decoding, based on the orthogonal transform basis ID in the orthogonal transform basis storage unit 103. The management table for reference history of orthogonal transform bases 201 holds, for example, information as shown in FIG. 7A. More specifically, the management table for reference history of orthogonal transform bases 201 holds, as the orthogonal transform basis ID, the orthogonal transform basis ID included in, for example, the header information of the coded stream to be decoded by the decoding unit 101. Furthermore, the management table for reference history of orthogonal transform bases 201 holds, as the number of times of reference by which each of the orthogonal transform bases identified based on the corresponding orthogonal transform basis ID has been referred to in the stream from the start of the decoding.

Here, the management table for reference history of orthogonal transform bases 201 may have a function of receiving an input of orthogonal transform basis ID and outputs a reference order indicating how many times before the orthogonal transform basis indicated by the orthogonal transform basis ID was referred to in the sequential inverse orthogonal transform processing currently being performed by the inverse orthogonal transform unit 112. In this case, the management table for reference history of orthogonal transform bases 201 holds, for example, information as shown in FIG. 7B. More specifically, the management table for reference history of orthogonal transform bases 201 holds, as the orthogonal transform basis ID, the orthogonal transform basis ID included in, for example, the header information of the coded stream to be decoded by the decoding unit 101. Furthermore, the management table for reference history of orthogonal transform bases 201 holds, as the reference order, information (a value) indicating how many times before the orthogonal transform basis indicated by the orthogonal transform basis ID was referred to last in the sequential inverse orthogonal transform processing that is currently being performed by the inverse orthogonal transform unit 112.

Figure 8:
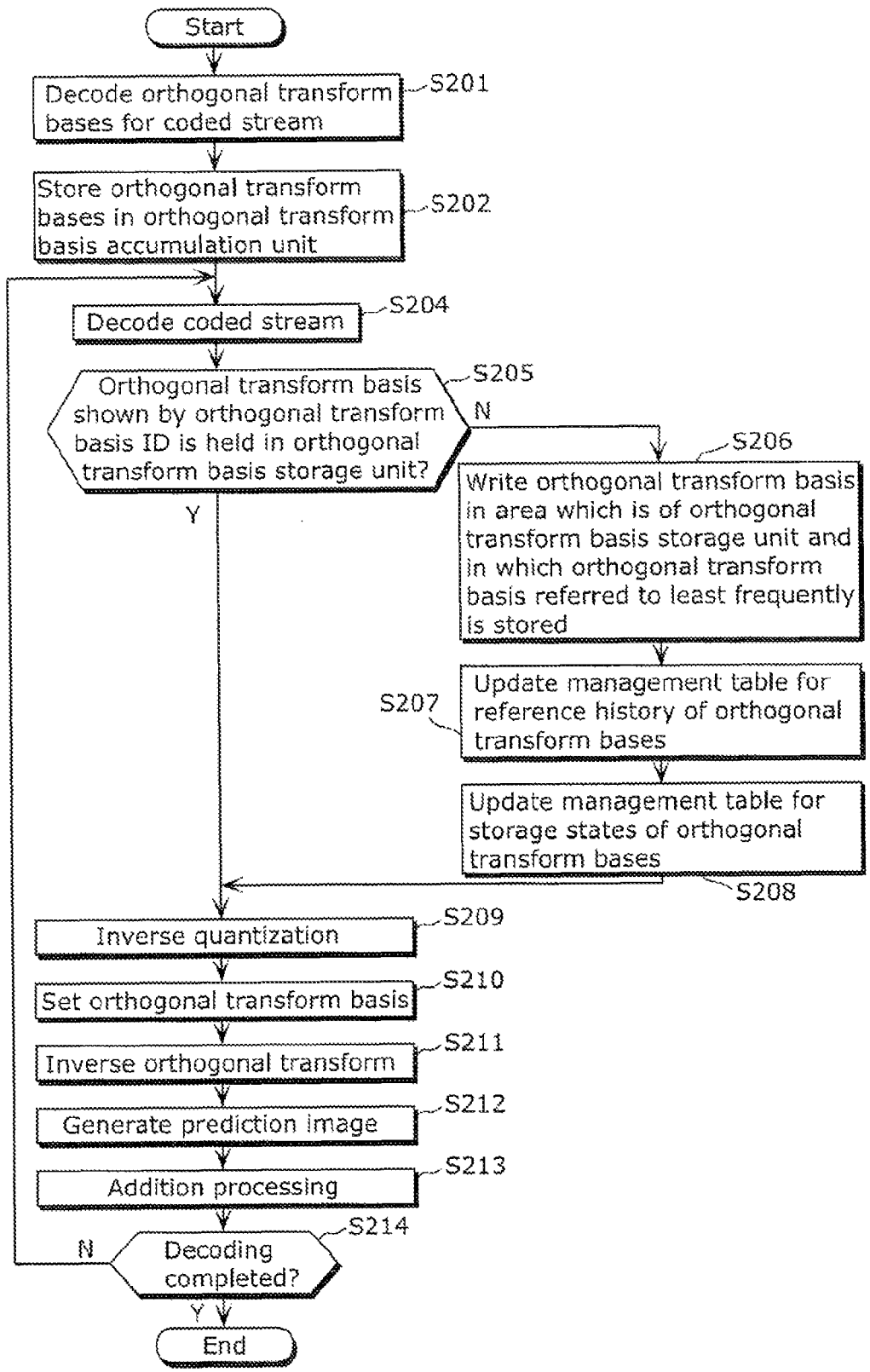
FIG. 8 is a flowchart of the decoding operations performed by the decoding apparatus according to Embodiment 2 of the present invention.

Next, a description is given of decoding operations performed by the decoding apparatus 200 configured as mentioned above. FIG. 8 is a flowchart of the decoding operations performed by the decoding apparatus according to Embodiment 2 of the present invention.

As shown in FIG. 8, in the decoding apparatus 200, the decoding unit 101 decodes the header information in an input coded stream (S201), and outputs, as header information, at least one orthogonal transform basis. Next, the orthogonal transform basis transfer control unit 102 writes, to the orthogonal transform basis accumulation unit 110, all the orthogonal transform bases decoded, in Step S201, by the decoding unit 101 (S202).

Next, the decoding unit 101 decodes the header information and the quantized coefficients of the plurality of pictures (or macroblocks making up the plurality of pictures) composing the coded stream (S204), and outputs at least the orthogonal transform basis ID as header information.

Next, the orthogonal transform basis transfer control unit 102 checks whether or not the orthogonal transform basis storage unit 103 stores each of the orthogonal transform bases indicated by the pieces of orthogonal transform basis ID decoded in S204, with reference to the management table for storage states of orthogonal transform bases 104 (S205).

In the case where the orthogonal transform basis indicated by the orthogonal transform basis ID is not yet held in the orthogonal transform basis storage unit 103 (in the case of N in S205), the orthogonal transform basis transfer control unit 102 reads out the orthogonal transform basis indicated by the orthogonal transform basis ID from the orthogonal transform basis accumulation unit 110. In addition, the orthogonal transform basis transfer control unit 102 writes the orthogonal transform basis to an area which is of the orthogonal transform basis storage unit 103 and stores the orthogonal transform basis referred to least frequently so far (S206). Here, the orthogonal transform basis transfer control unit 102 identifies the orthogonal transform basis referred to least frequently with reference to the management table for reference history of orthogonal transform bases 201.

Next, the orthogonal transform basis transfer control unit 102 updates the management table for reference history of orthogonal transform bases 201 (S207). Next, the orthogonal transform basis transfer control unit 102 increments the number of times of reference of the orthogonal transform basis referred to in the management table for reference history of orthogonal transform bases 201.

In addition, the orthogonal transform basis transfer control unit 102 updates the management table for storage states of orthogonal transform bases 104 (S208). More specifically, the orthogonal transform basis transfer control unit 102 updates, to "held", the storage state which is of the read-out orthogonal transform basis and is indicated in the management table for storage states of orthogonal transform bases 104, and updates the orthogonal transform basis storage state of the erased orthogonal transform basis to "not held".

In the opposite case where the orthogonal transform basis indicated by the orthogonal transform basis ID is already stored in the orthogonal transform basis storage unit 103 (Yes in S205), the orthogonal transform basis transfer control unit 102 does not read out the orthogonal transform basis from the orthogonal transform basis accumulation unit 110, and proceeds to S209.

Next, the inverse quantization unit 111 inversely quantizes the quantized coefficients of the picture (or the macroblocks making up the picture) output by the decoding unit 101, and outputs orthogonal transform coefficients (S209).

Next, the inverse orthogonal transform unit 112 reads out the orthogonal transform bases stored in the orthogonal transform basis storage unit 103, and sets the read-out orthogonal transform bases as the orthogonal transform bases for use in inverse orthogonal transform (S210). The inverse orthogonal transform unit 112 performs inverse orthogonal transform on the orthogonal transform coefficients of the picture (or the macroblocks making up the picture) output by the inverse quantization unit 111, using the set orthogonal transform bases (S211), and outputs a prediction error signal to the adder 108.

Next, the prediction image generating unit 107 generates a prediction image (S212). More specifically, the reference image transfer control unit 105 reads out a reference image used to generate a prediction image from the memory 109 as necessary, based on the prediction mode, the motion vector, and the reference picture information decoded and output by the decoding unit 101 in S204, and writes the reference image into the reference image storage unit 106. The prediction image generating unit 107 sets the prediction mode and the motion vector decoded by the decoding unit 101 in S204, reads out the reference image stored in the reference image storage unit 106 as necessary, and performs intra prediction or inter prediction to generate the prediction image. The prediction image generating unit 107 outputs the generated prediction image to the adder 108.

Next, the adder 108 adds the prediction image output by the prediction image generating unit 107 in S212 and the prediction residual signal output by the inverse orthogonal transform unit 112 in S211 (S212).

Next, the decoding unit 101 determines whether or not the decoding of the whole coded stream is already completed (S214). When the answer is YES (Y in S214), the decoding unit 101 completes the decoding. On the other hand, when there remains any block that is not yet decoded (N in S214), the decoding unit 101 returns to S204 and repeats S204 and the following processing.

In this way, the decoding apparatus 200 performs the decoding operations.

As described above, according to this embodiment, the orthogonal transform basis referred to least frequently is identified with reference to the management table for reference history of orthogonal transform bases 201. In addition, the orthogonal transform basis transfer control unit 102 writes the orthogonal transform bases to an area which is of the orthogonal transform basis storage unit 103 and stores the orthogonal transform bases referred to least frequently so far. Accordingly, the orthogonal transform basis unlikely to be referred to is not stored in the orthogonal transform basis storage unit 103. Thus, it is possible to hold the orthogonal transform basis highly likely to be referred to frequently in the orthogonal transform basis storage unit 103. As a result, it is possible to reduce the number of times of access to the orthogonal transform basis accumulation unit 110.

For this reason, it is possible to reduce the memory bandwidth and the memory access latency required for the orthogonal transform basis.

In this embodiment, when the orthogonal transform basis storage unit 103 does not store the orthogonal transform basis indicated by the orthogonal transform basis ID, the orthogonal transform basis referred to least frequently is identified with reference to the management table for reference history of orthogonal transform bases 201. In the above description, the orthogonal transform basis transfer control unit 102 reads out, from the orthogonal transform basis accumulation unit 110, the orthogonal transform basis indicated by the orthogonal transform basis ID, and writes the read-out orthogonal transform basis to an area which is of the orthogonal transform basis storage unit 103 and stores the orthogonal transform basis referred to least frequently. However, the area to which the orthogonal transform basis is written is not limited thereto. For example, the orthogonal transform basis may be written to: an area that stores the orthogonal transform basis used least frequently recently (a predetermined past period); an area that stores the orthogonal transform basis used most frequently recently; or an area that stores the orthogonal transform basis referred to most frequently so far. Any other area selection method is possible as long as the method enables reduction in the access to the orthogonal transform basis accumulation unit 110 and reduction in the required capacity of the orthogonal transform basis storage unit 103.

In this embodiment, the orthogonal transform basis accumulation unit 110 is a storage unit other than the memory 109, but the same storage unit may function as the orthogonal transform basis accumulation unit 110 and the memory 109. In other words, the orthogonal transform basis accumulation unit 110 may be configured to include or to be included in the memory 109.

In this embodiment, the orthogonal transform bases are included in the coded stream. However, this is exemplary. It is also good that only the orthogonal transform basis ID is included in a coded stream, and that orthogonal transform bases predefined between a coding apparatus and a decoding apparatus may be stored in the orthogonal transform basis accumulation unit 110.

Embodiment 3

Figure 9:
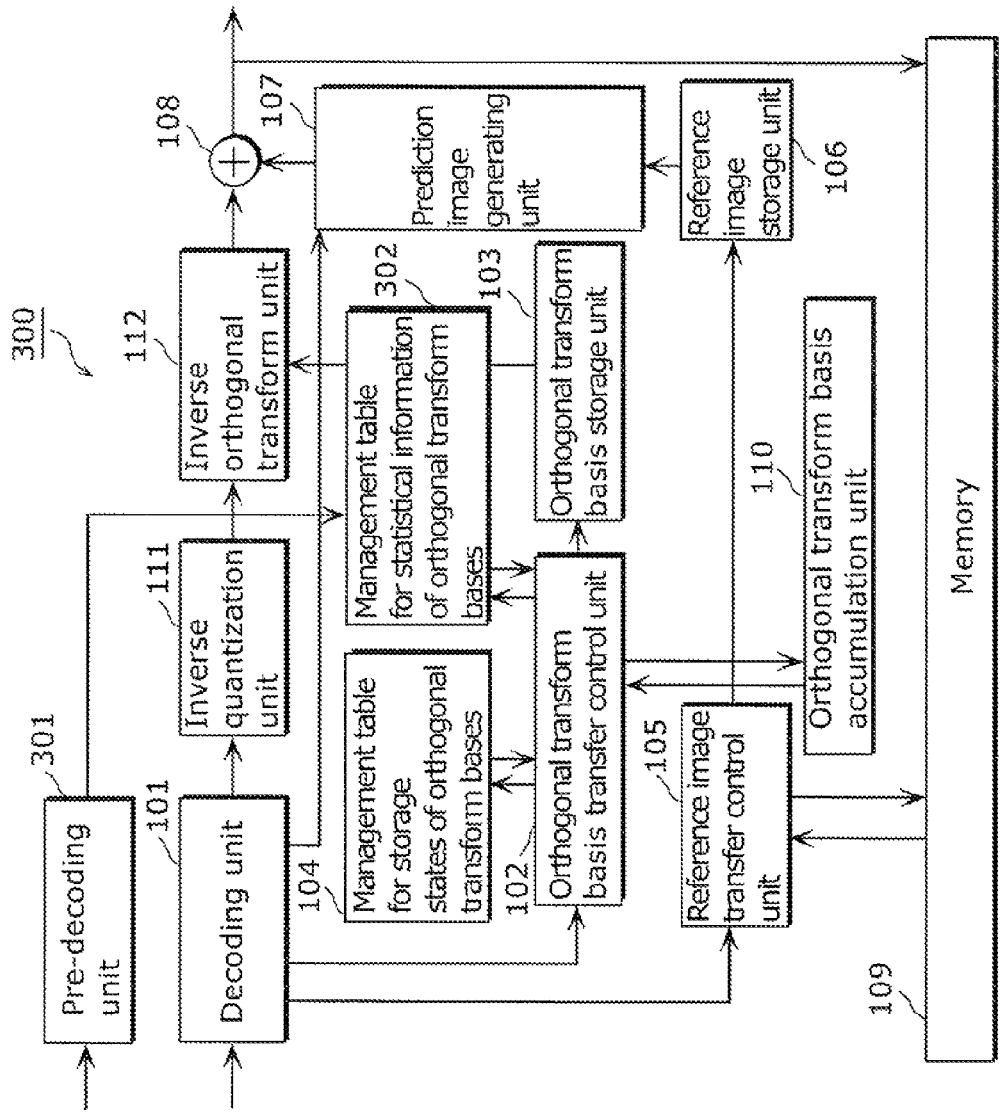
FIG. 9 is a block diagram showing a structure of a decoding apparatus according to Embodiment 3 of the present invention.

FIG. 9 is a block diagram showing a structure of a decoding apparatus according to Embodiment 3 of the present invention. Each of FIG. 10 and FIG. 11 is an example of information held in a management table for statistical information of orthogonal transform bases. In FIG. 9, the same structural elements as those in FIG. 1 are assigned with the same reference signs, and the same descriptions thereof are not repeated.

The decoding apparatus 300 shown in FIG. 9 includes a decoding unit 101, an orthogonal transform basis transfer control unit 102, an orthogonal transform basis storage unit 103, a management table for storage states of orthogonal transform bases 104, a reference image transfer control unit 105, a reference image storage unit 106, a prediction image generating unit 107, an adder 108, a memory 109, an orthogonal transform basis accumulation unit 110, an inverse quantization unit 111, an inverse orthogonal transform unit 112, a pre-decoding unit 301, and a management table for statistical information of orthogonal transform bases 302. Unlike the decoding apparatus 100 according to Embodiment 1, the decoding apparatus 300 shown in FIG. 9 includes the management table for statistical information of orthogonal transform bases 302.

The pre-decoding unit 301 decodes, from a coded stream, at least a part of identification information (orthogonal transform basis ID), prior to decoding by the decoding unit 101. More specifically, the pre-decoding unit 301 decodes at least part or all of the coded stream generated according to a standard of a video compression technique, prior to the decoding by the decoding unit 101 by at least one bit in the coded stream. Here, the pre-decoding unit 301 has a function of outputting at least the orthogonal transform basis ID.

Here, the pre-decoding unit 301 may be included in a CABAC decoding unit additionally provided to the decoding apparatus 300. Such a CABAC decoding unit decodes arithmetic codes such as Context-based Adaptive Binary Arithmetic Coding (CABAC). Alternatively, the pre-decoding unit 301 may be provided at a pre-stage of the decoding unit 101. In other words, it is only necessary for the pre-decoding unit 301 to decode the orthogonal transform basis ID from the coded stream prior to the decoding by the decoding unit 101 by at least one bit in the coded stream without decoding an image, and output it to the management table for statistical information of orthogonal transform bases 302.

The management table for statistical information of orthogonal transform bases 302 corresponds to a statistical information management unit in the CLAIMS of the present application. The management table for statistical information of orthogonal transform bases 302 manages the use state of each of the orthogonal transform bases decoded based on identification information (orthogonal transform basis ID) by the pre-decoding unit 301 and to be decoded by the decoding unit 101. More specifically, the management table for statistical information of orthogonal transform bases 302 has a function of receiving, as inputs, the pieces of orthogonal transform basis ID output by the pre-decoding unit 301, and outputting the number of times of use of each orthogonal transform basis shown by a corresponding one of the pieces of orthogonal transform basis ID included in the coded stream to be decoded (later or in the future) by the decoding unit 101.

The management table for statistical information of orthogonal transform bases 302 holds, for example, information as shown in FIG. 10. More specifically, the management table for statistical information of orthogonal transform bases 302 holds the orthogonal transform basis ID included in the header information of the coded stream decoded by the pre-decoding unit 301. In addition, the management table for statistical information of orthogonal transform bases 302 holds, as the number of times of future reference to orthogonal transform bases in the stream, the number of times of future reference to the orthogonal transform bases up to a reference to the orthogonal transform basis that is identified based on the orthogonal transform basis ID and is referred to in the decoding by the decoding unit 101. In addition, the management table for statistical information of orthogonal transform bases 302 may hold, for example, information as shown in FIG. 11. More specifically, the management table for statistical information of orthogonal transform bases 302 may hold the orthogonal transform basis ID included in the header information of the coded stream decoded by the pre-decoding unit 301. In addition, the management table for statistical information of orthogonal transform bases 302 may hold, as information indicating at which block (how many times ahead) in the stream the orthogonal transform basis indicated by the orthogonal transform basis ID is to be referred to in the decoding by the decoding unit 101.

The decoding apparatus 300 is structured as described above. More specifically, by managing the occurrence frequency of the orthogonal transform basis ID to be used for decoding by the decoding unit 101 using the management table for statistical information of orthogonal transform bases 302, it is possible to check, in advance, the occurrence probability of the orthogonal transform basis ID to be used for the decoding by the decoding unit 101. Accordingly, it is possible to store the orthogonal transform basis having a high occurrence probability into the orthogonal transform basis storage unit 103, and to discard the orthogonal transform basis having a low occurrence probability from the orthogonal transform basis storage unit 103. This makes it possible to enable reduction in the number of times of access to the orthogonal transform basis accumulation unit 110, and to enable reduction in the memory bandwidth required for the orthogonal transform basis storage unit 103.

Here, taking an example, a description is given of the difference in the effect of the information indicating the next reference order of the orthogonal transform basis for a block in the stream as shown in FIG. 10 and the information indicating the number of times of reference to be made to the orthogonal transform basis in the stream as shown in FIG. 11.

Figure 12:
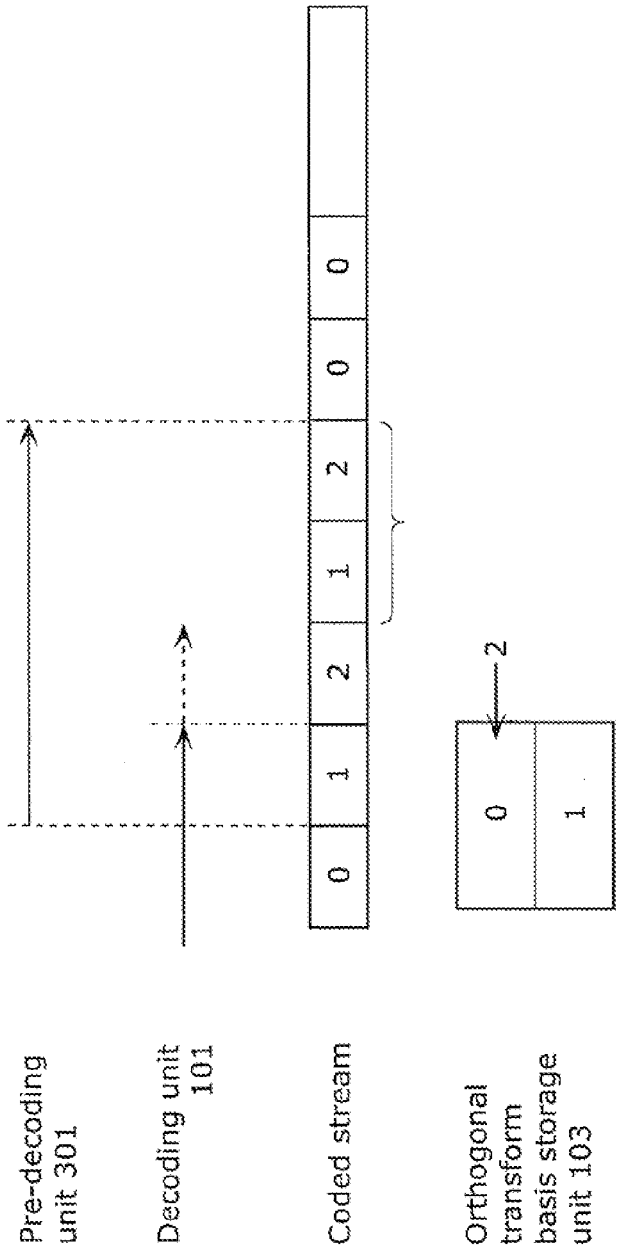
FIG. 12A is an illustration showing how orthogonal transform bases in the orthogonal transform basis storage unit are updated based on the management table for statistical information of orthogonal transform bases according to the present invention.
FIG. 12B is an illustration showing how the orthogonal transform bases in the orthogonal transform basis storage unit are updated based on the management table for statistical information of orthogonal transform bases according to the present invention.
Figure 13:
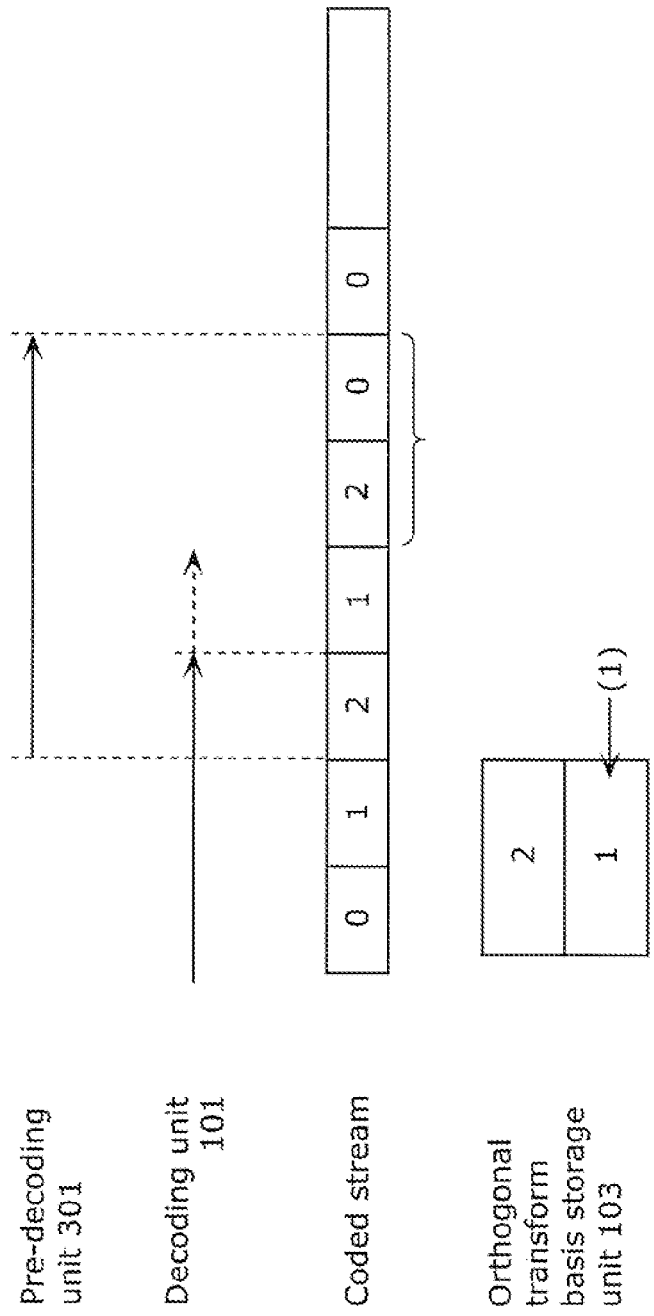
FIG. 13A is an illustration showing how orthogonal transform bases in the orthogonal transform basis storage unit are updated based on the management table for statistical information of orthogonal transform bases according to the present invention.
FIG. 13B is an illustration showing how the orthogonal transform bases in the orthogonal transform basis storage unit are updated based on the management table for statistical information of orthogonal transform bases according to the present invention.

Each of FIGS. 12A and 12B and FIGS. 13A and 13B is an illustration or a table showing how orthogonal transform bases in the orthogonal transform basis storage unit are updated based on the management table for statistical information of orthogonal transform bases. Here, FIGS. 13A and 13B are consecutive in time to FIGS. 12A and 12B, respectively. Compared to FIGS. 12A and 12B, FIGS. 13A and 13B show how a macroblock which is next to the macroblock decoded in FIGS. 12A and 12B is decoded by the decoding unit 101. Here, the pre-decoding unit 301 performs decoding of the coded stream, prior to the decoding by the decoding unit 101 by two macroblocks. In addition, the orthogonal transform basis storage unit 103 is assumed to store only two orthogonal transform bases.

As shown in FIG. 12A, the pre-decoding unit 301 performs decoding of the coded stream prior to the decoding by the decoding unit 101 by, for example, three macroblocks, and the information as shown in FIG. 12B is held in the management table for statistical information of orthogonal transform bases 302. For example, the management table for statistical information of orthogonal transform bases 302 holds the pieces of orthogonal transform basis ID (0, 1, and 2) decoded so far in the decoding of the coded stream by the pre-decoding unit 301, and holds the pieces of information ($\infty$, 2, and 1) each indicating at which block (how many times ahead) in the stream the corresponding one of the orthogonal transform bases is referred to. Here, in FIG. 12B, $\infty$ shows that there is no orthogonal transform basis ID 0 at the macroblock decoded by the pre-decoding unit 301 prior to the macroblock decoded by the decoding unit 101 by two blocks. On the other hand, the orthogonal transform basis ID 1 is referred to by the decoding unit 101 in the future decoding (of the block to be decoded next). Likewise, the orthogonal transform basis ID 2 is referred to by the decoding unit 101 in the future decoding (of the block to be decoded next to the next).

For this, the orthogonal transform basis transfer control unit 102 changes the area in which the orthogonal transform basis corresponding to the orthogonal transform basis ID 0 is stored from among the orthogonal transform bases corresponding to the pieces of orthogonal transform basis ID (0, 1) stored in the orthogonal transform basis storage unit 103, with reference to the management table for statistical information of orthogonal transform bases 302 and the management table for storage states of orthogonal transform bases 104. In other words, the orthogonal transform basis transfer control unit 102 changes the orthogonal transform basis corresponding to the orthogonal transform basis ID 0 stored in the orthogonal transform basis storage unit 103 to the orthogonal transform basis corresponding to the orthogonal transform basis ID 2.

The case as shown in FIGS. 13A and 13B is similar to the above case. More specifically, the orthogonal transform basis transfer control unit 102 determines, as the orthogonal transform basis that should be changed, one of the orthogonal transform bases corresponding to the pieces of orthogonal transform basis ID (2, 1) stored in the orthogonal transform basis storage unit 103, with reference to the management table for statistical information of orthogonal transform bases 302 and the management table for storage states of orthogonal transform bases 104. Here, it is possible to determine to change the area that stores the orthogonal transform basis corresponding to the orthogonal transform basis ID 2 with reference to the management table for statistical information of orthogonal transform bases 302. However, the orthogonal transform basis transfer control unit 102 can find out that the orthogonal transform basis storage unit 103 stores the orthogonal transform basis corresponding to the orthogonal transform basis ID 1 with reference to the management table for storage states of orthogonal transform bases 104. The orthogonal transform basis transfer control unit 102 determines that there is no need to make any modification for the orthogonal transform basis storage unit 103, and thus does nothing for (does not transfer anything to) the orthogonal transform basis storage unit 103.

In this way, it is possible to reduce the number of times of access to the orthogonal transform basis accumulation unit 110 by checking, in advance, the occurrence probability of the orthogonal transform basis ID to be used for the decoding by the decoding unit 101.

Figure 14:
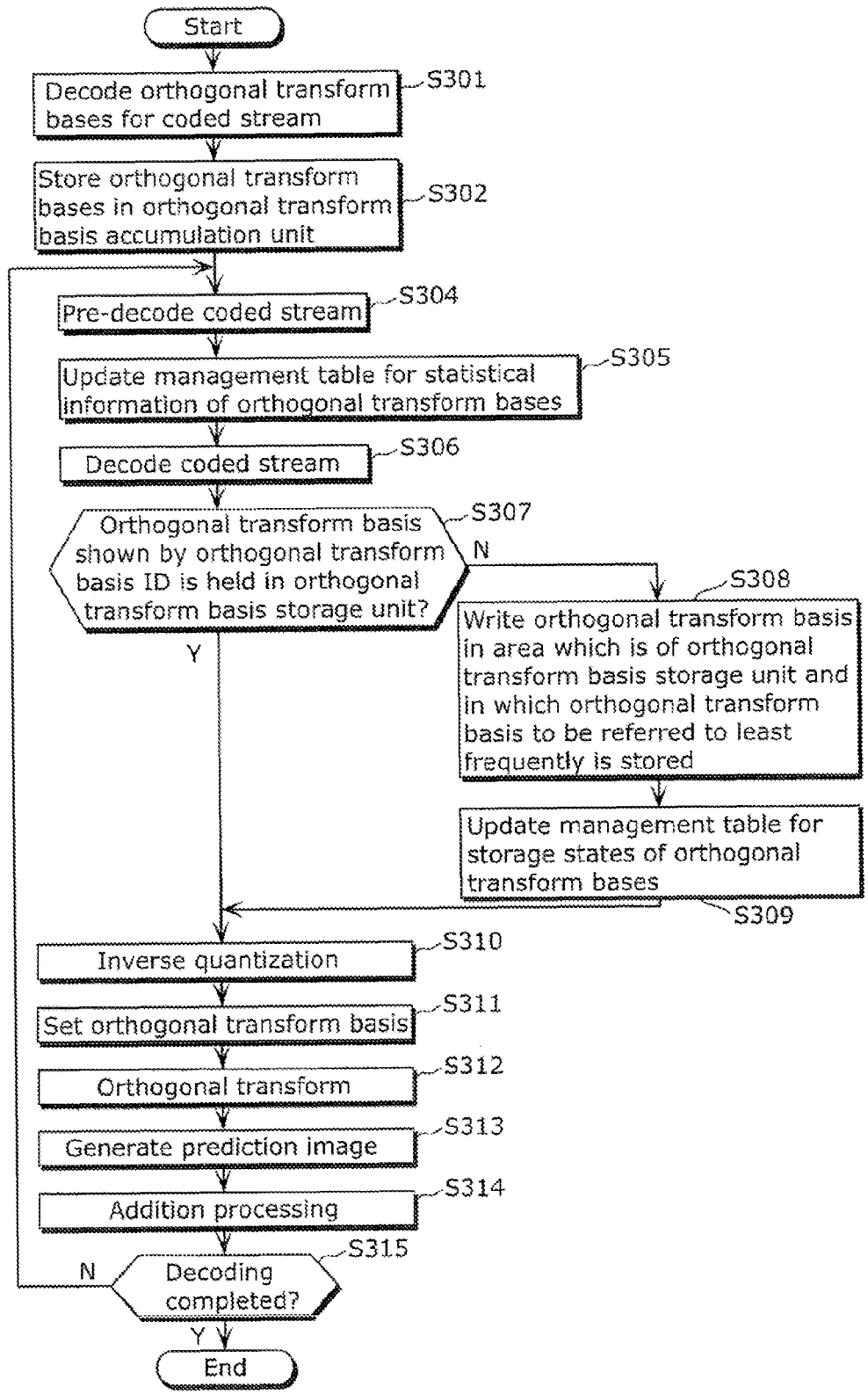
FIG. 14 is a flowchart of the decoding operations performed by the decoding apparatus according to Embodiment 3 of the present invention.

Next, a description is given of decoding operations performed by the decoding apparatus 300 configured as mentioned above. FIG. 14 is a flowchart of the decoding operations performed by the decoding apparatus according to Embodiment 3 of the present invention.

As shown in FIG. 14, in the decoding apparatus 300, the decoding unit 101 decodes the header information in an input coded stream (S301), and outputs, as header information, at least one orthogonal transform basis. Next, the orthogonal transform basis transfer control unit 102 writes, to the orthogonal transform basis accumulation unit 110, all the orthogonal transform bases decoded, in Step S301, by the decoding unit 101 (S302).

Next, the pre-decoding unit 301 decodes the coded stream prior to the decoding by the decoding unit 101 (S304), and updates the management table for statistical information of orthogonal transform bases 302 (S305). More specifically, prior to the decoding by the decoding unit 101, the pre-decoding unit 301 performs decoding of the coded stream, and writes, in the management table for statistical information of orthogonal transform bases 302, the occurrence frequency of the orthogonal transform basis ID in the part that is of the coded stream and is not yet decoded by the decoding unit 101.

Next, the decoding unit 101 decodes the header information and the quantized coefficients of the plurality of pictures (or macroblocks making up the plurality of pictures) composing the coded stream, and outputs at least the orthogonal transform basis information ID as header information (S306).

Next, the orthogonal transform basis transfer control unit 102 checks whether or not the orthogonal transform basis storage unit 103 stores the orthogonal transform bases indicated by the pieces of orthogonal transform basis ID decoded in S306, with reference to the management table for storage states of orthogonal transform bases 104 (S307).

In the case where the orthogonal transform basis indicated by the orthogonal transform basis ID is not yet stored in the orthogonal transform basis storage unit 103 (in the case of N in S307), the orthogonal transform basis transfer control unit 102 reads out the orthogonal transform basis indicated by the orthogonal transform basis ID from the orthogonal transform basis accumulation unit 110. In addition, the orthogonal transform basis transfer control unit 102 writes the orthogonal transform basis to, for example, an area which is of the orthogonal transform basis storage unit 103 and stores the orthogonal transform basis to be referred to least frequently (S308). Here, the orthogonal transform basis transfer control unit 102 identifies the orthogonal transform basis to be referred to least frequently in the decoding by the decoding unit 101, with reference to the management table for statistical information of orthogonal transform bases 302.

Next, the orthogonal transform basis transfer control unit 102 updates the management table for storage states of orthogonal transform bases 104 (S309). More specifically, the orthogonal transform basis transfer control unit 102 updates, to "held", the storage state which is of the read-out orthogonal transform basis and is indicated in the management table for storage states of orthogonal transform bases 104, and updates the orthogonal transform basis storage state of the erased orthogonal transform basis to "not held".

In the opposite case where the orthogonal transform basis indicated by the orthogonal transform basis ID is already stored in the orthogonal transform basis storage unit 103 (Yes in S307), the orthogonal transform basis transfer control unit 102 does not read out the orthogonal transform basis from the orthogonal transform basis accumulation unit 110, and proceeds to S310.

The processes from S310 to S315 are the same as the processes from S209 to S214, and thus the same descriptions thereof are not repeated.

In this way, the decoding apparatus 300 performs the decoding operations.

As described above, according to this embodiment, the pre-decoding unit 301 performs decoding of the stream prior to the decoding by the decoding unit 101, and the occurrence frequency of the orthogonal transform basis ID to be used for the decoding by the decoding unit 101 is managed using the management table for statistical information of orthogonal transform bases 302. In this way, it is possible to check, in advance, the occurrence probability of the orthogonal transform basis ID used for the decoding by the decoding unit 101. Accordingly, by storing the orthogonal transform basis having a high occurrence probability in the orthogonal transform basis storage unit 103, it is possible to reduce the number of times of access to the orthogonal transform basis accumulation unit 110.

For this reason, it is possible to reduce the memory bandwidth and the memory access latency required for the orthogonal transform bases.

In this embodiment, when the orthogonal transform basis storage unit 103 does not store the orthogonal transform basis indicated by the orthogonal transform basis ID, the orthogonal transform basis to be referred to least frequently is identified with reference to the management table for reference history of orthogonal transform bases 302. In the above description, the orthogonal transform basis transfer control unit 102 reads out, from the orthogonal transform basis accumulation unit 110, the orthogonal transform basis indicated by the orthogonal transform basis ID, and writes the read-out orthogonal transform basis to an area which is of the orthogonal transform basis storage unit 103 and stores the orthogonal transform basis to be referred to least frequently. However, the area to which the orthogonal transform basis is written is not limited thereto. For example, the orthogonal transform basis is written to an area that stores the orthogonal transform basis that is not to be used for a while or that is not to be referred to frequently for a predetermined future period. Any other area selection method is possible as long as the method enables reduction in the access to the orthogonal transform basis accumulation unit 110 and reduction in the required capacity of the orthogonal transform basis storage unit 103.

In this embodiment, the orthogonal transform basis accumulation unit 110 is a storage unit other than the memory 109, but the same storage unit may function as the orthogonal transform basis accumulation unit 110 and the memory 109. In other words, the orthogonal transform basis accumulation unit 110 may be configured to include or to be included in the memory 109.

In this embodiment, the orthogonal transform bases are included in the coded stream. However, this is exemplary. It is also good that only the orthogonal transform basis ID is included in a coded stream, and that orthogonal transform bases predefined between a coding apparatus and a decoding apparatus may be stored in the orthogonal transform basis accumulation unit 110.

Figure 15:
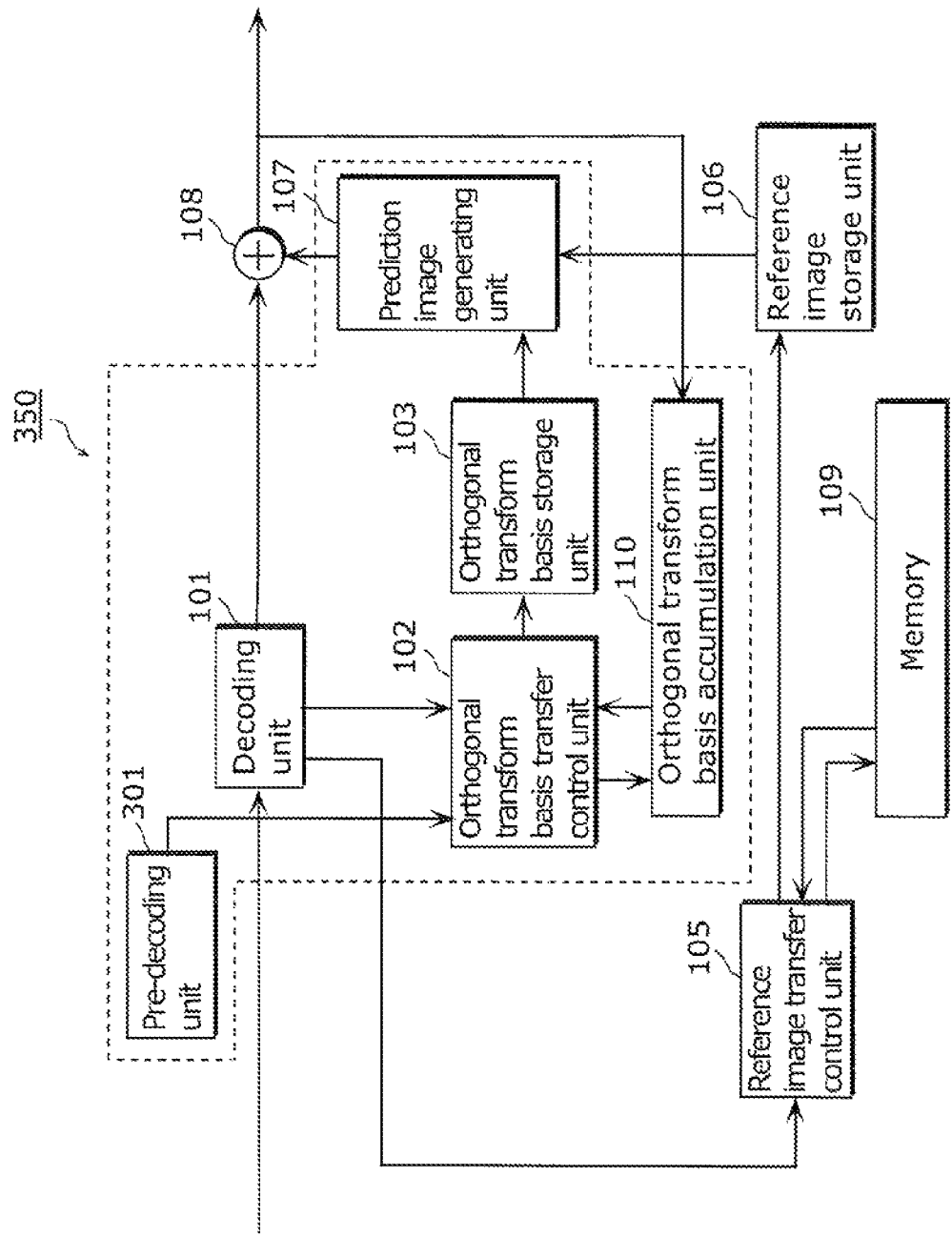
FIG. 15 is a block diagram showing essential structural elements of the decoding apparatus according to Embodiment 3 of the present invention.

In the above embodiment, the decoding apparatus 300 includes the decoding unit 101, the orthogonal transform basis transfer control unit 102, the orthogonal transform basis storage unit 103, the management table for storage states of orthogonal transform bases 104, the reference image transfer control unit 105, the reference image storage unit 106, the prediction image generating unit 107, the adder 108, the memory 109, the orthogonal transform basis accumulation unit 110, the inverse quantization unit 111, the inverse orthogonal transform unit 112, the pre-decoding unit 301, and the management table for statistical information of orthogonal transform bases 302. However, this structure is exemplary. As shown in FIG. 15, it is only necessary that the decoding apparatus 300 includes a decoding apparatus unit 350 as its essential element. More specifically, it is only necessary for the decoding apparatus 300 to include the decoding apparatus unit 350 including the decoding unit 101, the orthogonal transform basis transfer control unit 102, the orthogonal transform basis storage unit 103, the orthogonal transform basis accumulation unit 110, and the pre-decoding unit 301. FIG. 15 is a block diagram showing a minimum structure of a decoding apparatus according to Embodiment 3 of the present invention.

More specifically, the decoding apparatus unit 350 may include: a decoding unit 101 configured to decode, from a coded stream, identification information identifying orthogonal transform bases for use in the inverse orthogonal transform; a pre-decoding unit 301 configured to decode, from the coded stream, at least a piece of the identification information identifying the orthogonal transform bases, prior to the decoding by the decoding unit 101; an orthogonal transform basis accumulation unit 110 configured to store the plurality of orthogonal transform bases for use in the inverse orthogonal transform of the decoded stream; an orthogonal transform basis storage unit 103 configured to store at least one orthogonal transform basis required for the inverse orthogonal transform among the orthogonal transform bases stored by the orthogonal transform basis accumulation unit 110; and a orthogonal transform basis transfer control unit 102 configured to transfer, from the orthogonal transform basis accumulation unit 110 to the orthogonal transform basis storage unit 103, the at least one orthogonal transform basis identified based on the identification information (the orthogonal transform basis ID) decoded by the pre-decoding unit 301.

The decoding apparatus shown in FIG. 15 including at least the decoding apparatus unit 350 as its essential element performs pre-reading and pre-analysis of the stream using the identification information (orthogonal transform basis ID) decoded by the pre-decoding unit 301, and stores the at least one orthogonal transform basis for use in the inverse orthogonal transform into the orthogonal transform basis storage unit 103. Accordingly, the following advantageous effect is provided: when the at least one orthogonal transform basis is stored in the orthogonal transform basis storage unit 103, it is possible to reduce the number of times of direct access to the orthogonal transform basis accumulation unit 110 by using the orthogonal transform basis stored in the orthogonal transform basis storage unit 103.

Embodiment 4

Figure 16:
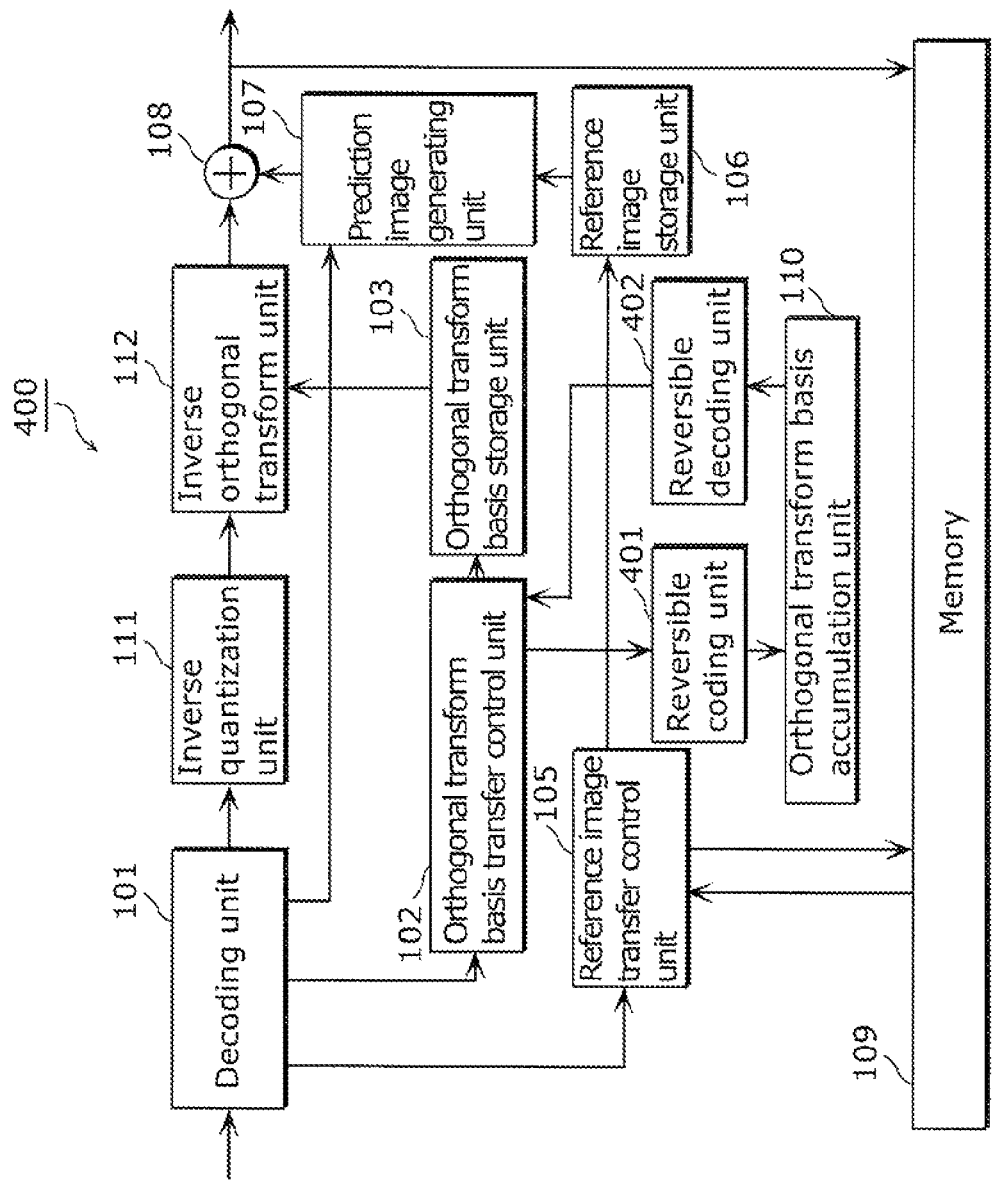
FIG. 16 is a block diagram showing a structure of a decoding apparatus according to Embodiment 4 of the present invention.

FIG. 16 is a block diagram showing a structure of a decoding apparatus according to Embodiment 4 of the present invention. In FIG. 16, the same structural elements as those in FIG. 1 are assigned with the same reference signs, and the same descriptions thereof are not repeated.

The decoding apparatus 400 shown in FIG. 16 includes a decoding unit 101, an orthogonal transform basis transfer control unit 102, an orthogonal transform basis storage unit 103, a reference image transfer control unit 105, a reference image storage unit 106, a prediction image generating unit 107, an adder 108, a memory 109, an orthogonal transform basis accumulation unit 110, an inverse quantization unit 111, an inverse orthogonal transform unit 112, a reversible coding unit 401, and a reversible decoding unit 402. Here, unlike the decoding apparatus 100 according to Embodiment 1, the decoding apparatus 400 shown in FIG. 16 includes the reversible coding unit 401 and the reversible decoding unit 402, and does not include the management table for storage states of orthogonal transform bases 104.

The reversible coding unit 401 reversibly codes the orthogonal transform bases included in the coded stream in order to be used for inverse orthogonal transform. More specifically, the reversible coding unit 401 has a function of reversibly coding orthogonal transform bases decoded by the decoding unit 101 and writing the reversibly coded orthogonal transform bases into the orthogonal transform basis accumulation unit 110.

The reversible decoding unit 402 reversibly decodes an orthogonal transform basis identified based on identification information (orthogonal transform basis ID) among the orthogonal transform bases reversibly coded by the reversible coding unit 401, and writes the identified orthogonal transform basis into the orthogonal transform basis accumulation unit 110 via the orthogonal transform basis transfer control unit 102. More specifically, the reversible decoding unit 402 has a function of reading out the orthogonal transform bases stored in the orthogonal transform basis accumulation unit 110, reversibly decoding the read-out orthogonal transform bases, and writing the reversibly-decoded orthogonal transform bases to the orthogonal transform basis storage unit 103 via the orthogonal transform basis transfer control unit 102. It is to be noted that, the reversible decoding unit 402 may write the at least one orthogonal transform basis to the orthogonal transform basis storage unit 103 without the control by the orthogonal transform basis transfer control unit 102.

Figure 17:
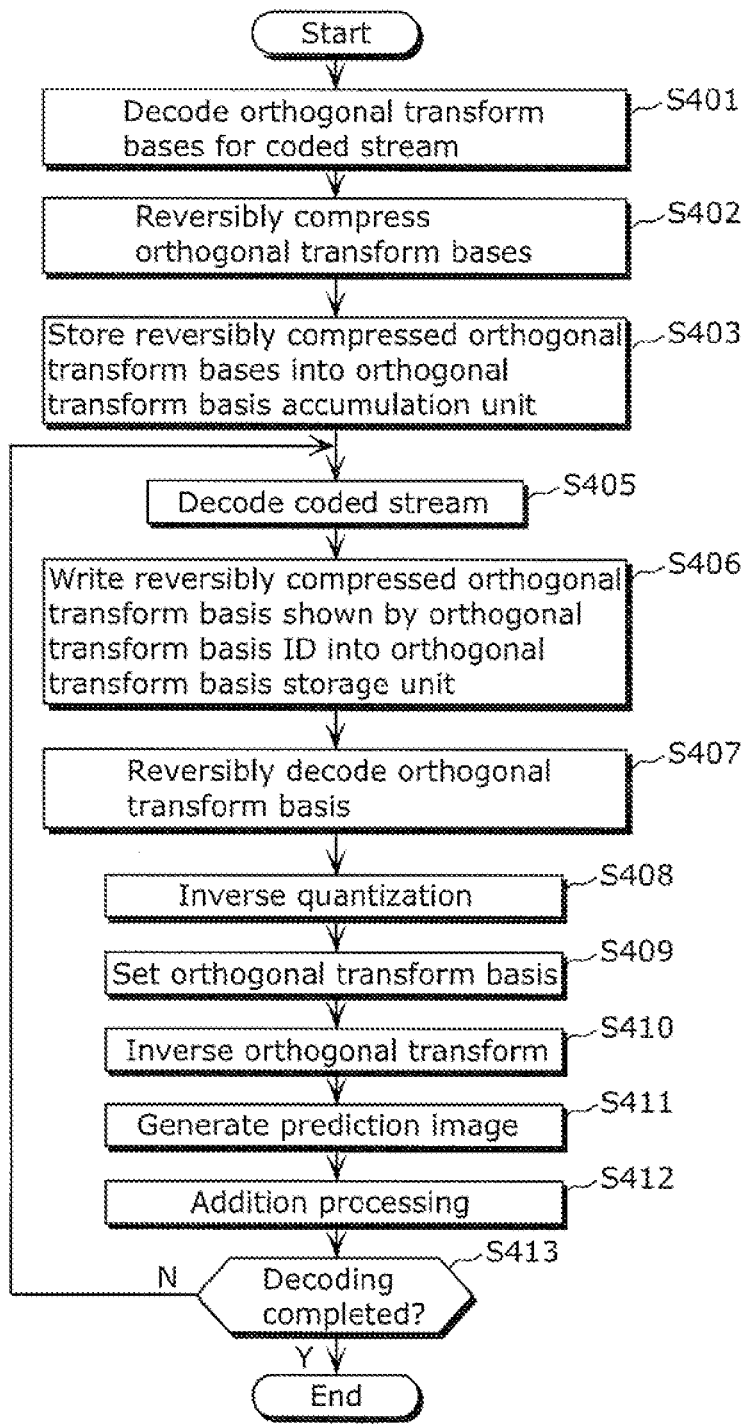
FIG. 17 is a flowchart of the decoding operations performed by the decoding apparatus according to Embodiment 4 of the present invention.

Next, a description is given of decoding operations performed by the decoding apparatus 400 configured as mentioned above. FIG. 17 is a flowchart of the decoding operations performed by the decoding apparatus according to Embodiment 4 of the present invention.

As shown in FIG. 17, in the decoding apparatus 400, the decoding unit 101 decodes the header information in an input coded stream (S401), and outputs, as header information, at least one orthogonal transform basis. Next, the reversible coding unit 401 reversibly codes (reversibly compresses) the orthogonal transform bases decoded by the decoding unit 101 (S402). Next, the orthogonal transform basis transfer control unit 102 writes, to the orthogonal transform basis accumulation unit 110, the orthogonal transform bases reversibly coded by the reversible coding unit 401 (S403).

Next, the decoding unit 101 decodes the header information and the quantized coefficients of the plurality of pictures (or macroblocks making up the plurality of pictures) composing the coded stream, and outputs, as header information, at least the orthogonal transform basis information ID, motion vector information, and quantized coefficients (S405).

The processes from S408 to S413 are the same as the processes from S108 to S113, and thus the same descriptions thereof are not repeated.

In this way, the decoding apparatus 400 performs the decoding operations.

As described above, this embodiment makes it possible to reduce the data size of the orthogonal transform bases to be stored in the orthogonal transform basis accumulation unit 110 by compressing the orthogonal transform bases using the reversible coding unit 401. In this way, it is possible to reduce the memory capacity required for the orthogonal transform bases.

It is to be noted that the decoding apparatus 400 shown in FIG. 16 may include at least the aforementioned management table for pa storage states of orthogonal transform bases 104. Alternatively, the decoding apparatus 400 may additionally include one of the management table for reference history of orthogonal transform bases 201 and the management table for statistical information of orthogonal transform bases 302. The latter option is preferable because it is possible to reduce the memory bandwidth and the memory access latency as described earlier, in addition to reduction in the memory capacity required for the orthogonal transform bases.

This embodiment describes a case where the decoding unit 101 decodes orthogonal transform bases once, the reversible coding unit 401 codes the decoded orthogonal transform bases and stores the coded orthogonal transform bases in the orthogonal transform basis accumulation unit 110, and the reversible decoding unit 402 decodes the coded orthogonal transform bases. However, this case is exemplary. For example, it is also good that the decoding unit 101 stores an orthogonal transform basis part in a coded stream into the orthogonal transform basis accumulation unit 110 without decoding the orthogonal transform bases in the coded stream, and that the reversible decoding unit 402 decodes the orthogonal transform bases stored therein.

In addition, the coding algorithm for use in the reversible coding unit 401 may be any coding scheme as long as the coding scheme makes the output size of the orthogonal transform bases smaller than the input size thereof.

In this embodiment, the orthogonal transform basis accumulation unit 110 is a storage unit other than the memory 109, but the same storage unit may function as the orthogonal transform basis accumulation unit 110 and the memory 109.

In other words, the orthogonal transform basis accumulation unit 110 may be configured to include or to be included in the memory 109.

In this embodiment, the orthogonal transform bases are included in the coded stream. However, this is exemplary. It is also good that only the orthogonal transform basis ID is included in a coded stream, and that orthogonal transform bases predefined between a coding apparatus and a decoding apparatus may be stored in the orthogonal transform basis accumulation unit 110.

Embodiment 5

Figure 18:
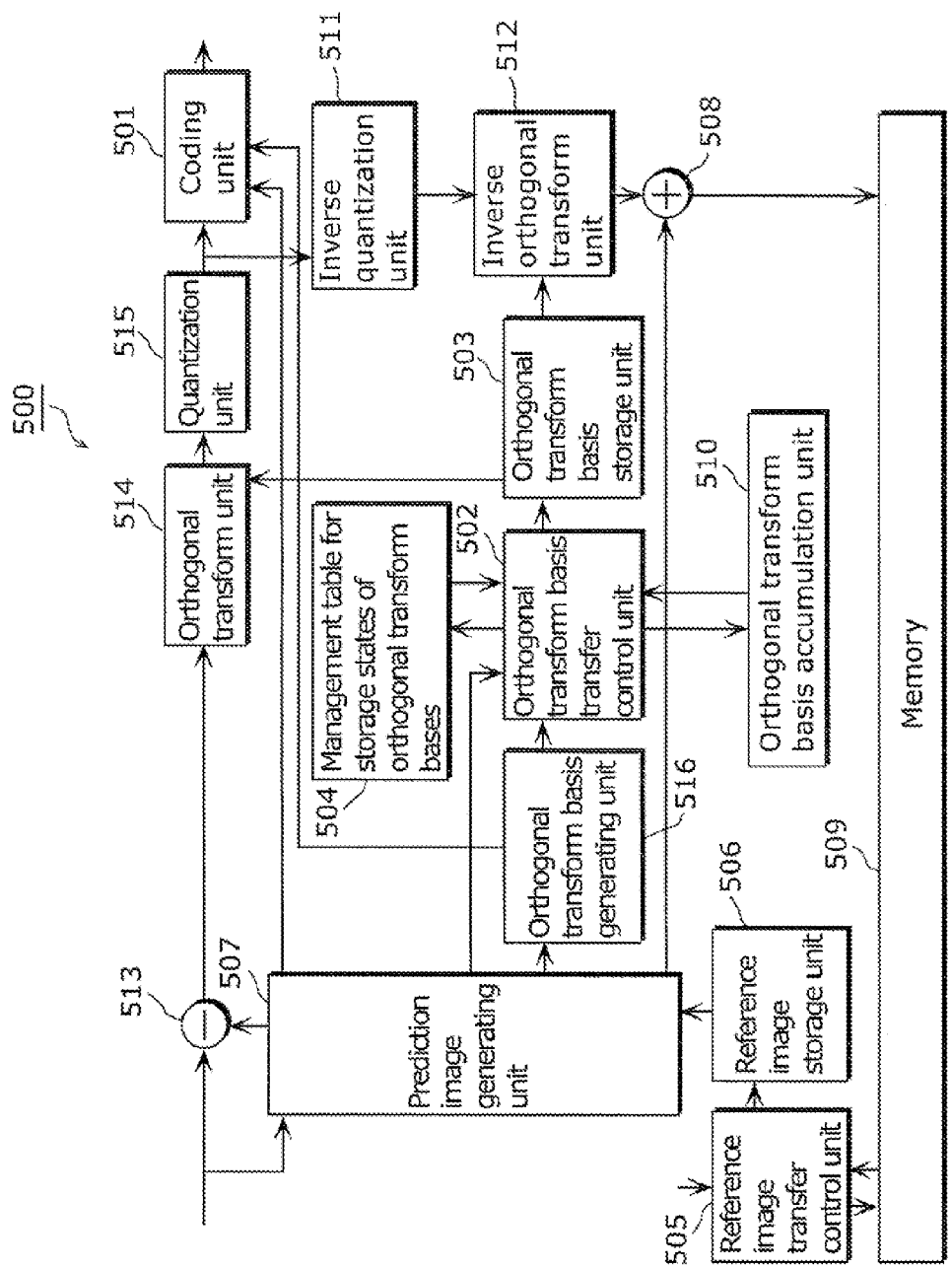
FIG. 18 is a block diagram showing a structure of a coding apparatus according to Embodiment 5 of the present invention.

FIG. 18 is a block diagram showing a structure of a coding apparatus according to Embodiment 5 of the present invention.

A coding apparatus 500 shown in FIG. 18 is an image coding apparatus which generates a coded stream including identification information identifying orthogonal transform bases (an orthogonal transform basis matrix) for use in inverse orthogonal transform. The coding apparatus 500 includes a coding unit 501, an orthogonal transform basis transfer control unit 502, an orthogonal transform basis storage unit 503, a management table for storage states of orthogonal transform bases 504, a reference image transfer control unit 505, a reference image storage unit 506, a prediction image generating unit 507, an adder 508, a memory 509, an orthogonal transform basis accumulation unit 510, an inverse quantization unit 511, an inverse orthogonal transform unit 512, a subtractor 513, an orthogonal transform unit 514, a quantization unit 515, and an orthogonal transform basis generating unit 516.

The coding unit 501 has a function of receiving, as inputs, at least the quantized coefficients output by the quantization unit 515, orthogonal transform bases, and the ID of the orthogonal transform bases, coding the inputs according to a standard of an image compression technique, and outputting a coded stream including the coded input information.

The orthogonal transform basis transfer control unit 502 corresponds to a transfer control unit in the CLAIMS of the present application, and transfers the orthogonal transform basis identified based on the identification information (orthogonal transfer basis ID) from the orthogonal transform basis accumulation unit 510 to the orthogonal transform basis storage unit 503 only when the orthogonal transform basis identified based on the identification information (orthogonal transfer basis ID) is not yet stored in the orthogonal transform basis storage unit 503. More specifically, the orthogonal transform basis transfer control unit 502 has a function of writing, into the orthogonal transform basis accumulation unit 510, the orthogonal transform bases generated by the orthogonal transform basis generating unit 516 and to be used for orthogonal transform. Furthermore, the orthogonal transform basis transfer control unit 502 has a function of referring to information in the management table for storage states of orthogonal transform bases 504, based on the identification information (orthogonal transform basis ID) indicating which one of the orthogonal transform bases generated by the prediction image generating unit 507 is to be used for orthogonal transform of a current prediction image. Furthermore, the orthogonal transform basis transfer control unit 502 checks whether or not the orthogonal transform basis indicated by the orthogonal transform basis ID is stored in the orthogonal transform basis storage unit 503, based on information in the management table for storage states of orthogonal transform bases 504.

For example when orthogonal transform basis transfer control unit 502 finds out that the orthogonal transform basis indicated by the orthogonal transform basis transform ID is not yet stored in the orthogonal transform basis storage unit 503, the orthogonal transform basis transfer control unit 102 reads out the orthogonal transform basis indicated by the orthogonal transform basis ID from the orthogonal transform basis accumulation unit 510, and writes the orthogonal transform basis into the orthogonal transform basis storage unit 503 (transfers it thereto). In the opposite case where the orthogonal transform basis transfer control unit 502 finds out that the orthogonal transform basis indicated by the orthogonal transform basis transform ID is already stored in the orthogonal transform basis storage unit 503, the orthogonal transform basis transfer control unit 502 does not read out the orthogonal transform basis from the orthogonal transform basis accumulation unit 510 (does not transfer it therefrom).

Here, the orthogonal transform basis transfer control unit 502 may issue, to the prediction image generating unit 507, a write instruction for writing the orthogonal transform basis into the orthogonal transform basis accumulation unit 510, and the prediction image generating unit 507 may write the orthogonal transform basis into the orthogonal transform basis accumulation unit 510. Likewise, the orthogonal transform basis transfer control unit 502 may issue, to the orthogonal transform basis storage unit 503, only a read instruction for reading the orthogonal transform basis indicated by the orthogonal transform basis ID from the orthogonal transform basis accumulation unit 510, and the orthogonal transform basis storage unit 503 may read out the orthogonal transform basis indicated by the orthogonal transform basis ID from the orthogonal transform basis accumulation unit 510 and store the read-out orthogonal transform basis.

The orthogonal transform basis storage unit 503 corresponds to a storage unit in the CLAIMS of the present application, and is intended to store the orthogonal transform basis required to perform current inverse orthogonal transform, from among the plurality of orthogonal transform bases stored in the orthogonal transform basis accumulation unit 510. More specifically, the orthogonal transform basis storage unit 503 has a function of storing at least one kind of orthogonal transform basis transferred from the orthogonal transform basis accumulation unit 510, and a function of setting the orthogonal transform basis indicated by the orthogonal transform basis ID to the orthogonal transform unit 514 and inverse orthogonal transform unit 512. Here, the orthogonal transform basis storage unit 503 may store the orthogonal transform basis indicated by the orthogonal transform basis ID, and the orthogonal transform basis transfer control unit 502 may set the orthogonal transform basis indicated by the orthogonal transform basis ID to the orthogonal transform unit 514 and the inverse orthogonal transform unit 512.

The management table for storage states of orthogonal transform bases 504 corresponds to a storage state management unit in the CLAIMS of the present application. The management table for storage states of orthogonal transform bases 504 manages information indicating whether or not the orthogonal transform bases identified based on the identification information (the orthogonal transform basis ID) are stored in the orthogonal transform basis storage unit 503. More specifically, the management table for storage states of orthogonal transform bases 504 has a function of receiving an input of orthogonal transform basis ID and outputting information indicating whether or not the orthogonal transform basis indicated by the orthogonal transform basis ID is already stored in the orthogonal transform basis storage unit 503. For example, as shown in FIG. 3 mentioned earlier, the management table for storage states of orthogonal transform bases 504 holds, as a table (information), the storage states indicating whether or not each orthogonal transform basis identified based on the orthogonal transform basis ID is already stored in the orthogonal transform basis storage unit 503.

The reference image transfer control unit 505 has a function of reading out, from the memory 509, reference pixels required by the prediction image generating unit 507 to generate a prediction image, based on at least the position information of a current block, and writing the read-out reference pixels into the reference image storage unit 506.

The reference image storage unit 506 has a function of storing the reference images transferred from the memory 509.

The prediction image generating unit 507 receives, as inputs, a coded image and a reference image, and generates a prediction image by selectively performing inter prediction, intra prediction, and/or any other prediction using reference pixels required to generate a current prediction image and stored in the reference image storage unit 506. The prediction image generating unit 507 has a function of outputting the generated prediction image to the subtractor 513 and the adder 508, and a function of outputting coded information such as a prediction mode to the coding unit 501. Furthermore, the prediction image generating unit 507 has a function of outputting the coded information, and as necessary the coded image, the reference image, and the prediction image to the orthogonal transform basis generating unit 516.

The adder 508 has a function of adding a prediction error signal output by the inverse orthogonal transform unit 512 and the prediction image output by the prediction image generating unit 507, and outputs the resulting image as a decoded image, and a function of transferring (outputting) the decode image to the memory 509.

The memory 509 has a function of storing a reference picture referred to by the prediction image generating unit 507.

The orthogonal transform basis accumulation unit 510 corresponds to an accumulation unit in the CLAIMS of the present application, and has a function of storing orthogonal transform bases for use in orthogonal transform performed by the orthogonal transform unit 514 and inverse orthogonal transform performed by the inverse orthogonal transform unit 512.

The inverse quantization unit 511 has a function of inversely quantizing quantized coefficients output by the quantization unit 515 and outputting the orthogonal transform coefficients.

More specifically, the inverse orthogonal transform unit 512 has a function of performing inverse orthogonal transform on an orthogonal transform coefficient output by the inverse quantization unit 511 using the orthogonal transform basis output by the orthogonal transform basis storage unit 503 and outputting a prediction error signal.

The subtractor 513 has a function of subtracting the prediction image output by the prediction image generating unit 507 from the current image, and outputting the resulting prediction error signal to the orthogonal transform unit 514.

The orthogonal transform unit 514 performs such orthogonal transform using an orthogonal transform basis stored in the orthogonal transform basis storage unit 503 and identified based on the identification information (orthogonal transform basis ID). More specifically, the orthogonal transform unit 514 has a function of performing orthogonal transform on the prediction error signal output by the subtractor 513 using the orthogonal transform basis output from the orthogonal transform basis storage unit 503, and outputting the orthogonal transform coefficient resulting from the orthogonal transform to the quantization unit 515.

The quantization unit 515 has a function of quantizing the orthogonal transform coefficient output by the orthogonal transform unit 514, and outputting the quantized coefficient to the coding unit 501 and the inverse quantization unit 511.

The orthogonal transform basis generating unit 516 corresponds to a generating unit in the CLAIMS of the present invention, and generates orthogonal transform bases and identification information (orthogonal transform basis ID) identifying the orthogonal transform bases. More specifically, the orthogonal transform basis generating unit 516 has a function of receiving, as inputs, the coded image and the reference image and as necessary the prediction image, generating the orthogonal transform bases and the orthogonal transform basis ID thereof, and outputting the generated orthogonal transform bases and their ID to the orthogonal transform basis transfer control unit 502.

Figure 20:
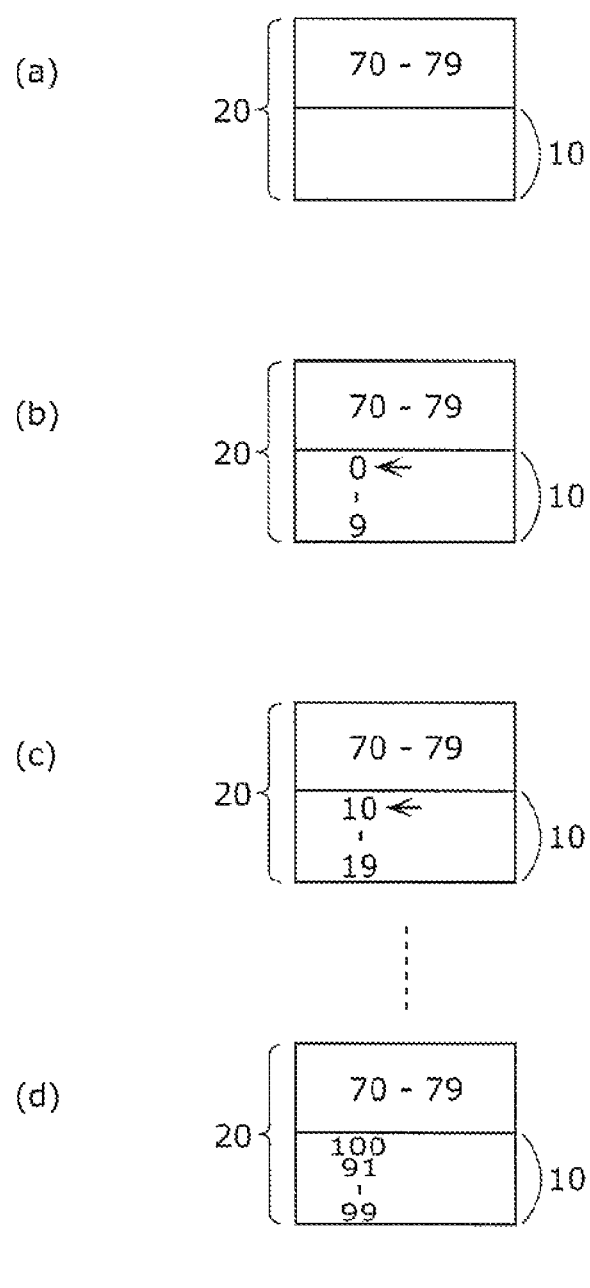
FIG. 20 shows illustrations for explaining a method performed by an orthogonal transform unit to determine orthogonal transform basis ID.

Here, a method performed by the orthogonal transform unit 514 to determine a piece of orthogonal transform basis ID is explained taking an example. FIG. 19 is an example of information table held in a management table for storage states of orthogonal transform bases. FIG. 20 shows illustrations for explaining a method performed by an orthogonal transform unit to determine the piece of orthogonal transform basis ID.

As shown in FIG. 19, it is assumed here that the management table for storage states of orthogonal transform bases holds pieces of orthogonal transform basis ID (ranging from 0 to 100) and the storage states of the corresponding orthogonal transform bases in the orthogonal transform basis storage unit 503. In addition, it is assumed that the orthogonal transform basis storage unit 503 stores orthogonal transform bases corresponding to pieces of orthogonal transform basis ID ranging from 70 to 79. Furthermore, it is assumed that the orthogonal transform basis storage unit 503 can store only twenty orthogonal transform bases. In other words, as shown in (a) in FIG. 20, the orthogonal transform basis storage unit 503 stores ten orthogonal transform bases corresponding to the orthogonal transform basis ID 70 to 79, and thus there remains an area available for storing ten more orthogonal transform bases.

In this case, the orthogonal transform unit 514 determines the piece of orthogonal transform basis ID indicating the type of the orthogonal transform basis used for the current orthogonal transform in the manner indicated below.

First, as shown in (b) in FIG. 20, the orthogonal transform unit 514 causes the orthogonal transform basis transfer control unit 502 to write the orthogonal transform bases corresponding to the pieces of orthogonal transform basis ID ranging from 0 to 9 into the orthogonal transform basis storage unit 503, and checks whether or not the pieces of written orthogonal transform basis ID are the pieces of orthogonal transform basis ID for use in the orthogonal transform.

Next, as shown in (c) in FIG. 20, the orthogonal transform unit 514 causes the orthogonal transform basis transfer control unit 502 to write the orthogonal transform bases corresponding to the pieces of orthogonal transform basis ID ranging from 10 to 19 into the orthogonal transform basis storage unit 503, and checks whether or not the pieces of written orthogonal transform basis ID are the pieces of orthogonal transform basis ID for use in the orthogonal transform.

Likewise, the orthogonal transform unit 514 causes the orthogonal transform basis transfer control unit 502 to write the orthogonal transform bases corresponding to the pieces of orthogonal transform basis ID ranging from 0 to 69 and 80 to 100 into the orthogonal transform basis storage unit 503, and checks whether or not the pieces of written orthogonal transform basis ID are the pieces of orthogonal transform basis ID for use in the orthogonal transform.

On the other hand, the orthogonal transform bases corresponding to the pieces of orthogonal transform basis ID ranging from 70 to 79 are stored in the orthogonal transform basis storage unit 503 in advance. Accordingly, the orthogonal transform basis transfer control unit 502 does not transfer the orthogonal transform bases corresponding to the pieces of orthogonal transform ID ranging from 70 to 79. In this way, it is possible to reduce the memory bandwidth and the memory access latency required for the orthogonal transform bases.

The above-described method performed by the orthogonal transform unit 514 to determine the pieces of orthogonal transform basis ID is a mere example, and other methods are possible as a matter of course. Processing performed by the inverse orthogonal transform unit 512 is similar to the processing performed by the orthogonal transform unit 514, and thus the similar description is not repeated here.

The decoding apparatus 500 is structured as described above.

Figure 21:
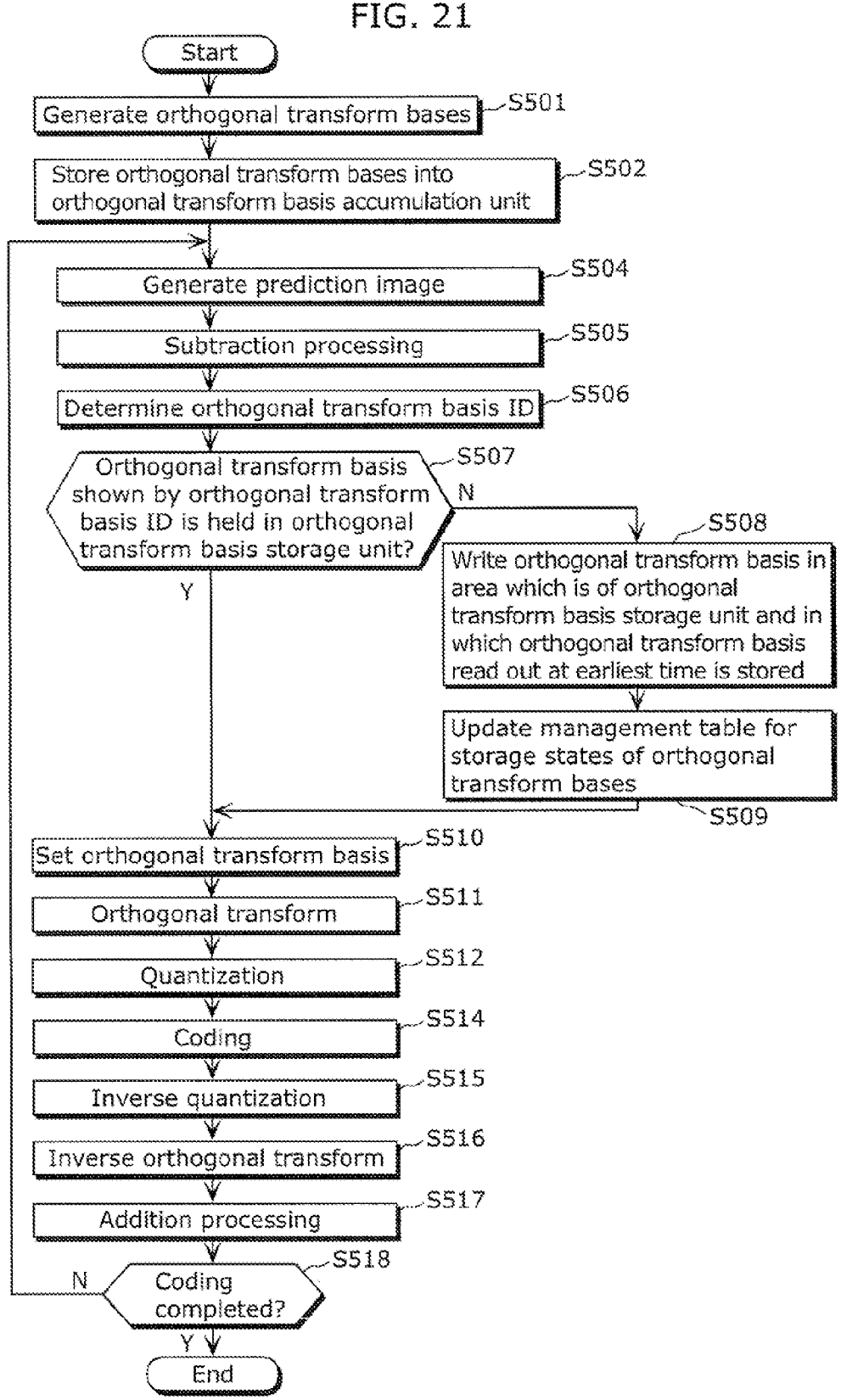
FIG. 21 is a flowchart of the decoding operations performed by the coding apparatus according to Embodiment 5 of the present invention.

Next, a description is given of coding operations performed by the coding apparatus 500 configured as mentioned above. FIG. 21 is a flowchart of the coding operations performed by the coding apparatus according to Embodiment 5 of the present invention.

As shown in FIG. 21, first in the coding apparatus 500, the orthogonal transform basis generating unit 516 receives, as inputs, a current image, a reference image, and as necessary a prediction image, generates orthogonal transform bases for use in the following coding (S501), and outputs the generated orthogonal transform bases to the orthogonal transform basis transfer control unit 502.

Next, the orthogonal transform basis transfer control unit 502 writes, to orthogonal transform basis accumulation unit 510, all the orthogonal transform bases generated by the orthogonal transform basis generating unit 516 in S501.

Next, the prediction image generating unit 507 generates a prediction image (S504). More specifically, the reference image transfer control unit 505 reads out reference pixels required in a reference image to be used to generate a prediction image from the memory 509 as necessary, and writes the read-out reference pixels in the reference image storage unit 506. Next, the prediction image generating unit 507 receives, as inputs, the current image and the reference image, generates the prediction image highly correlated to the current image and the coded information, and outputs the generated prediction image to the subtractor 513 and the adder 508. In addition, the prediction image generating unit 507 outputs the coded information used to generate the prediction image to the coding unit 501. In addition, the prediction image generating 507 outputs, to the orthogonal transform basis generating unit 516, the coded information, and as necessary the current image, the reference image, and/or the prediction image (S504).

Next, the subtractor 513 performs subtraction (S505). More specifically, the subtractor 513 performs subtraction of the coded image and the prediction image output by the prediction image generating unit 507, and outputs the outcome to the orthogonal transform unit 514.

Next, the orthogonal transform basis generating unit 516 determines a piece of orthogonal transform basis ID (S506). More specifically, the orthogonal transform basis generating unit 516 receives, as inputs, the coded information, and as necessary the input image, the reference image, and the prediction image output by the prediction image generating unit 507, determines (generates) an orthogonal transform basis for use in current orthogonal transform, and outputs the orthogonal transform basis ID to the coding unit 501, and the orthogonal transform basis transfer control unit 502.

Next, the orthogonal transform basis transfer control unit 502 checks whether or not each orthogonal transform basis indicated by the pieces of orthogonal transform basis ID is already stored in the orthogonal transform basis storage unit 503 in S506, with reference to the management table for storage states of orthogonal transform bases 504 (S507).

Next, in the case where the orthogonal transform basis indicated by the orthogonal transform basis ID is not yet stored in the orthogonal transform basis storage unit 503 (in the case of N in S507), the orthogonal transform basis transfer control unit 502 reads out the orthogonal transform basis indicated by the orthogonal transform basis ID from the orthogonal transform basis accumulation unit 510. Next, the orthogonal transform basis transfer control unit 102 writes the read-out orthogonal transform basis in an area which is of the orthogonal transform basis storage unit 503 and stores the orthogonal transform basis read out from the orthogonal transform basis accumulation unit 510 at earliest time (S508). Next, the orthogonal transform basis transfer control unit 502 updates the management table for storage states of orthogonal transform bases 504 (S509). More specifically, the orthogonal transform basis transfer control unit 502 updates, to "held", the storage state which is of the read-out orthogonal transform basis and is indicated in the management table for storage states of orthogonal transform bases 504, and updates the orthogonal transform basis storage state of the erased orthogonal transform basis to "not held" (S509).

In the opposite case where the orthogonal transform basis indicated by the orthogonal transform basis ID is already stored in the orthogonal transform basis storage unit 503 (Yes in S507), the orthogonal transform basis transfer control unit 502 does not read out (transfer) the orthogonal transform basis from the orthogonal transform basis accumulation unit 510, and proceeds to S510.

Next, the orthogonal transform unit 514 reads and sets the orthogonal transform basis stored in the orthogonal transform basis storage unit 503 (S510). The orthogonal transform unit 514 performs orthogonal transform on the prediction error signal output by the subtractor 513 (S511), and outputs the orthogonal transform coefficient to the quantization unit 515.

Next, the quantization unit 515 quantizes the orthogonal transform coefficient output by the orthogonal transform unit 514, and outputs the quantized coefficient to the coding unit 501 and the inverse quantization unit 511 (S512).

Next, the coding unit 501 performs coding (S514). More specifically, the coding unit 501 receives, as inputs, the quantized coefficient output by the quantization unit 515 and the orthogonal transform basis ID output by the orthogonal transform basis generating unit 516, codes the inputs according to a standard of an image compression technique, and outputs a resulting coded stream.

Next, the inverse quantization unit 511 performs inverse quantization on the quantized coefficient output by the quantization unit 515, and outputs the orthogonal transform coefficient to the inverse orthogonal transform unit 512 (S515).

Next, the inverse orthogonal transform unit 512 reads out the orthogonal transform basis stored in the orthogonal transform basis storage unit 503, performs inverse orthogonal transform on the orthogonal transform coefficient output by the inverse quantization unit 511, and outputs the prediction error signal to the adder 508 (S516).

Next, the adder 508 adds the prediction image output by the prediction image generating unit 507 in S504 and the prediction error signal output by the inverse orthogonal transform unit 512 in S516, and outputs the outcome to the memory 509 (S517).

Next, the coding apparatus 500 determines whether or not the whole current image is already coded (S518), and completes the coding when the whole current image is already coded (Y in S518). On the other hand, when there remains a block to be coded in the current image, the coding apparatus 500 repeats the processes from S504 to S518 (S518).

As described above, the coding apparatus 500 performs the coding operations.

The current image included in a GOP or a sequence of pictures in a coded stream is taken as the coding target in an example in this embodiment. However, this is a mere example. As other examples, the current image as the coding target in the above example may be replaced by a current block in the current image, or a GOP or a sequence of pictures in the coded stream.

As described above, according to this embodiment, when it is found out that the orthogonal transform basis indicated by orthogonal transform basis ID is already present in the orthogonal transform basis storage unit 503 with reference to the management table for storage states of orthogonal transform bases 504, the orthogonal transform basis is not read out (transferred) from the orthogonal transform basis accumulation unit 510. For this reason, it is possible to reduce the number of times of access to the orthogonal transform basis accumulation unit 510. In this way, it is possible to reduce the memory bandwidth and the memory access latency required for the orthogonal transform basis.

In this embodiment, in the case where the orthogonal transform basis indicated by the orthogonal transform basis ID is not yet stored in the orthogonal transform basis storage unit 503, the orthogonal transform basis transfer control unit 502 reads out (transfers) the orthogonal transform basis indicated by the orthogonal transform basis ID from the orthogonal transform basis accumulation unit 510. The above description is given of a case of writing the orthogonal transform basis to an area which is of the orthogonal transform basis storage unit 503 and stores the orthogonal transform basis read out from the memory at the earliest time. However, the area to which the orthogonal transform basis is written is not limited thereto. For example, the orthogonal transform basis may be written to an area which stores the orthogonal transform basis read out from the memory most recently. Alternatively, the orthogonal transform basis may be written to an area which stores another orthogonal transform basis and is selected at random. Any other area selection method is possible as long as the method enables reduction in the access to the orthogonal transform basis storage unit 503 and reduction in the required capacity of the orthogonal transform basis storage unit 103.

In this embodiment, the orthogonal transform basis accumulation unit 510 is a storage unit other than the memory 509, but the same storage unit may function as the orthogonal transform basis accumulation unit 510 and the memory 509. In other words, the orthogonal transform basis accumulation unit 510 may be configured to include or to be included in the memory 509.

The orthogonal transform basis is generated by the orthogonal transform basis generating unit 516 in this embodiment, but this is an example. It is also good that an orthogonal transform basis is determined in advance between the coding apparatus 500 and a decoding apparatus, and is held by the both.

In this embodiment, the coding apparatus 500 includes the coding unit 501, the orthogonal transform basis transfer control unit 502, the orthogonal transform basis storage unit 503, the management table for storage states of orthogonal transform bases 504, the reference image transfer control unit 505, the reference image storage unit 506, the prediction image generating unit 507, the adder 508, the memory 509, the orthogonal transform basis accumulation unit 510, the inverse quantization unit 511, the inverse orthogonal transform unit 512, the subtractor 513, the orthogonal transform unit 514, the quantization unit 515, and the orthogonal transform basis generating unit 516. However, the structure is exemplary. It is only necessary for the coding apparatus 500 to include, as essential elements, the orthogonal transform basis transfer control unit 502, the orthogonal transform basis storage unit 503, the orthogonal transform basis accumulation unit 510, the orthogonal transform unit 514, and the orthogonal transform basis generating unit 516.

More specifically, the coding apparatus 500 may be an image coding apparatus which codes a coded stream including identification information identifying an orthogonal transform basis for use in inverse orthogonal transform and include: an orthogonal transform basis generating unit 516 configured to generate a plurality of orthogonal transform bases and identification information (orthogonal transform basis ID) identifying the orthogonal transform bases; an orthogonal transform basis accumulation unit 510 configured to store the plurality of orthogonal transform bases generated by the orthogonal transform basis generating unit 516; an orthogonal transform basis storage unit 503 configured to store an orthogonal transform basis required for current orthogonal transform, from among the plurality of orthogonal transform bases stored in the orthogonal transform basis accumulation unit 510; an orthogonal transform unit 514 configured to perform orthogonal transform using the orthogonal transform basis stored in the orthogonal transform basis storage unit 503 and identified based on the identification information (the orthogonal transform basis ID); and an orthogonal transform basis transfer control unit 502 configured to transfer the orthogonal transform basis identified based on the identification information (orthogonal transfer basis ID) from the orthogonal transform basis accumulation unit 510 to the orthogonal transform basis storage unit 503 only when the orthogonal transform basis identified based on the identification information (the orthogonal transform basis ID) is not yet stored in the orthogonal transform basis storage unit 503.

With these essential elements, the coding apparatus 500 is capable of skipping reading of the orthogonal transform basis from the orthogonal transform basis accumulation unit 510 when the required orthogonal transform basis is already stored in the orthogonal transform basis storage unit 503. For this reason, it is possible to reduce the number of times of access to the orthogonal transform basis accumulation unit 510. In this way, it is possible to reduce the memory bandwidth and the memory access latency required for the orthogonal transform bases.

Embodiment 6

Figure 22:
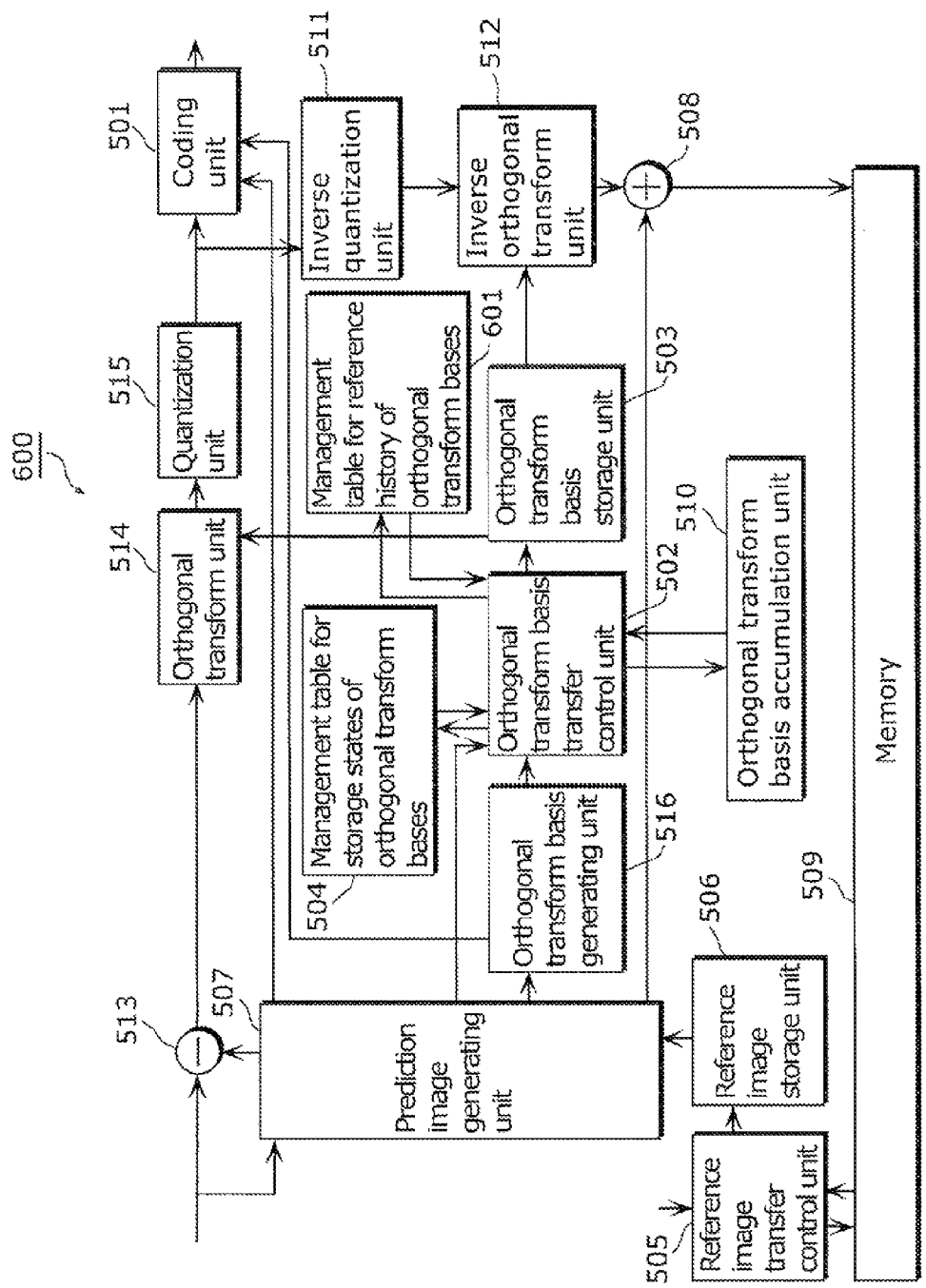
FIG. 22 is a block diagram showing a structure of a coding apparatus according to Embodiment 6 of the present invention.

FIG. 22 is a block diagram showing a structure of a coding apparatus according to Embodiment 6 of the present invention. In FIG. 22, the same structural elements as those in FIG. 18 are assigned with the same reference signs, and the same descriptions thereof are not repeated.

A coding apparatus 600 shown in FIG. 22 includes a coding unit 501, an orthogonal transform basis transfer control unit 502, an orthogonal transform basis storage unit 503, a management table for storage states of orthogonal transform bases 504, a reference image transfer control unit 505, a reference image storage unit 506, a prediction image generating unit 507, an adder 508, a memory 509, an orthogonal transform basis accumulation unit 510, an inverse quantization unit 511, an inverse orthogonal transform unit 512, a subtractor 513, an orthogonal transform unit 514, a quantization unit 515, an orthogonal transform basis generating unit 516, and a management table for reference history of orthogonal transform bases 601. Unlike the coding apparatus 500 according to Embodiment 5, the coding apparatus 600 shown in FIG. 22 includes the management table for reference history of orthogonal transform bases 601.

The management table for reference history of orthogonal transform bases 601 corresponds to a reference history management unit in the CLAIMS of the present application. The management table for reference history of orthogonal transform bases 601 manages, for each of the orthogonal transform bases included in a coded stream, use history information indicating the number of times of reference from the start of the decoding. More specifically, the management table for reference history of orthogonal transform bases 601 has a function of receiving inputs of orthogonal transform basis ID, and outputting, to the orthogonal transform basis storage unit 503, the number of times of reference of each orthogonal transform basis indicated by the orthogonal transform basis ID from the start of the coding. It is to be noted that the information held in the management table for reference history of orthogonal transform bases 601 is the same as the contents as shown in FIG. 7A and FIG. 7B, and thus the description thereof is not repeated here.

Figure 23:
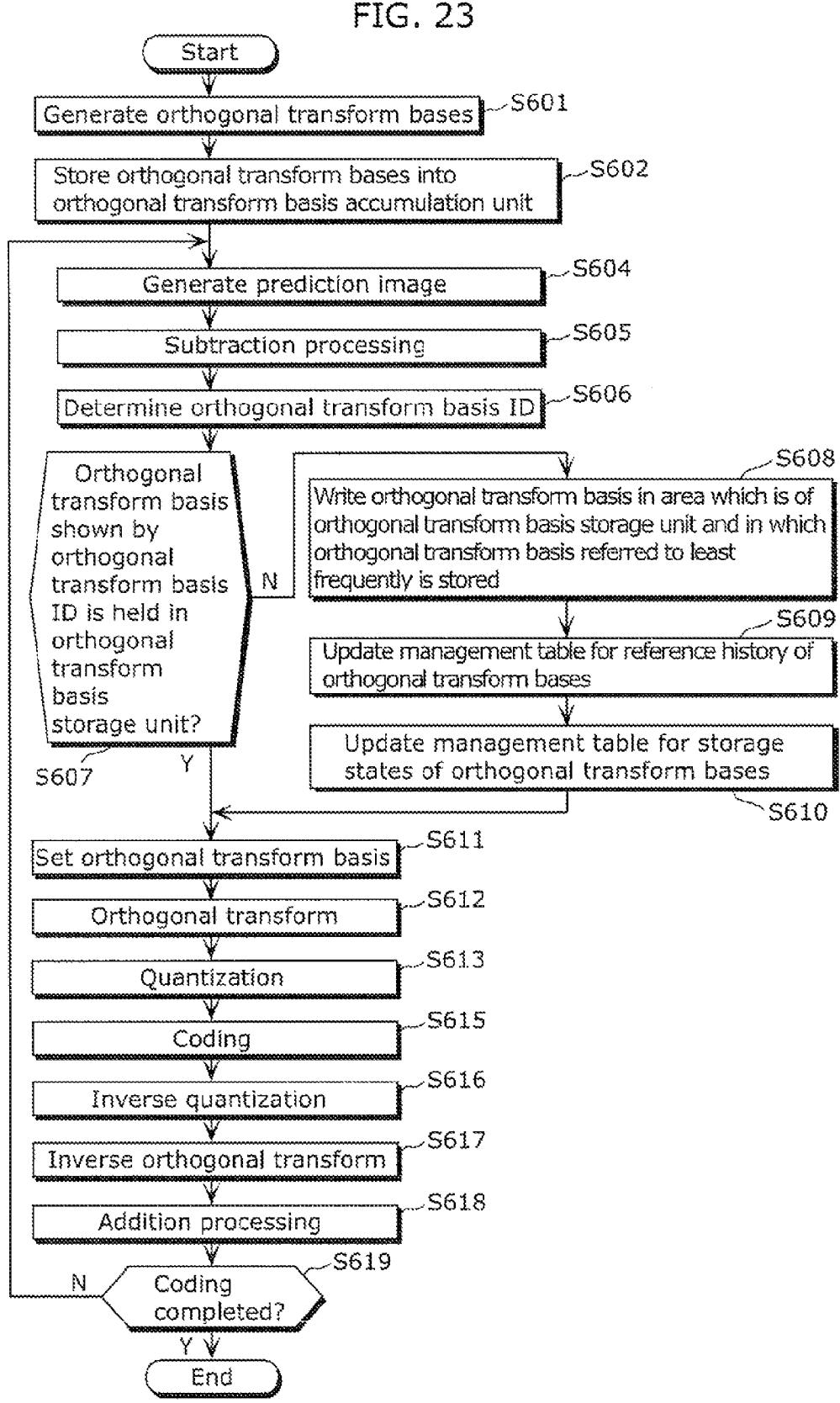
FIG. 23 is a flowchart of the coding operations performed by the coding apparatus according to Embodiment 6 of the present invention.

Next, a description is given of coding operations performed by the coding apparatus 600 configured as mentioned above. FIG. 23 is a flowchart of the coding operations performed by the coding apparatus according to Embodiment 6 of the present invention.

As shown in FIG. 23, first in the coding apparatus 600, the orthogonal transform basis generating unit 516 receives, as inputs, a current image, a reference image, and as necessary a prediction image, generates orthogonal transform bases for use in the following coding (S601), and outputs the generated orthogonal transform bases to the orthogonal transform basis transfer control unit 502.

Here, the processes of S602 to S607 are the same as the processes of S502 to S507, and thus the same descriptions thereof are not repeated.

Next, in the case where the orthogonal transform basis indicated by the orthogonal transform basis ID is not yet held in the orthogonal transform basis storage unit 503 (in the case of N in S607), the orthogonal transform basis transfer control unit 502 reads out the orthogonal transform basis indicated by the orthogonal transform basis ID from the orthogonal transform basis accumulation unit 510. In addition, the orthogonal transform basis transfer control unit 102 writes the orthogonal transform basis to an area which is of the orthogonal transform basis storage unit 503 and stores the orthogonal transform basis referred to least frequently so far (S608). Here, the orthogonal transform basis transfer control unit 502 identifies the orthogonal transform basis referred to least frequently with reference to the management table for reference history of orthogonal transform bases 601.

Next, the orthogonal transform basis transfer control unit 502 updates the management table for reference history of orthogonal transform bases 601 (S609). More specifically, the orthogonal transform basis transfer control unit 502 increments the number of times of reference of the orthogonal transform basis referred to in the management table for reference history of orthogonal transform bases 601.

Next, the orthogonal transform basis transfer control unit 502 updates the management table for storage states of orthogonal transform bases 504 (S610). More specifically, the orthogonal transform basis transfer control unit 502 updates, to "held", the storage state which is of the read-out orthogonal transform basis and is indicated in the management table for storage states of orthogonal transform bases 504, and updates the orthogonal transform basis storage state of the erased orthogonal transform basis to "not held".

In the opposite case where the orthogonal transform basis indicated by the orthogonal transform basis ID is already stored in the orthogonal transform basis storage unit 503 (Yes in S607), the orthogonal transform basis transfer control unit 502 does not read out (transfer) the orthogonal transform basis from the orthogonal transform basis accumulation unit 510, and proceeds to S611.

The orthogonal transform unit 514 reads out an orthogonal transform basis stored in the orthogonal transform basis storage unit 503 (S611), performs orthogonal transform on a prediction error signal output by the subtractor 513 (S612), and outputs the orthogonal transform coefficient.

Here, the processes of S613 to S619 are the same as the processes of S510 to S519, and thus the same descriptions thereof are not repeated.

As described above, the coding apparatus 600 performs the coding operations.

As described above, according to this embodiment, the orthogonal transform basis referred to least frequently is identified with reference to the management table for reference history of orthogonal transform bases 601. In addition, the orthogonal transform basis transfer control unit 502 writes the orthogonal transform basis to an area which is of the orthogonal transform basis storage unit 503 and stores the orthogonal transform basis referred to least frequently so far. Accordingly, the orthogonal transform basis unlikely to be referred to is not stored in the orthogonal transform basis storage unit 503. Thus, it is possible to store the orthogonal transform basis highly likely to be referred to frequently in the orthogonal transform basis storage unit 503. As a result, it is possible to reduce the number of times of access to the orthogonal transform basis accumulation unit 510. In this way, it is possible to reduce the memory bandwidth and the memory access latency required for the orthogonal transform bases.

In this embodiment, when the orthogonal transform basis storage unit 503 does not store the orthogonal transform basis indicated by the orthogonal transform basis ID, the orthogonal transform basis referred to least frequently is identified with reference to the management table for reference history of orthogonal transform bases 601. In the above description, the orthogonal transform basis transfer control unit 502 reads out, from the orthogonal transform basis accumulation unit 510, the orthogonal transform basis indicated by the orthogonal transform basis ID, and writes the read-out orthogonal transform basis to an area which is of the orthogonal transform basis storage unit 503 and stores the orthogonal transform basis referred to least frequently. However, the area to which the orthogonal transform basis is written is not limited thereto. For example, the orthogonal transform basis may be written to: an area that stores the orthogonal transform basis used least frequently recently; an area that stores the orthogonal transform basis used most frequently recently; or an area that stores the orthogonal transform basis referred to most frequently so far. Any other area selection method is possible as long as the method enables reduction in the access to the orthogonal transform basis storage unit 503 and reduction in the required capacity of the orthogonal transform basis storage unit 103.

In this embodiment, the orthogonal transform basis accumulation unit 510 is a storage unit other than the memory 509, but the same storage unit may function as the orthogonal transform basis accumulation unit 510 and the memory 509. In other words, the orthogonal transform basis accumulation unit 510 may be configured to include or to be included in the memory 509.

The orthogonal transform basis is generated by the orthogonal transform basis generating unit 516 in this embodiment, but this is an example. It is also good that an orthogonal transform basis is determined in advance between the coding apparatus 600 and a decoding apparatus, and is held by the both.

Embodiment 7

Figure 24:
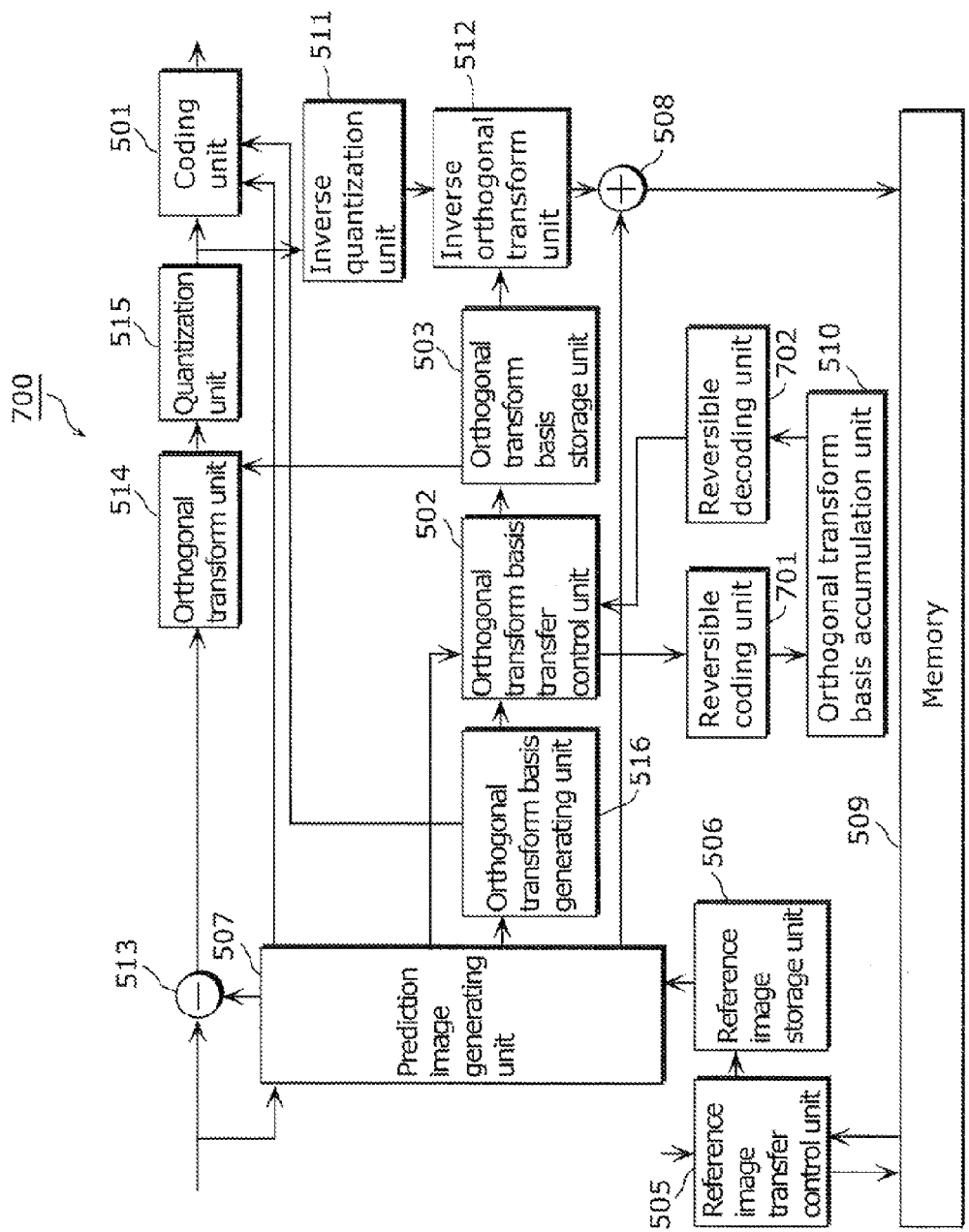
FIG. 24 is a block diagram showing a structure of a coding apparatus according to Embodiment 7 of the present invention.

FIG. 24 is a block diagram showing a structure of a coding apparatus according to Embodiment 7 of the present invention. In FIG. 24, the same structural elements as those in FIG. 18 are assigned with the same reference signs, and the same descriptions thereof are not repeated.

A coding apparatus 700 shown in FIG. 24 includes a coding unit 501, an orthogonal transform basis transfer control unit 502, an orthogonal transform basis storage unit 503, a management table for storage states of orthogonal transform bases 504, a reference image transfer control unit 505, a reference image storage unit 506, a prediction image generating unit 507, an adder 508, a memory 509, an orthogonal transform basis accumulation unit 510, an inverse quantization unit 511, an inverse orthogonal transform unit 512, a subtractor 513, an orthogonal transform unit 514, a quantization unit 515, an orthogonal transform basis generating unit 516, a reversible coding unit 701, and a reversible decoding unit 702. Unlike the coding apparatus 500 according to Embodiment 5, the coding apparatus 700 shown in FIG. 24 includes the reversible coding unit 701 and the reversible decoding unit 702, and does not include the management table for storage states of orthogonal transform bases 504.

The reversible coding unit 701 reversibly codes the orthogonal transform bases included in the coded stream in order to be used for inverse orthogonal transform. More specifically, the reversible coding unit 701 has a function of reversibly coding the orthogonal transform bases generated by the orthogonal transform basis generating unit 516, and writing the reversibly coded orthogonal transform bases into the orthogonal transform basis accumulation unit 510.

The reversible decoding unit 702 reversibly decodes an orthogonal transform basis identified based on identification information among the orthogonal transform bases reversibly coded by the reversible coding unit 701, and writes the identified reversibly decoded orthogonal transform basis into the orthogonal transform basis accumulation unit 510 via the orthogonal transform basis transfer control unit 502. More specifically, the reversible decoding unit 702 has a function of reading out the orthogonal transform bases stored in the orthogonal transform basis accumulation unit 510, reversibly decoding the read-out orthogonal transform bases, and writing the reversibly-decoded orthogonal transform bases to the orthogonal transform basis storage unit 503. It is to be noted that, the reversible decoding unit 702 may write the at least one orthogonal transform basis to the orthogonal transform basis storage unit 503 without the control by the orthogonal transform basis transfer control unit 502.

Figure 25:
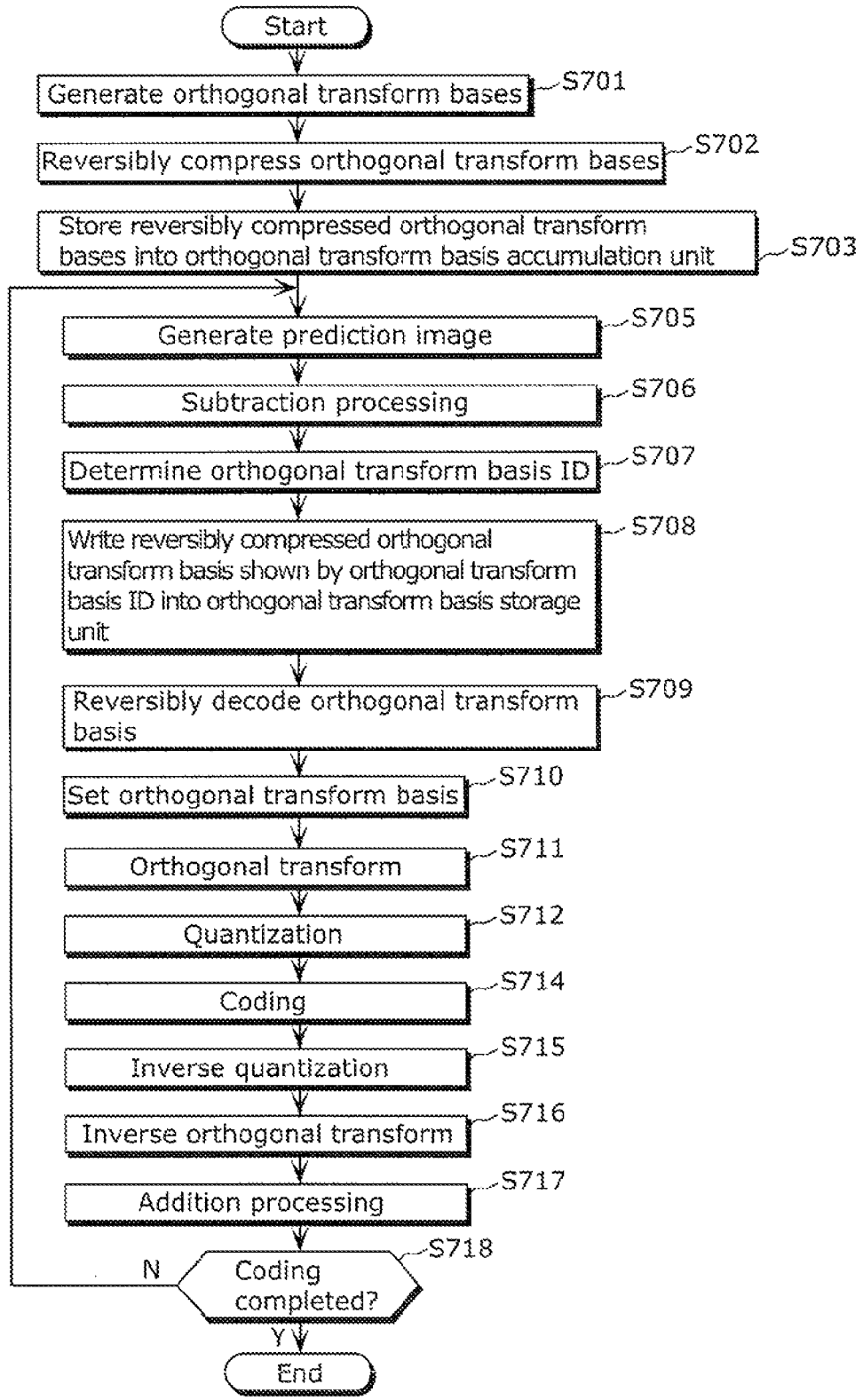
FIG. 25 is a flowchart of the coding operations performed by the coding apparatus according to Embodiment 7 of the present invention.

Next, a description is given of coding operations performed by the coding apparatus 700 configured as mentioned above. FIG. 25 is a flowchart of the coding operations performed by the coding apparatus according to Embodiment 7 of the present invention.

As shown in FIG. 25, first the orthogonal transform basis generating unit 516 which receives a current image generates orthogonal transform bases for use in the following coding (S701), and outputs the generated orthogonal transform bases.

Next, the reversible coding unit 701 reversibly codes (reversibly compresses) the orthogonal transform bases decoded by the decoding unit 516 (S702).

Next, the orthogonal transform basis transfer control unit 502 writes, to the orthogonal transform basis accumulation unit 510, the orthogonal transform bases reversibly coded by the reversible coding unit 701 (S703).

Here, the processes of S705 to S707 are the same as the processes of S503 to S506, and thus the same descriptions thereof are not repeated.

Next, in S707, the orthogonal transform basis transfer control unit 502 reads out the reversibly coded orthogonal transform basis indicated by the orthogonal transform basis ID from the orthogonal transform basis accumulation unit 510 (S708).

Next, the reversible decoding unit 702 reversibly decodes the reversibly-coded orthogonal transform basis, and writes the reversibly-decoded orthogonal transform basis to the orthogonal transform basis storage unit 503 (S709).

Next, the orthogonal transform unit 514 reads and sets the to orthogonal transform basis stored in the orthogonal transform basis storage unit 503 (S710). The orthogonal transform unit 514 performs orthogonal transform on the prediction error signal output by the subtractor 513 (S711), and outputs the orthogonal transform coefficient.

Here, the processes of S712 to S718 are the same as the processes of S511 to S518, and thus the same descriptions thereof are not repeated.

As described above, the coding apparatus 700 performs the coding operations.

As described above, this embodiment makes it possible to reduce the data size of the orthogonal transform bases to be stored in the orthogonal transform basis accumulation unit 510 by compressing the orthogonal transform bases using the reversible coding unit 701. In this way, it is possible to reduce the memory capacity required for the orthogonal transform bases.

It is to be noted that the decoding apparatus 700 shown in FIG. 24 may include at least the aforementioned management table for storage states of orthogonal transform bases 504, and may additionally include the management table for reference history of orthogonal transform bases 601. The latter option is preferable because it is possible to reduce the memory bandwidth and the memory access latency as described earlier, in addition to reduction in the memory capacity required for the orthogonal transform bases.

This embodiment is described taking an example case where the orthogonal transform basis generating unit 516 generates orthogonal transform bases, the reversible coding unit 701 codes the generated orthogonal transform bases and stores them into the orthogonal transform basis accumulation unit 510, and the reversible decoding unit 702 decodes the stored orthogonal transform bases. However, this is a mere example case. For example, the coding unit 501 may store, in the orthogonal transform basis accumulation unit 510, the orthogonal transform basis part coded into the coded stream, and the reversible decoding unit may decode the orthogonal transform basis part.

In this embodiment, the orthogonal transform basis accumulation unit 510 is a storage unit other than the memory 509, but the same storage unit may function as the orthogonal transform basis accumulation unit 510 and the memory 509. In other words, the orthogonal transform basis accumulation unit 510 may be configured to include or to be included in the memory 509.

The orthogonal transform basis is generated by the orthogonal transform basis generating unit 516 in this embodiment, but this is an example. It is also good that an orthogonal transform basis is determined in advance between the coding apparatus 600 and a decoding apparatus, and is held by the both.

Embodiment 8

The image coding apparatus, image decoding apparatus, image coding method and/or image decoding method as described in the above embodiments are applicable as applications.

For example, the processing described in each of the embodiments can be simply implemented by an independent computer system, by recording, in a recording medium, a program for implementing the image coding method and/or the image decoding method as described in the above embodiments. Here, the recording medium may be any recording medium as long as the program can be recorded, such as a magnetic disk, an optical disk, a magnetic optical disk, an IC card, and a semiconductor memory.

Hereinafter, applications to the picture coding methods and picture decoding methods described in the embodiments and systems using the same will be described.

Figure 26:
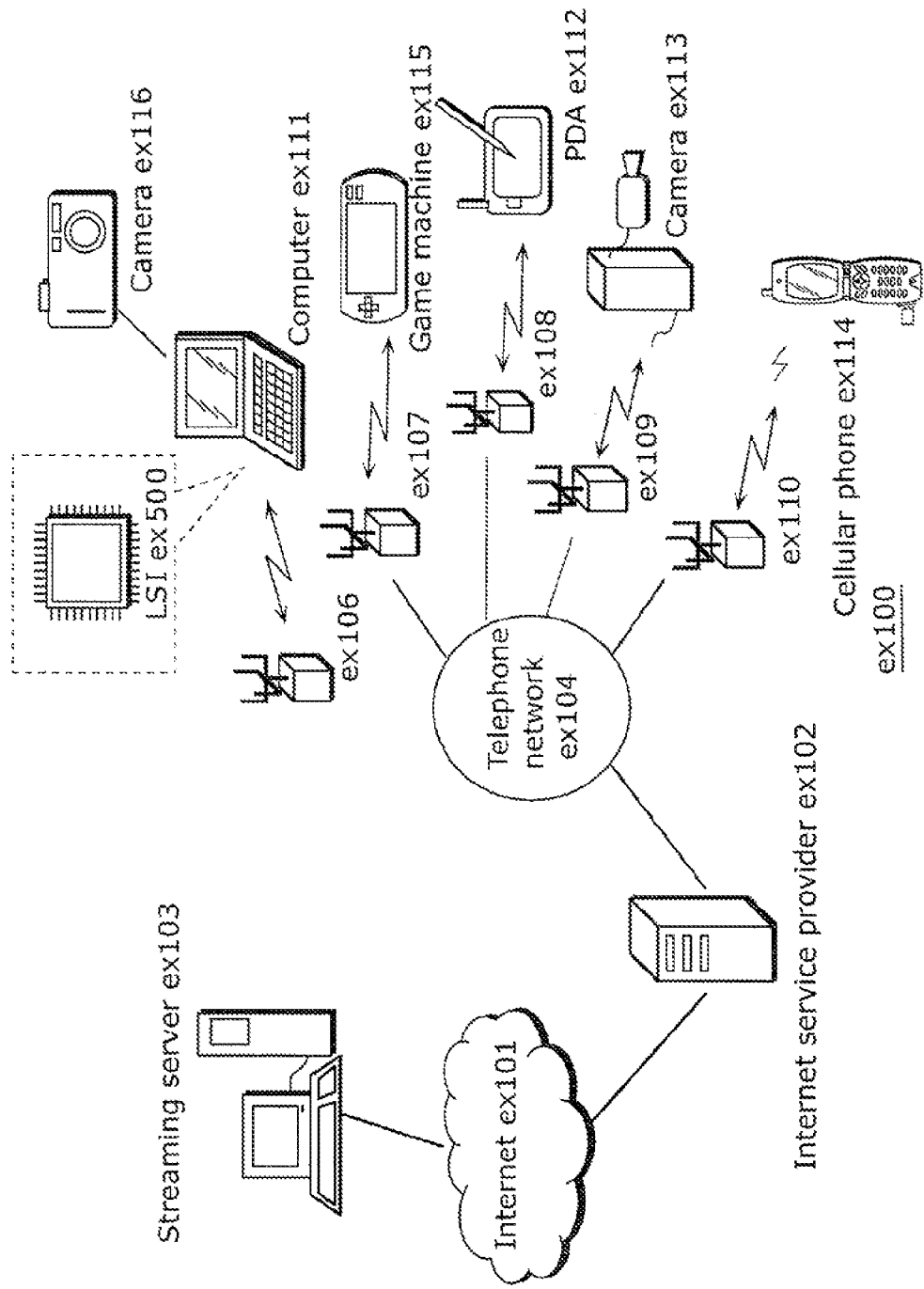
FIG. 26 is a diagram showing an overall configuration of a content providing system for achieving content distribution services.

FIG. 26 is a diagram showing an overall configuration of a content providing system ex100 for achieving content distribution services. In the content providing system ex100 as shown in FIG. 26, the area for providing communication services is divided into cells having a desired size, and each of base stations ex107 to ex110 which are fixed wireless stations is placed in a corresponding one of the cells.

In the content providing system ex100, devices such as a computer ex111, a personal digital assistant (PDA) ex112, a camera ex113, a cellular phone ex114, and a game machine ex115 are connected to the Internet ex101 via a telephone network ex104 as well as the base stations ex107 to ex110.

Here, the configuration of the content providing system ex100 is not limited to the configuration shown in FIG. 26, and a combination in which any of the elements are combined is acceptable. In addition, each of the devices in the content providing system ex100 may be directly connected to the telephone network ex104, rather than via the base stations ex107 to ex110 which are the fixed wireless stations. Furthermore, the devices may be interconnected to each other via a short distance wireless communication and others.

For example, the camera ex113, such as a digital video camera, is capable of capturing moving pictures. In addition, the camera ex116, such as a digital video camera, is capable of capturing still pictures and moving pictures.

The cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others.

More specifically, in such a live distribution, a content (for example, video of a music live show) captured by the user using the camera ex113 is subjected to the coding as described in the above embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103.

Furthermore, the data of the still pictures and moving pictures captured by not only the camera ex113 but also the camera ex116 may be transmitted to the streaming server ex103 through the computer ex111. The coding processes may be performed by the camera ex116, the computer ex111, or the streaming server ex103, or shared among them.

These coding and decoding processes are performed by an LSI ex500 generally included in each of the computer ex111 and each of the devices. Here, the LSI ex500 may be configured of a single chip or plural chips. It is to be noted that software for coding and decoding pictures may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may divide data into data portions, and process, record, and distribute the data portions.

As described above, the clients can receive and reproduce the coded data in the content providing system ex100.

In other words, the clients can receive and decode information transmitted by the user, and reproduce the decoded data in real time in the content providing system ex100, so that the user who does not have any particular right and equipment can implement personal broadcasting.

Figure 27:
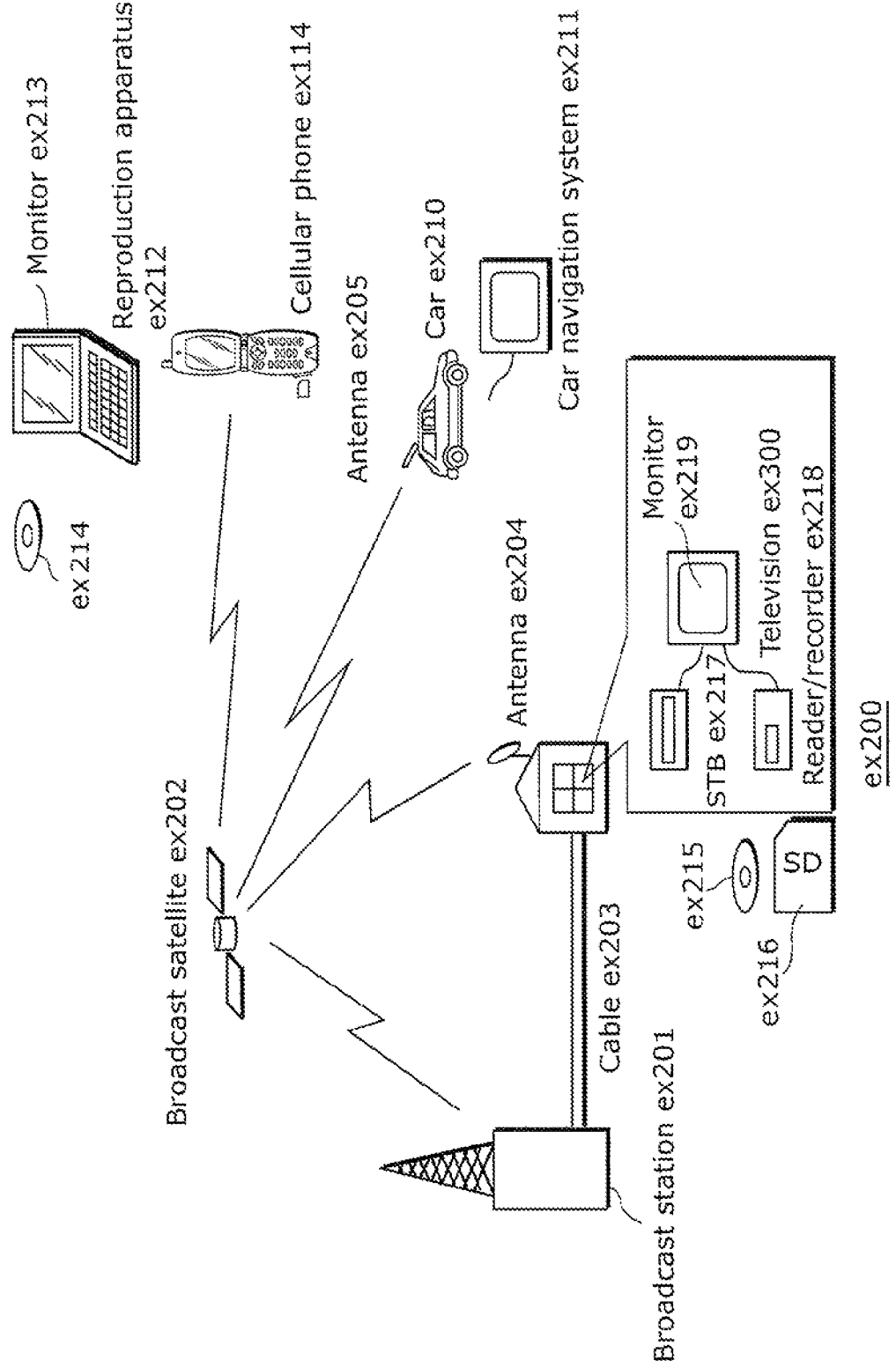
FIG. 27 is a diagram showing an overall configuration of a digital broadcasting system.

It is to be noted that the present invention is not limited to the example where at least one of the picture coding apparatuses and one of the picture decoding apparatuses in the respective embodiments are incorporated into the content providing system ex100. As shown in FIG. 27, one of the picture coding apparatuses and one of the picture decoding apparatuses in any of the above embodiments may be incorporated into a digital broadcasting system ex200. The following descriptions are given taking an example of the digital broadcasting system ex200. FIG. 27 is a diagram showing an overall configuration of the digital broadcasting system ex200.

More specifically, a broadcast station ex201 communicates or transmits a bitstream of video information via radio waves to a broadcast satellite ex202. The bitstream is a coded bitstream obtained by the picture coding method according to each of the embodiments.

Upon receipt of the bitstream, the broadcast satellite ex202 generates radio waves for broadcasting.

The antenna ex204 is a home-use antenna having a function of receiving satellite broadcasts and receives the radio waves for broadcasting from the broadcast satellite ex202.

A device that is a television (receiver) ex300, a set top box (STB) ex217, or the like decodes and reproduces a bit stream included in the radio waves for broadcasting received from the antenna ex204.

A reader/recorder ex218 is capable of reading and decoding a coded bit stream recorded on a recording medium ex215 such as a DVD and a BD. In addition, the reader/recorder ex218 is capable of coding and writing a video signal onto the recording medium ex215. Here, the reader/recorder ex218 mounts one of the image decoding apparatus and/or one of the image coding apparatus as described in the embodiments. Here, the reproduced video signals reproduced by the reader/recorder ex218 are displayed on a monitor ex219, and can be reproduced by another device or system, using the recording medium ex215 on which the coded bit stream is recorded.

It is to be noted that the set top box ex217 may be connected to one of the cable ex203 for cable television and the antenna ex204 for satellite/terrestrial wave broadcasting, may mount the image decoding apparatus inside the device itself, and may display the video signals on the monitor ex219. In addition, the picture decoding apparatus may be incorporated not in the set top box ex217 but in the television ex300.

Figure 28:
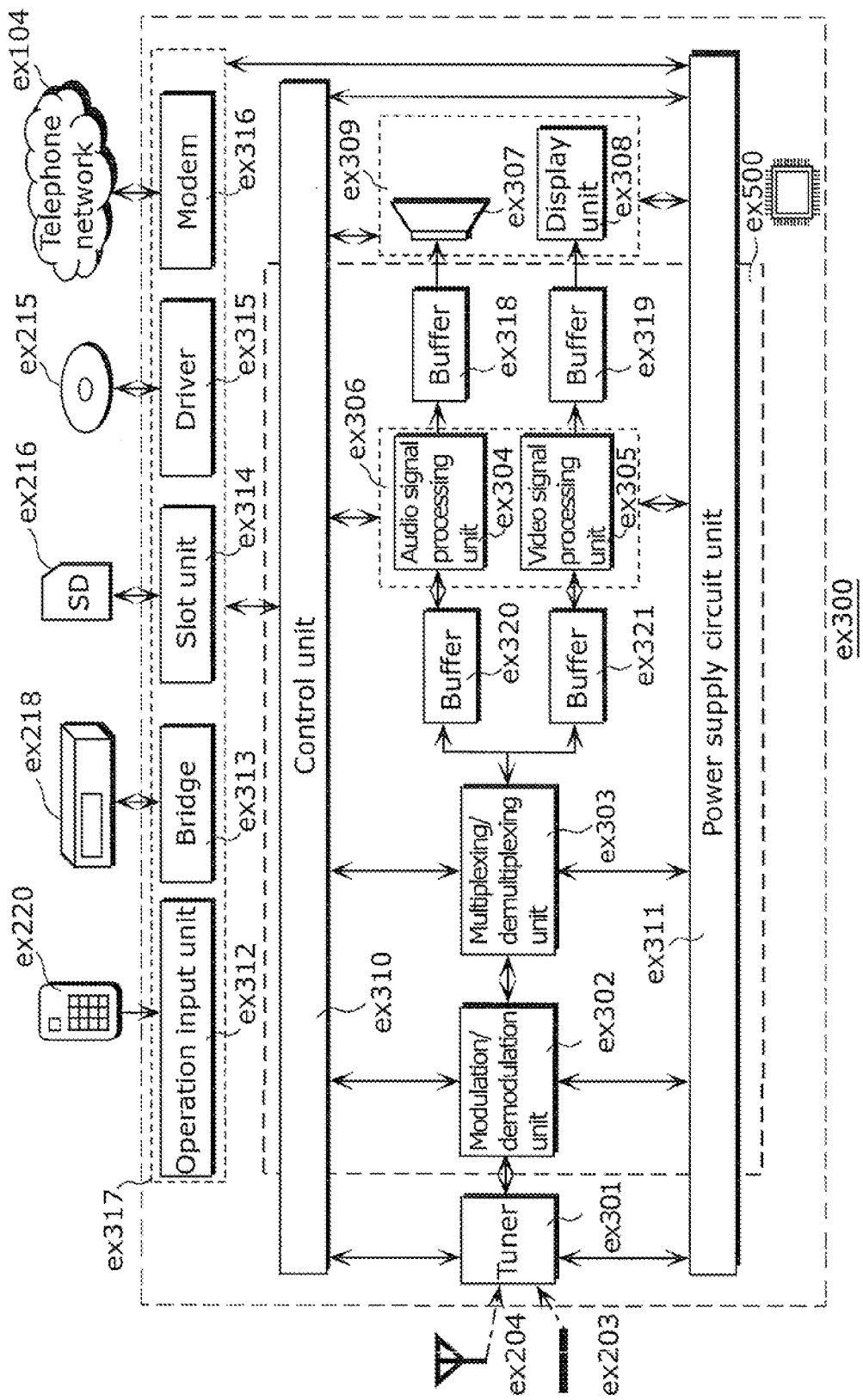
FIG. 28 is a block diagram showing an example of a structure of a television (receiver).

FIG. 28 is a block diagram showing an example of a structure of a television ex300.

The television ex300 uses one of the image decoding method and one of the image coding method as described in the embodiments. The television ex300 includes: a tuner ex301 that obtains or provides a bitstream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that integrally controls all the constituent elements of the television ex300, and a power supply circuit unit ex311 that supplies power to each of the elements.

It is to be noted that the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, a description is given of a configuration in which the television ex300 decodes data obtained from outside through the antenna ex204 and others and reproduces the decoded data.

In the television ex300, upon receipt of a user operation from a remote controller ex220 or the like, the multiplexing/demultiplexing unit ex303 demultiplexes the video data and audio data demodulated by the modulation/demodulation unit ex302, under control of the control unit ex310 including a CPU. Furthermore, in the television ex300, the audio signal processing unit ex304 decodes the demultiplexed audio data and the video signal processing unit ex305 decodes the demultiplexed video data, using the decoding method described in each of the embodiments. The output unit ex309 outputs each of the decoded video signal and audio signal. When the output unit ex309 outputs the video signal and the audio signal, the signals may be temporarily stored in buffers ex318 and ex319, or the like so that the signals are reproduced in synchronization with each other.

It is to be noted that the television ex300 may read a coded bitstream not through a broadcast or the like but from the recording media ex215 and ex216, such as a magnetic disk, an optical disk, and a SD card.

Next, a description is given of a configuration in which the television ex300 codes an audio signal and a video signal, and transmits the data outside or writes the data on a recording medium.

In the television ex300, upon receipt of a user operation from the remote controller ex220 or the like, the audio signal processing unit ex304 codes an audio signal, and the video signal processing unit ex305 codes a video signal using the coding method corresponding to the picture coding method as described in each of the embodiments, under control of the control unit ex310. The multiplexing/demultiplexing unit ex303 multiplexes the coded video signal and audio signal, and outputs the resulting signal outside. When the multiplexing/demultiplexing unit ex303 multiplexes the video signal and the audio signal, the signals may be temporarily stored in buffers ex320 and ex321, or the like so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include an element for receiving an AV input from a microphone or a camera in addition to the element for obtaining audio and video data from a broadcast or a recording medium, and may code the obtained data.

Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 29:
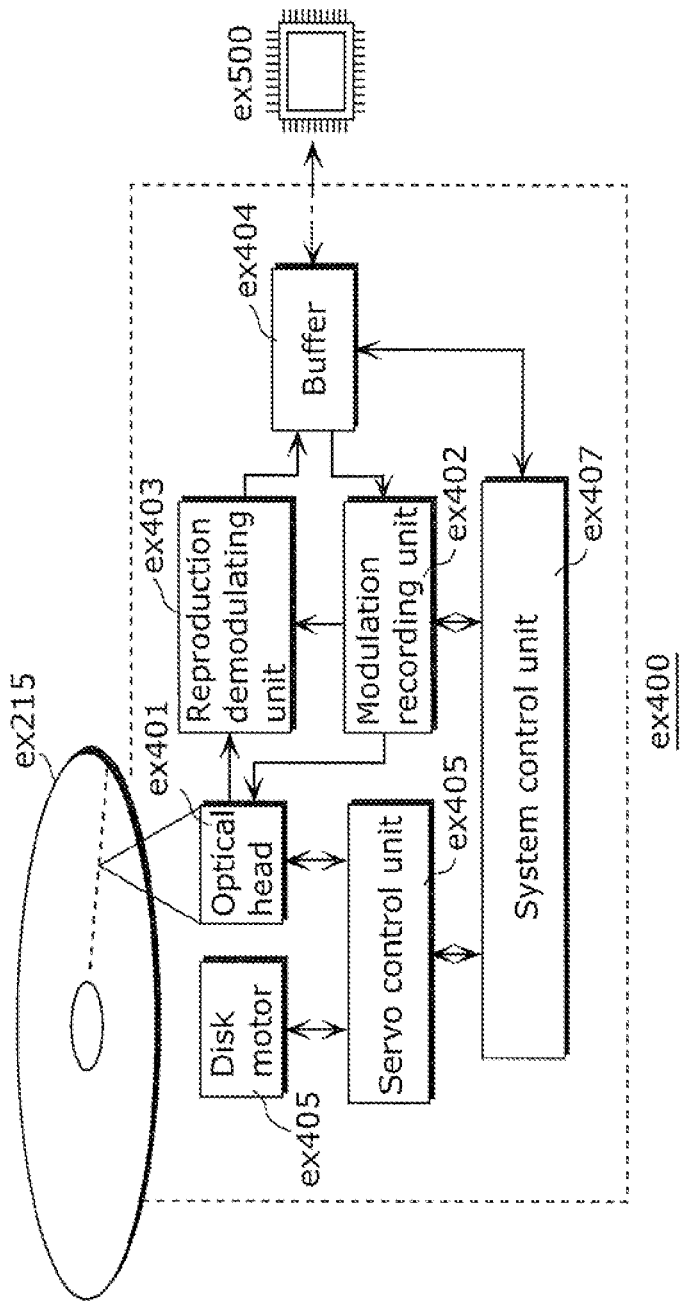
FIG. 29 is a block diagram showing an example of a structure of an information reproducing and recording unit that reads and writes information from and on a recording medium that is an optical disk.

As an example, FIG. 29 illustrates a configuration of an information reproducing/recording unit ex400 when data is read or written from or in an optical disk. FIG. 29 is a block diagram showing an example of a structure of an information reproducing and recording unit that reads and writes information from and on a recording medium that is an optical disk.

The information reproducing/recording unit ex400 as shown in FIG. 29 includes constituent elements ex401 to ex407 to be described hereinafter.

The optical head ex401 irradiates a laser spot on a recording surface of the recording medium ex215 that is an optical disk to write information, and detects reflected light from the recording surface of the recording medium ex215 to read the information.

The modulation recording unit ex402 electrically drives a semiconductor laser included in the optical head ex401, and modulates the laser light according to recorded data.

The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information.

The buffer ex404 temporarily holds the information to be recorded on the recording medium ex215 and the information reproduced from the recording medium ex215.

A disk motor ex405 rotates the recording medium ex215.

A servo control unit ex406 moves the optical head ex401 to a predetermined information track while controlling the rotation drive of the disk motor ex405 so as to follow the laser spot.

The system control unit ex407 controls overall the information reproducing/recording unit ex400. The system control unit ex407 implements the reading and writing processes by (i) generating and adding new information as necessary, based on various information stored in the buffer ex404, and (ii) recording and reproducing information through the optical head ex401 while causing the modulation recording unit ex402, the reproduction demodulating unit ex403, and the servo control unit ex406 to operate in a coordinated manner. The system control unit ex407 includes, for example, a microprocessor, and executes processing by causing a computer to execute a program for read and write.

The optical head ex401 irradiates a laser spot in the above description. However, it is to be noted that the optical head ex401 may perform high-density recording using near field light.

Figure 30:
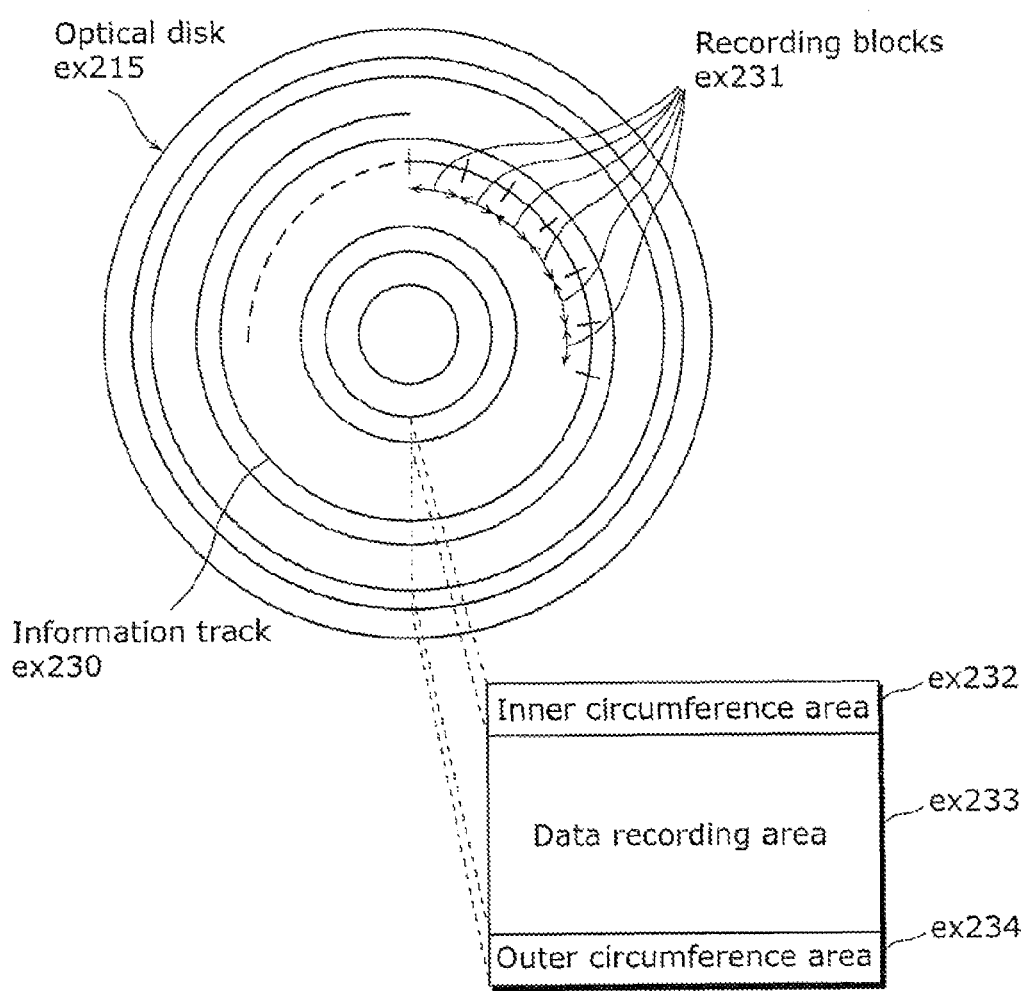
FIG. 30 shows an example of a structure of a recording medium that is an optical disk.

FIG. 30 shows an example of a structure of a recording medium that is an optical disk. FIG. 30 shows a schematic view of the recording medium ex215 that is the optical disk.

On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit of recording data. A device that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data.

The information reproducing/recording unit 400 reads and writes coded audio data, coded video data, or coded data obtained by multiplexing the coded audio data and the coded video data, from and on the data recording area ex233 of the recording medium ex215.

Although an optical disk having a single layer, such as a DVD and a BD is described as an example in the description, it is to be noted that the optical disk is not limited thereto, and may be an optical disk having a multilayer structure and capable of recording on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device that is, for example, the car navigation system ex211 set in the car ex210, in a digital broadcasting system ex200. Here, a configuration of the car navigation system ex211 will be a configuration, for example, including a GPS receiving unit from the configuration illustrated in FIG. 28. The same will be true for the configuration of the computer ex111, the cellular phone ex114, and others. Furthermore, similarly to the television ex300, a terminal such as the cellular phone ex114 may have three types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the picture coding method and picture decoding method in each of the embodiments can be used in any of the apparatuses, devices and systems described. Thus, the advantageous effects described in the embodiments can be obtained.

Furthermore, the present invention is not limited to the above-described embodiments, and various modifications and revisions are possible without departing from the scope of the present invention.

Embodiment 9

Figure 31:
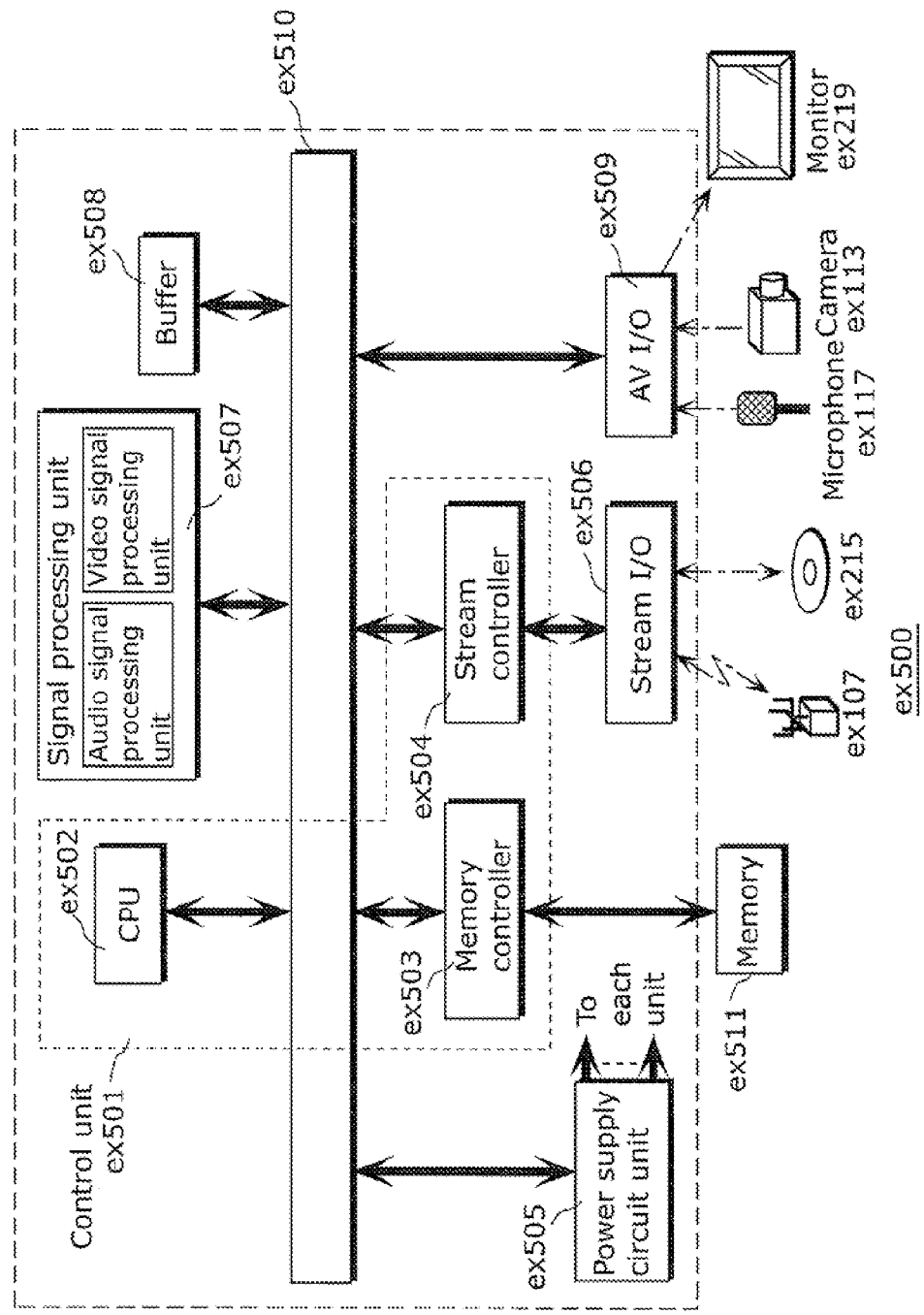
FIG. 31 is a block diagram showing an example of a structure of an integrated circuit for performing the image coding method and the image decoding method according to each of the embodiments of the present invention.

Each of the picture coding method and apparatus and picture decoding method and apparatus as shown in the embodiments is typically implemented as an LSI. As an example, FIG. 31 shows a structure of a single-chip LSI ex500. Here, FIG. 31 is a block diagram showing an example of a structure of an integrated circuit for performing the image coding method and the image decoding method according to each of the embodiments.

The LSI ex500 includes elements ex502 to ex509 to be described below, and the elements are connected to each other through a bus ex510. The power supply circuit unit ex505 is activated by supplying each of the elements with power when power is on.

For example, when coding is performed, the LSI ex500 receives an input of an AV signal from a microphone ex117, a camera ex113, and others through an AV I/O ex509, under control of the control unit ex501 including the CPU ex502, the memory controller ex503, the stream controller ex504. The received AV signal is temporarily stored in a memory ex511 such as an SDRAM outside the LSI ex500. The stored data is divided into data portions according to the processing amount and speed as necessary. Then, the data portions are transmitted to a signal processing unit ex507, under control of the control unit ex501. The signal processing unit ex507 codes an audio signal and/or a video signal. Here, the coding of the video signal is the coding as described in the above embodiments. Furthermore, depending on cases, the signal processing unit ex507 multiplexes the coded audio data and the coded video data, and a stream I/O ex504 provides the multiplexed data outside. The provided bit stream is transmitted to a base station ex107, or written into a recording medium ex215. Here, it is good to save the data into the buffer ex508 for synchronization at the time of multiplexing the data.

Figure 32:
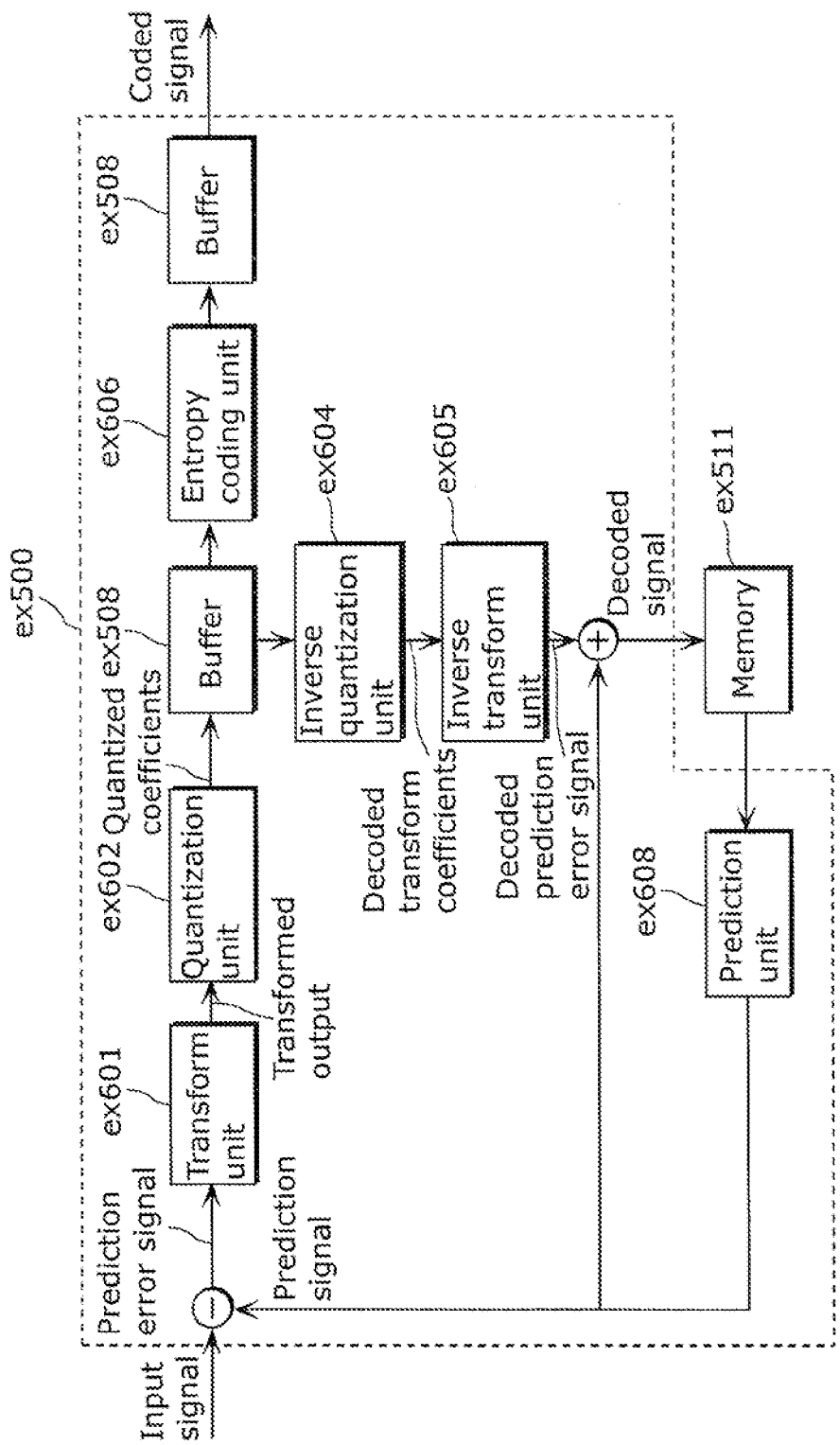
FIG. 32 is a block diagram showing the image coding according to each of the embodiments and performed by the integrated circuit.

FIG. 32 is a block diagram for simply explaining the coding performed here. In other words, FIG. 32 is a block diagram showing the image coding according to each of the embodiments and performed by the integrated circuit. As shown in FIG. 32, the prediction error signal that is a difference between an input signal and a prediction signal is transformed by the transform unit ex601, and then is quantized by the quantization unit ex602. The quantized coefficients are entropy coded by the entropy coding unit ex606 to generate a coded signal, and the coded signal is output. As described above taking an example of the television ex300 with reference to FIG. 28, this output may be saved in the buffer ex508 or a memory ex511 in order to be multiplexed with the coded audio data. The inverse quantization unit ex604, the inverse transform unit ex605, and the prediction unit ex608 function as a delay unit which enables comparison between a current signal and a prediction signal generated from the signal preceding the current signal.

It is good to perform adjustment for preventing an overflow and/or an underflow on the LSI ex500. Examples of such adjustment include saving quantized coefficients into a buffer, for example, the buffer ex508 or the memory ex511 provided inside the LSI ex500. Other than the above adjustment for the quantized coefficients, it is good to divide the data into data portions and process the data portions in parallel according to the processing amount and processing speed, and to adjust the processing while saving, as necessary, the data that is currently being processed in a recording unit such as an internal memory or an external storage.

The above-described processing is performed under control of the control unit ex501.

For example, in the case of decoding, the LSI ex500 saves, in the memory ex511 etc., the coded data obtained from the base station ex107 through the stream I/O ex506 or read out from the recording medium ex215, under control of the control unit ex501. Under control of the control unit ex501, the stored data is divided into data portions according to the processing amount and processing speed as necessary, is transmitted to the signal processing unit ex507, and then is decoded by the signal processing unit ex507 into audio data and/or video data. Here, the decoding of the video signal is the decoding as described in the above embodiments. Furthermore, depending on cases, it is good to save, in the buffer ex508, both the decoded audio signal and the decoded video signal so that these signals can be reproduced in synchronization with each other. The decoded output signals are provided from an output unit that is the cellular phone ex114, the game machine ex115, the television ex300, or the like, through the memory ex511 etc. as necessary.

Figure 33:
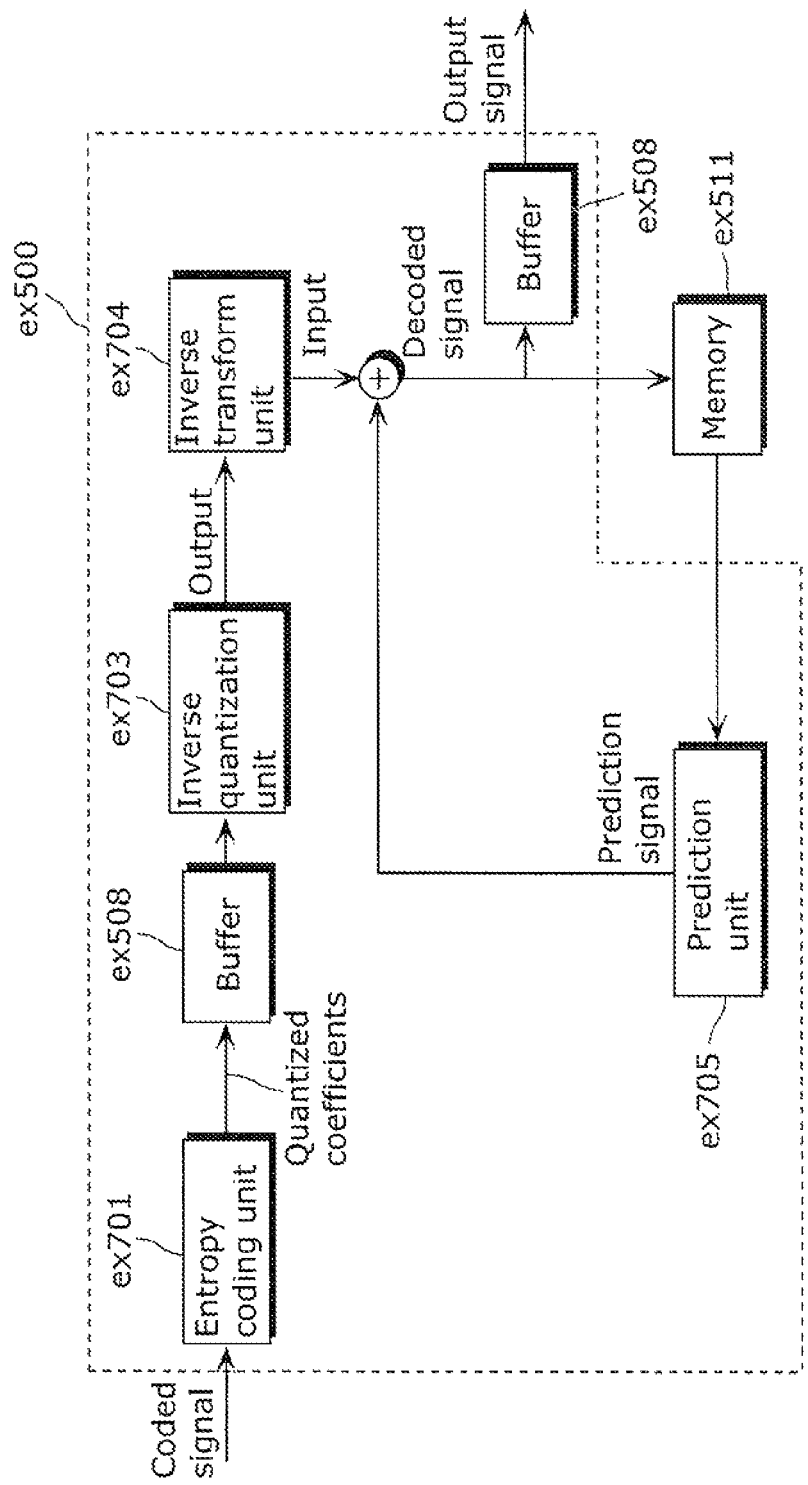
FIG. 33 is a block diagram showing the image coding according to each of the embodiments and performed by the integrated circuit.
Figure 34:
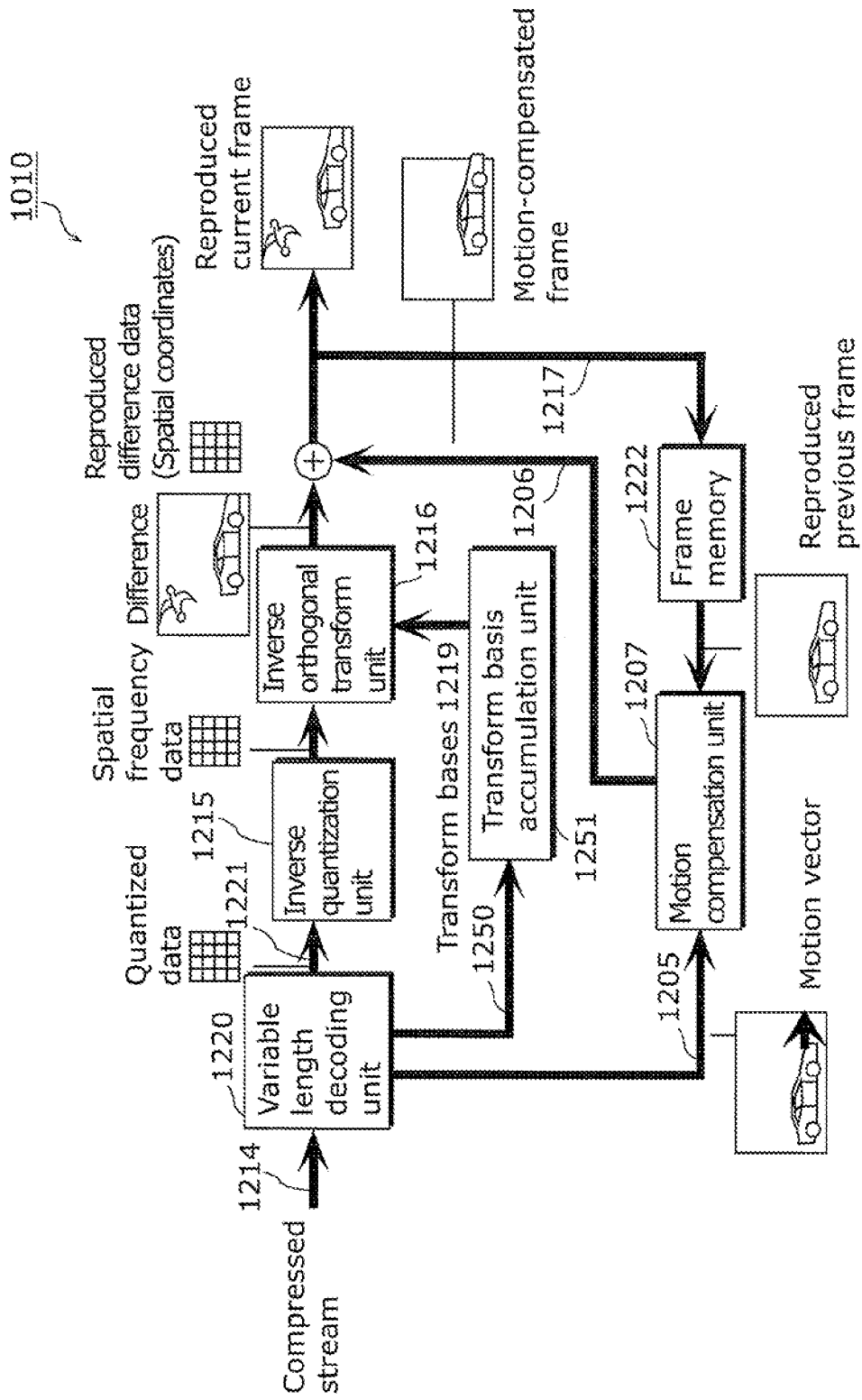
FIG. 34 is a block diagram showing a structure of a decoding apparatus in a conventional example.

FIG. 33 is a block diagram for simply explaining the decoding performed here. FIG. 33 is a block diagram showing the image decoding according to each of the embodiments and performed by the integrated circuit.

As shown in FIG. 33, the input coded signal is entropy-decoded by the entropy decoding unit ex701. The quantized coefficients obtained through the entropy decoding are inversely quantized by the inverse quantization unit ex703, and then inversely transformed by the inverse transform unit ex704. The inverse transform here means transform in decoding, and is not always limited to the inverse of the transform in the coding. To the output, a prediction signal is added. Then, the output including the prediction signal is output as a decoded signal to outside. The memory ex511 stores decoded signals, and functions as a delay unit which enables reference in the decoding of the succeeding coded signals. The prediction unit ex705 generates a prediction signal based on the decoded signal stored in the memory ex511. As the description of output to outside given above taking an example of the television ex300 with reference to FIG. 28, the decoded signals may be saved in the buffer ex508 or in the external memory ex511 so that the output decoded signal can be displayed in synchronization with the decoded audio signals. It is good to divide the quantized coefficients into predetermined units of processing, and processes the units of quantized coefficients in parallel, so as to prevent an overflow and/or underflow in the processing. In this case, for example, the quantized coefficients may be stored in the buffer ex508 or the memory ex511. The above-described processing is performed under control of the control unit ex501.

Although the above memory ex511 is described as a device outside the LSI ex500, the memory ex511 may be configured inside the LSI ex500. The number of buffers ex508 is not limited to one, and a plurality of buffers may be provided. All of the elements of LSI ex500 may be integrated into a single chip or each of the elements may be configured as a chip.

The name used here is LSI, but it may also be called IC, system LSI, super LSI, or ultra LSI depending on the degree of integration.

Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate functional blocks. Application of biotechnology is one such possibility.

As described above, the image coding apparatus, the image decoding apparatus, the image coding method and/or the image decoding method as described in the above embodiments are applicable as applications.

It is to be noted that each of the functional blocks making up the decoding apparatus 100 as shown in FIG. 1 in Embodiment 1 is typically implemented in the form of an LSI that is an integrated circuit. Each of the functional blocks may be implemented as a separate chip such as a decoding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 200 as shown in FIG. 6 in Embodiment 2 is typically implemented in the form of an LSI that is an integrated circuit. Each of the functional blocks may be implemented as a separate chip such as a decoding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 300 as shown in FIG. 9 in Embodiment 3 is typically implemented in the form of an LSI that is an integrated circuit. Each of the functional blocks may be implemented as a separate chip such as a decoding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 400 as shown in FIG. 16 in Embodiment 4 is typically implemented in the form of an LSI that is an integrated circuit. Each of the functional blocks may be implemented as a separate chip such as a decoding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 500 as shown in FIG. 17 in Embodiment 5 is typically implemented in the form of an LSI that is an integrated circuit. Each of the functional blocks may be implemented as a separate chip such as a coding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 600 as shown in FIG. 22 in Embodiment 6 is typically implemented in the form of an LSI that is an integrated circuit. Each of the functional blocks may be implemented as a separate chip such as a coding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 700 as shown in FIG. 24 in Embodiment 7 is typically implemented in the form of an LSI that is an integrated circuit. Each of the functional blocks may be implemented as a separate chip such as a coding circuit and an external memory. Alternatively, at least one or all of the functional blocks may be integrated into a single chip. In other words, these functional blocks may be implemented as an integrated system on a single LSI.

In addition, in any one(s) of Embodiments 1 to 7, the orthogonal transform basis accumulation unit 110, any one(s) of the orthogonal transform basis accumulation unit 510, the memory 109, and the memory 509 may be configured in form of a DRAM, an SRAM, or a flip-flop. In short, any recordable devices are possible.

In Embodiment 1 to 7, each of the memory 109, the memory 509, the orthogonal transform basis accumulation unit 110, the orthogonal transform basis accumulation unit 510, the orthogonal transform basis storage unit 103, and the orthogonal transform basis storage unit 503 is typically configured in the form of a DDR. However, it is to be noted that each element does not need to be always configured in the form of the DDR, and may be configured in the form of an SRAM or a flip-flop. In short, any recordable devices are possible. Preferably, each of the orthogonal transform basis accumulation unit 110 and the orthogonal transform basis accumulation unit 510 may be configured using a low-speed storage device, and each of the orthogonal transform basis storage unit 103 and the orthogonal transform basis storage unit 503 be configured using a high-speed storage device.

In addition, in each of Embodiment 1 to 7, the orthogonal transform performed by the inverse orthogonal transform unit 112, the inverse orthogonal transform unit 512, and the orthogonal transform unit 514 may be any orthogonal transform such as Karhunen-Loeve transform using variable orthogonal transform bases.

Up to this point, the image decoding apparatus, the image coding apparatus, the image decoding circuit, and the image decoding method according to the present invention have been described based on the embodiments. However, the present invention is not limited to these embodiments. Those skilled in the art will readily appreciate that many modifications are possible in the exemplary embodiments, to and also other embodiments are obtainable by arbitrarily combining the structural elements in the embodiments without materially departing from the scope of the present invention. Accordingly, all such modifications and other embodiments are intended to be included within the scope of the present invention.

INDUSTRIAL APPLICABILITY

The present invention is applicable to an image decoding apparatus, an image coding apparatus, an image decoding circuit, and an image decoding method. The present invention is particularly useful in apparatuses which decode and/or display pictures that make up a video. Examples of such apparatuses include a cellular telephone, a DVD device, a BD device, a personal computer, a television telephone, a set top box, a digital television receiver, an automobile, a security system.

REFERENCE SIGNS LIST

100 Decoding apparatus
101 Decoding unit
102, 502 Orthogonal transform basis transfer control unit
103, 503 Orthogonal transform basis storage unit
104, 504 Management table for storage states of orthogonal transform bases
105, 505 Reference image transfer control unit
106, 506 Reference image storage unit
107, 507 Prediction image generating unit
108, 508 Adder
109, 509 Memory
110, 510 Orthogonal transform basis accumulation unit
111, 511, 1215 Inverse quantization unit
112, 512, 1216 Inverse orthogonal transform unit
201, 601 Management table for reference history of orthogonal transform bases
301 Pre-decoding unit
302 Management table for statistical information of orthogonal transform bases
401, 701 Reversible coding unit
402, 702 Reversible decoding unit
501 Coding unit
513 Subtractor
514 Orthogonal transform unit
515 Quantization unit
516 Orthogonal transform basis generating unit
1222 Frame memory
ex100 Content providing system
ex101 Internet
ex102 Internet service provider
ex103 Streaming server
ex104 Telephone network
ex106, ex107, ex108, ex109, ex110 Base station
ex111 Computer
ex112 PDA
ex113 Camera
ex114 Cellular telephone
ex115 Game machine
ex116 Camera
ex117 Microphone
ex200 Digital broadcasting system
ex201 Broadcast station
ex202 Broadcast satellite
ex203 Cable
ex204, ex205 Antenna
ex210 Car
ex211 Car navigation system
ex212 Reproduction apparatus
ex213 Monitor
ex215, ex216 Recording medium
ex217 Set top box
ex218 Reader/recorder
ex219 Monitor
ex230 Information track
ex231 Recording blocks
ex232 Inner circumference area
ex233 Data recording area
ex234 Outer circumference area
ex300 Television (receiver)
ex301 Tuner
ex302 Modulation/demodulation unit
ex303 Multiplexing/demultiplexing unit
ex304 Audio signal processing unit
ex305 Video signal processing unit
ex306 Signal processing unit
ex307 Speaker
ex308 Display unit
ex309 Output unit
ex310 Control unit
ex311 Power supply circuit unit
ex312 Operation input unit
ex313 Bridge
ex314 Slot unit
ex315 Driver
ex316 Modem 1
ex317 Interface unit
ex318, ex319 Buffer
ex400 Information reproducing/recording unit
ex401 Optical head
ex402 Modulation and recording unit
ex403 Reproduction and demodulation unit
ex404 Buffer
ex405 Disk motor
ex406 Servo control unit
ex407 System control unit
ex500 LSI
ex501 Control unit
ex502 CPU
ex503 Memory controller
ex504 Stream controller
ex505 Power circuit unit
ex506 Stream I/O
ex507 Signal processing unit
ex508 Buffer
ex509 AV I/O
ex510 Bus
ex511 Memory
ex601 Transform unit
ex602 Quantization unit
ex604 Inverse quantization unit ex605 Inverse transform unit
ex606 Entropy coding unit
ex608 Prediction unit
ex701 Entropy decoding unit
ex703 Inverse quantization unit
ex704 Inverse Transform unit
ex705 Prediction unit

The invention claimed is:

1. An image decoding apparatus which decodes a coded stream, comprising:
   a decoding unit configured to decode, from the coded stream, identification information identifying each of a plurality of orthogonal transform bases for use in inverse orthogonal transform of the coded stream;
   an accumulation unit configured to store the plurality of orthogonal transform bases for use in the inverse orthogonal transform of the coded stream;
   a storage unit configured to store at least one orthogonal transform basis which is required for current inverse orthogonal transform of a current block, out of the orthogonal transform bases stored in said accumulation unit;
   an inverse orthogonal transform unit configured to perform the current inverse orthogonal transform using the at least one orthogonal transform basis stored in said storage unit and identified based on the identification information; and
   a transfer control unit configured to transfer, from said accumulation unit to said storage unit, the at least one orthogonal transform basis identified based on the identification information.

2. The image decoding apparatus according to claim 1, wherein said transfer control unit is configured to transfer the at least one orthogonal transform basis identified based on the identification information from said accumulation unit to said storage unit, only when the at least one orthogonal transform basis identified based on the identification information is not yet stored in said storage unit.

3. The image decoding apparatus according to claim 2, wherein said accumulation unit is configured to store, in advance, the plurality of orthogonal transform bases for use in the inverse orthogonal transform of the coded stream,
   said image decoding apparatus further comprises a storage state management unit configured to manage information indicating whether or not each of the orthogonal transform bases identified based on the identification information is already stored in said storage unit, and
   said transfer control unit is configured to transfer, based on the information managed by said storage state management unit, a current one of the orthogonal transform bases identified based on the identification information from said accumulation unit to said storage unit, only when the current orthogonal transform basis identified based on the identification information is not yet stored in said storage unit.

4. The image decoding apparatus according to claim 2, wherein said decoding unit is configured to decode, from the coded stream, at least (i) some of the plurality of transform bases for use in the inverse orthogonal transform of the coded stream and (ii) identification information identifying each of the orthogonal transform bases required,
   said image decoding apparatus further comprises a storage state management unit configured to manage information indicating whether or not each of the orthogonal transform bases identified based on the identification information is already stored in said storage unit, and
   said transfer control unit is configured to transfer, based on the information managed by said storage state management unit, a current one of the orthogonal transform bases identified based on the identification information from said accumulation unit to said storage unit, only when the current orthogonal transform basis identified based on the identification information is not yet stored in said storage unit.

5. The image decoding apparatus according to claim 3, wherein said transfer control unit is configured to transfer a current one of the orthogonal transform bases identified based on the identification information from said accumulation unit to an area which is of said storage unit and stores an orthogonal transform basis transferred from said accumulation unit at earliest time, only when it is found out, with reference to the information managed by said storage state management unit, that the current orthogonal transform basis identified based on the identification information is not yet stored in said storage unit.

6. The image decoding apparatus according to claim 3, wherein said transfer control unit is configured to transfer a current one of the orthogonal transform bases identified based on the identification information from said accumulation unit to an area which is of said storage unit and stores an orthogonal transform basis transferred from said accumulation unit most recently, only when it is found out, with reference to the information managed by said storage state management unit, that the current orthogonal transform basis identified based on the identification information is not yet stored in said storage unit.

7. The image decoding apparatus according to claim 3, wherein, only when it is found out, with reference to the information managed by said storage state management unit, that a current one of the orthogonal transform bases is not yet stored in said storage unit, said transfer control unit is configured to arbitrarily select an area which is of said storage unit and stores an orthogonal transform basis, and transfer the current orthogonal transform basis identified based on the identification information from said accumulation unit to the selected area.

8. The image decoding apparatus according to claim 3, further comprising
   a reference history management unit configured to manage use history information indicating the number of times of reference from start of decoding for each of the orthogonal transform bases,
   wherein said transfer control unit is configured to transfer a current one of the orthogonal transform bases identified based on the identification information from said accumulation unit to said storage unit, based on the information managed by said storage state management unit and the use history information managed by said reference history management unit.

9. The image decoding apparatus according to claim 8, wherein said transfer control unit is configured to transfer a current one of the orthogonal transform bases identified based on the identification information from said accumulation unit to an area which is determined, with reference to the use history information, to be of said storage unit and store an orthogonal transform basis least frequently referred to from said accumulation unit, only when it is found out, with reference to the information managed by said storage state management unit, that the current orthogonal transform basis identified based on the identification information is not yet stored in said storage unit.

10. The image decoding apparatus according to claim 8, wherein said transfer control unit is configured to transfer a current one of the orthogonal transform bases identified based on the identification information from said accumulation unit to an area which is determined, with reference to the use history information, to be of said storage unit and store an orthogonal transform basis least frequently used in a predetermined period from a past time to a current time, only when it is found out, with reference to the information managed by said storage state management unit, that the current orthogonal transform basis identified based on the identification information is not yet stored in said storage unit.

11. The image decoding apparatus according to claim 8, wherein said transfer control unit is configured to transfer a current one of the orthogonal transform bases identified based on said identification information from said accumulation unit to an area which is determined, with reference to the use history information, to be of said storage unit and store an orthogonal transform basis most frequently used in a predetermined period from a past time to a current time, only when it is found out, with reference to the information managed by said storage state management unit, that the current orthogonal transform basis is not yet stored in said storage unit.

12. The image decoding apparatus according to claim 8, wherein said transfer control unit is configured to transfer a current one of the orthogonal transform bases identified based on said identification information from said accumulation unit to an area which is determined, with reference to the use history information, to be of said storage unit and store an orthogonal transform basis most frequently referred to, only when it is found out, with reference to the information managed by said storage state management unit, that the current orthogonal transform basis is not yet stored in said storage unit.

13. The image decoding apparatus according to claim 3, further comprising:
    a pre-decoding unit configured to decode, from the coded stream, at least part of the identification information, prior to the decoding by said decoding unit; and
    a statistical information management unit configured to manage a use state of each of the at least one orthogonal transform basis identified by the identification information decoded by said pre-decoding unit and to be decoded by said decoding unit,
    wherein said transfer control unit is configured to transfer the current orthogonal transform basis from said accumulation unit to said storage unit, based on the information managed by said storage state management unit and the use state managed by said statistical information management unit.

14. The image decoding apparatus according to claim 13, wherein said transfer control unit is configured to transfer the current orthogonal transform basis identified based on said identification information from said accumulation unit to an area which is determined, with reference to the use state, to be of said storage unit and store an orthogonal transform basis to be referred to least frequently, only when it is found out, with reference to the information managed by said storage state management unit, that the current orthogonal transform basis is not yet stored in said storage unit.

15. The image decoding apparatus according to claim 1, further comprising:
    a reversible coding unit configured to reversibly code each of the orthogonal transform bases used for the inverse orthogonal transform of the coded stream; and
    a reversible decoding unit configured to reversibly decode each of the at least one orthogonal transform bases among the plurality of orthogonal transform bases reversibly coded by said reversible coding unit, and write, under control of said transfer control unit, the reversibly decoded at least one orthogonal transform basis into said storage unit.

16. An image coding apparatus which generates a coded stream, comprising:
    a generating unit configured to generate a plurality of orthogonal transform bases for use in orthogonal transform of the coded stream and identification information identifying each of the plurality of orthogonal transform bases;
    an accumulation unit configured to store the plurality of orthogonal transform bases generated by said generating unit;
    a storage unit configured to store at least one of the orthogonal transform bases stored in said accumulation unit, the at least one orthogonal transform basis being required for current orthogonal transform of a current block;
    an orthogonal transform unit configured to perform the current orthogonal transform using the at least one orthogonal transform basis stored in said storage unit and identified based on the identification information; and
    a transfer unit configured to transfer the at least one orthogonal transform basis identified based on the identification information from said accumulation unit to said storage unit, only when the at least one orthogonal transform basis identified based on the identification information is not yet stored in said storage unit.

17. The image coding apparatus according to claim 16, further comprising
    a storage state management unit configured to manage information indicating whether or not a current one of the orthogonal transform bases identified based on the identification information is stored in said storage unit,
    wherein said transfer control unit is configured to transfer the current orthogonal transform basis identified based on the identification information from said accumulation unit to said storage unit.

18. The image coding apparatus according to claim 16, further comprising
    a reference management unit configured to manage use history information indicating the number of times of reference from a start of the orthogonal transform for each of the orthogonal transform bases,
    wherein said transfer control unit is configured to transfer a current one of the orthogonal transform bases identified based on the identification information from said accumulation unit to said storage unit, based on the information managed by said storage state management unit and the use history information managed by said reference management unit.

19. The image coding apparatus according to claim 16, further comprising
    a reversible coding unit configured to reversibly code each of the plurality of orthogonal transform bases used for the orthogonal transform; and
    a reversible decoding unit configured to reversibly decode each of the at least one orthogonal transform bases which is included in the plurality of orthogonal transform bases reversibly coded by said reversible coding unit and is identified based on the identification information, and write, under control of said transfer control unit, the reversibly decoded at least one orthogonal transform basis into said accumulation unit, wherein said transfer control unit is configured to read out the at least one orthogonal transform basis from said accumulation unit, and transfer the read-out at least one orthogonal transform basis to said reversible decoding unit.

20. An image decoding circuit which decodes a coded stream, comprising:

a decoding unit configured to decode, from the coded stream, identification information identifying each of a plurality of orthogonal transform bases for use in inverse orthogonal transform of the coded stream;

an accumulation unit configured to store the plurality of orthogonal transform bases for use in the inverse orthogonal transform of the coded stream;

a storage unit configured to store at least one orthogonal transform basis which is required for current inverse orthogonal transform of a current block, out of the orthogonal transform bases stored in said accumulation unit;

an inverse orthogonal transform unit configured to perform the current inverse orthogonal transform using the at least one orthogonal transform basis stored in said storage unit and identified based on the identification information; and a transfer control unit configured to transfer, from said accumulation unit to said storage unit, the at least one orthogonal transform basis identified based on the identification information, only when the at least one orthogonal transform basis identified based on the identification information is not yet stored in said storage unit.

21. An image decoding method of decoding a coded stream, comprising:

decoding, from the coded stream, identification information identifying each of a plurality of orthogonal transform bases for use in inverse orthogonal transform of the coded stream;

storing, in an accumulation unit, the plurality of orthogonal transform bases for use in the inverse orthogonal transform of the coded stream;

storing, in a storage unit, at least one orthogonal transform basis which is required for current inverse orthogonal transform of a current block, out of the orthogonal transform bases stored in the accumulation unit;

performing, using a processor, the current inverse orthogonal transform using the at least one orthogonal transform basis stored in the storage unit and identified based on the identification information; and transferring, from the accumulation unit to the storage unit, the at least one orthogonal transform basis identified based on the identification information, only when the at least one orthogonal transform basis identified based on the identification information is not yet stored in the storage unit.

22. An image decoding apparatus comprising:

a decoding unit configured to decode, from a coded stream, identification information identifying each of a plurality of orthogonal transform bases for use in inverse orthogonal transform of the coded stream;

a pre-decoding unit configured to decode the identification information in the coded stream, prior to decoding performed by said decoding unit;

an accumulation unit configured to store the plurality of orthogonal transform bases for use in the inverse orthogonal transform of the coded stream;

a storage unit configured to store at least one orthogonal transform basis which is required for current inverse orthogonal transform of a current block, out of the orthogonal transform bases stored in said accumulation unit; and a control unit configured to cause said storage unit to store the at least one orthogonal transform basis, based on the identification information decoded by said pre-decoding unit.

* * * * *